United States Patent [19]

Hatano et al.

[11] Patent Number: 5,006,685
[45] Date of Patent: Apr. 9, 1991

[54] MACHINE TOOL WITH GRINDING FUNCTION AND TRUING/DRESSING METHOD OF GRINDING STONE USING IT

[75] Inventors: Sakae Hatano, Aichi; Yoshiharu Takada, Chiba; Kiyokazu Kainuma, Aichi; Isao Kanematsu, Aichi; Kazuo Asano, Aichi; Hisashi Yoshida, Aichi; Yoshinori Mori, Gifu, all of Japan

[73] Assignee: Yamazaki Mazak Corporation, Aichi, Japan

[21] Appl. No.: 227,881

[22] Filed: Aug. 3, 1988

[30] Foreign Application Priority Data

| Aug. 4, 1987 | [JP] | Japan | 62-119484[U] |
| Aug. 4, 1987 | [JP] | Japan | 62-119485[U] |
| Aug. 4, 1987 | [JP] | Japan | 62-119486[U] |
| Aug. 4, 1987 | [JP] | Japan | 62-194766 |
| Nov. 17, 1987 | [JP] | Japan | 62-175713[U] |

[51] Int. Cl.$^5$ .......................... B23H 5/04; B24B 53/00
[52] U.S. Cl. .................................. 219/69.2; 51/5 D; 125/11.01; 219/69.15; 219/69.17
[58] Field of Search .............. 219/69.12, 69.15, 69.17, 219/69.2; 51/5 D; 125/11 R, 11.01, 11.02, 11.19; 82/49, 120, 121

[56] References Cited

U.S. PATENT DOCUMENTS

| 3,398,253 | 8/1968 | Rye | 125/11 R |
| 4,596,066 | 6/1986 | Inoue | 219/69.15 |
| 4,764,653 | 8/1988 | Bühler | 219/69.15 |
| 4,813,188 | 3/1989 | Becker et al. | 51/165.71 |
| 4,849,599 | 7/1989 | Kuromatsu | 219/69.2 |

FOREIGN PATENT DOCUMENTS 52-17292  2/1977  Japan .................................. 51/5 D Primary Examiner—Geoffrey S. Evans
Attorney, Agent, or Firm—Wenderoth, Lind & Ponack

[57] ABSTRACT

A machining tool with an electric discharge truing and dressing apparatus comprising a spindle stock for containing and supporting a workpiece spindle which is driven for rotation while holding a workpiece or an electrode. A tool rest moves parallel and perpendicular to the spindle of the spindle stock and holds an electrode machining tool and a grinding wheel. An electricity feed element is disposed between a workpiece supportng portion of the spindle and the tool rest. A magazine is disposed at an outside area of a machining area of the tool rest and is adapted to store the workpiece and the electrode. A loading device is disposed between the magazine and the spindle. The grinding wheel on the tool rest is subjected to truing and dressing by feeding the electrode from the magazine to the spindle stock.

17 Claims, 30 Drawing Sheets

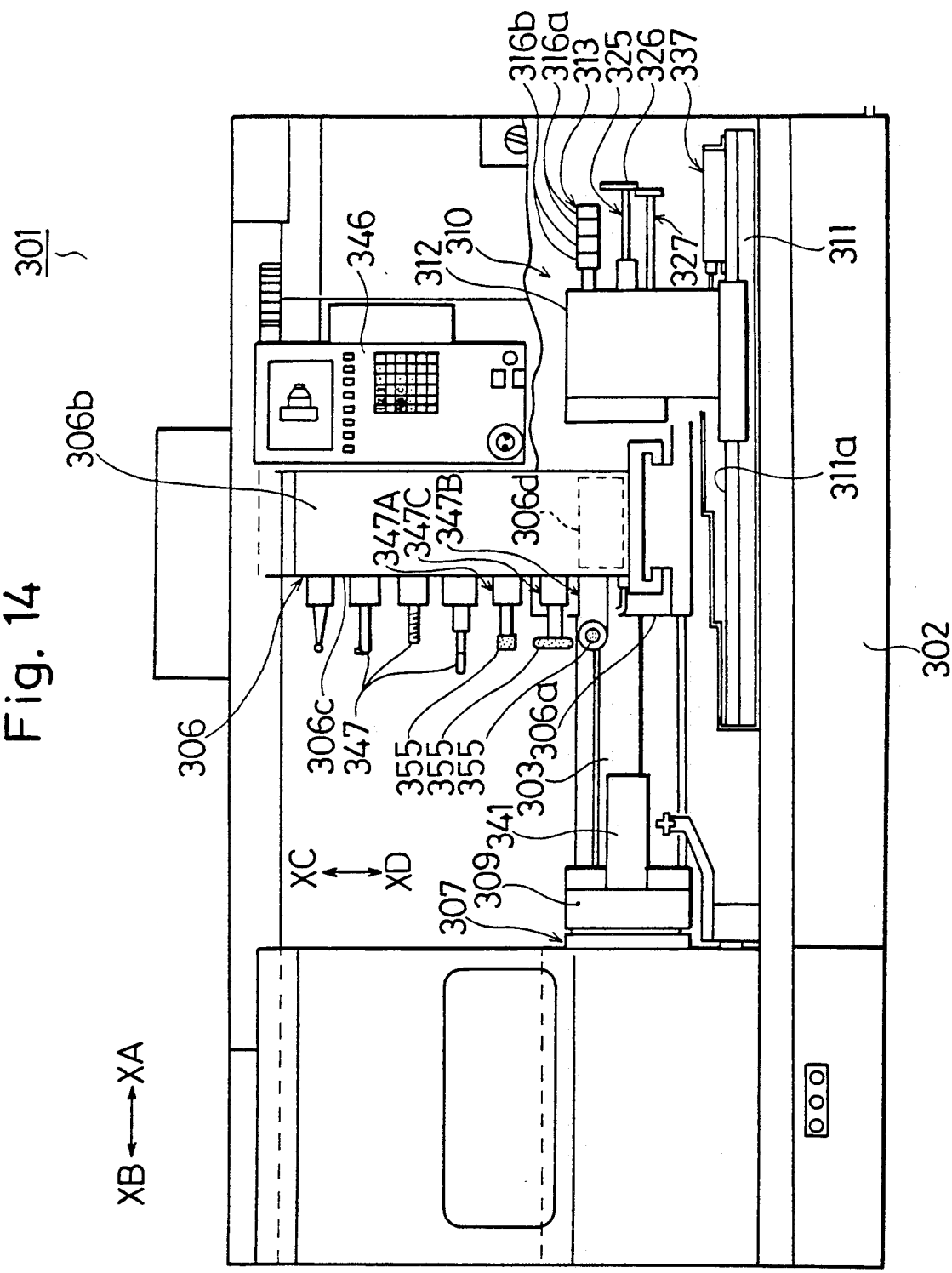

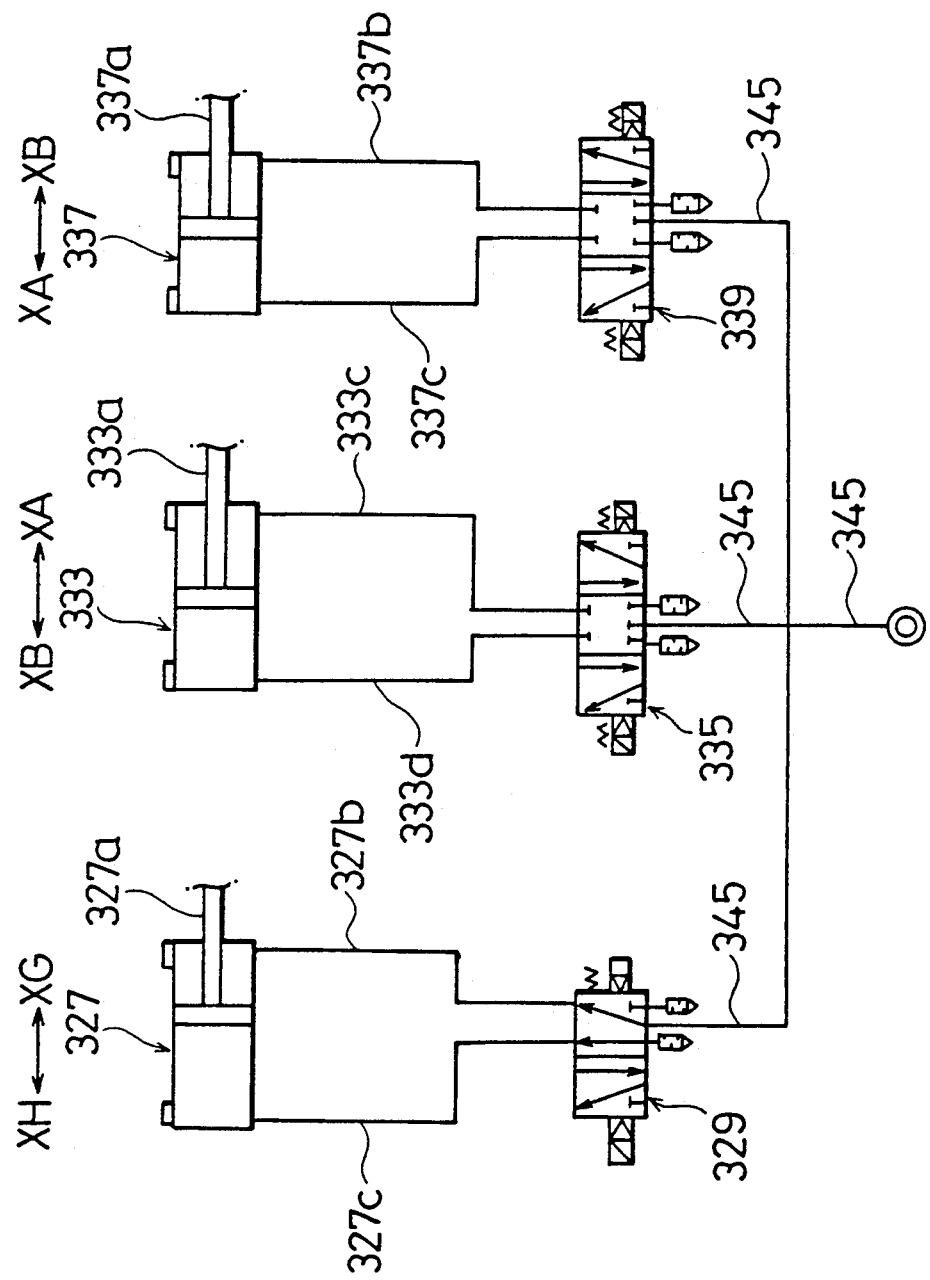

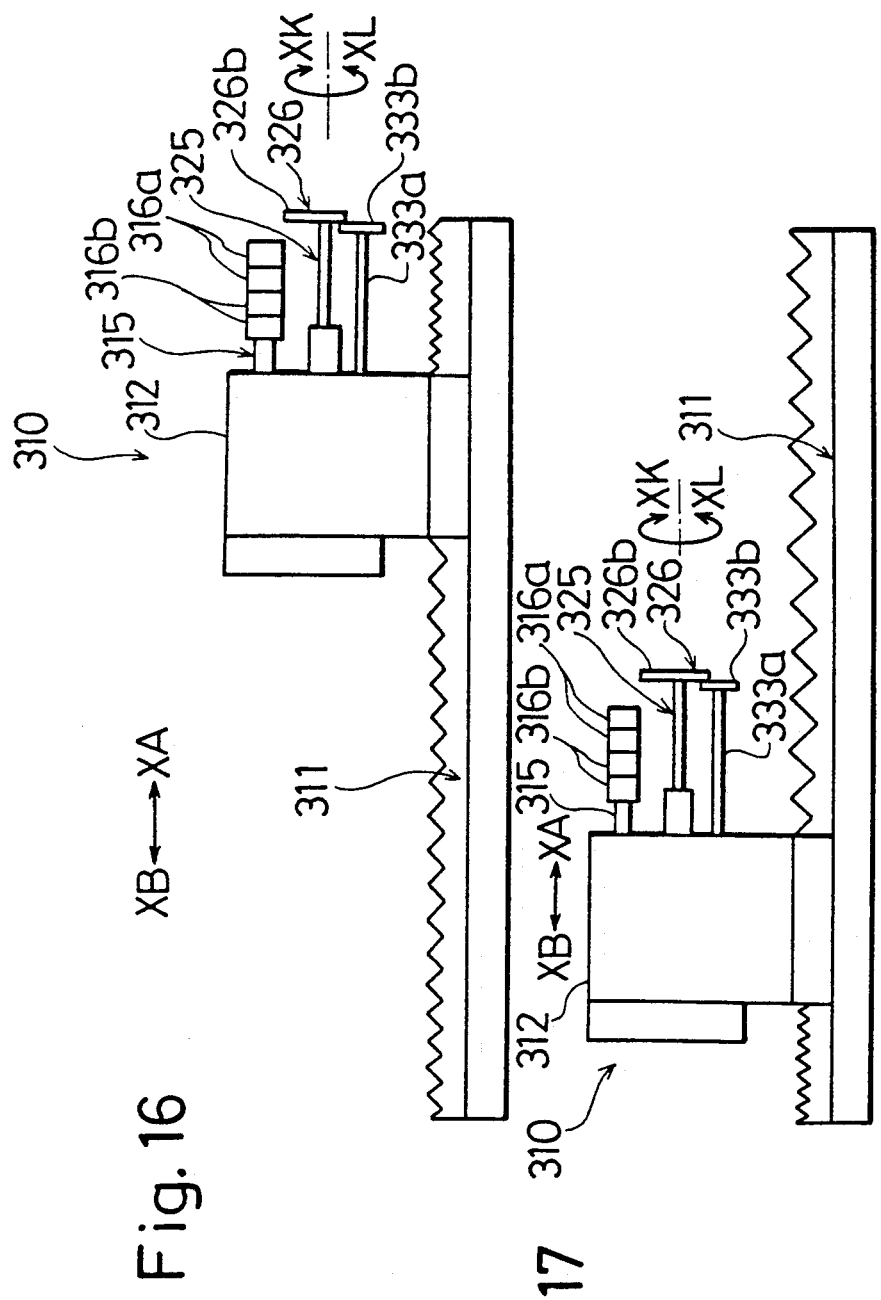

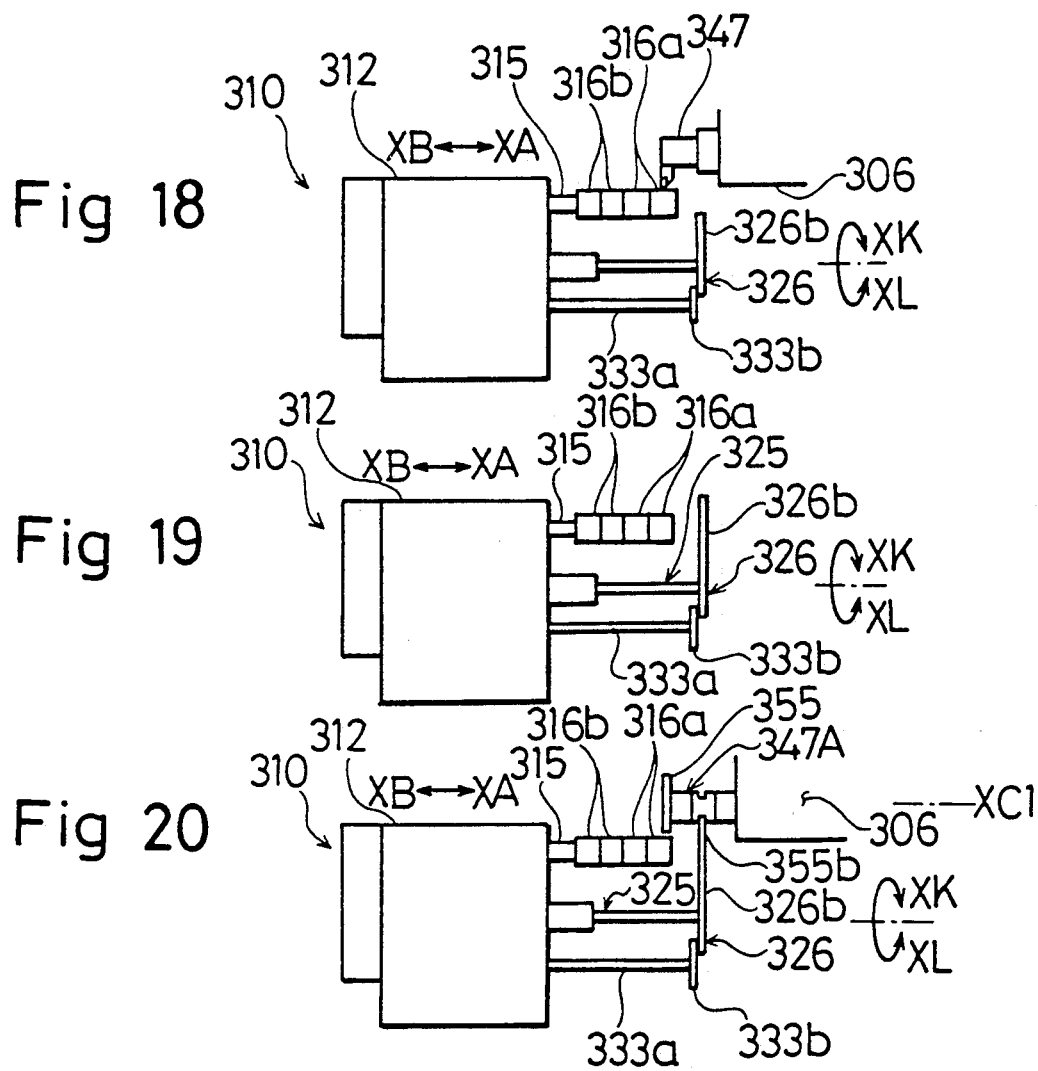

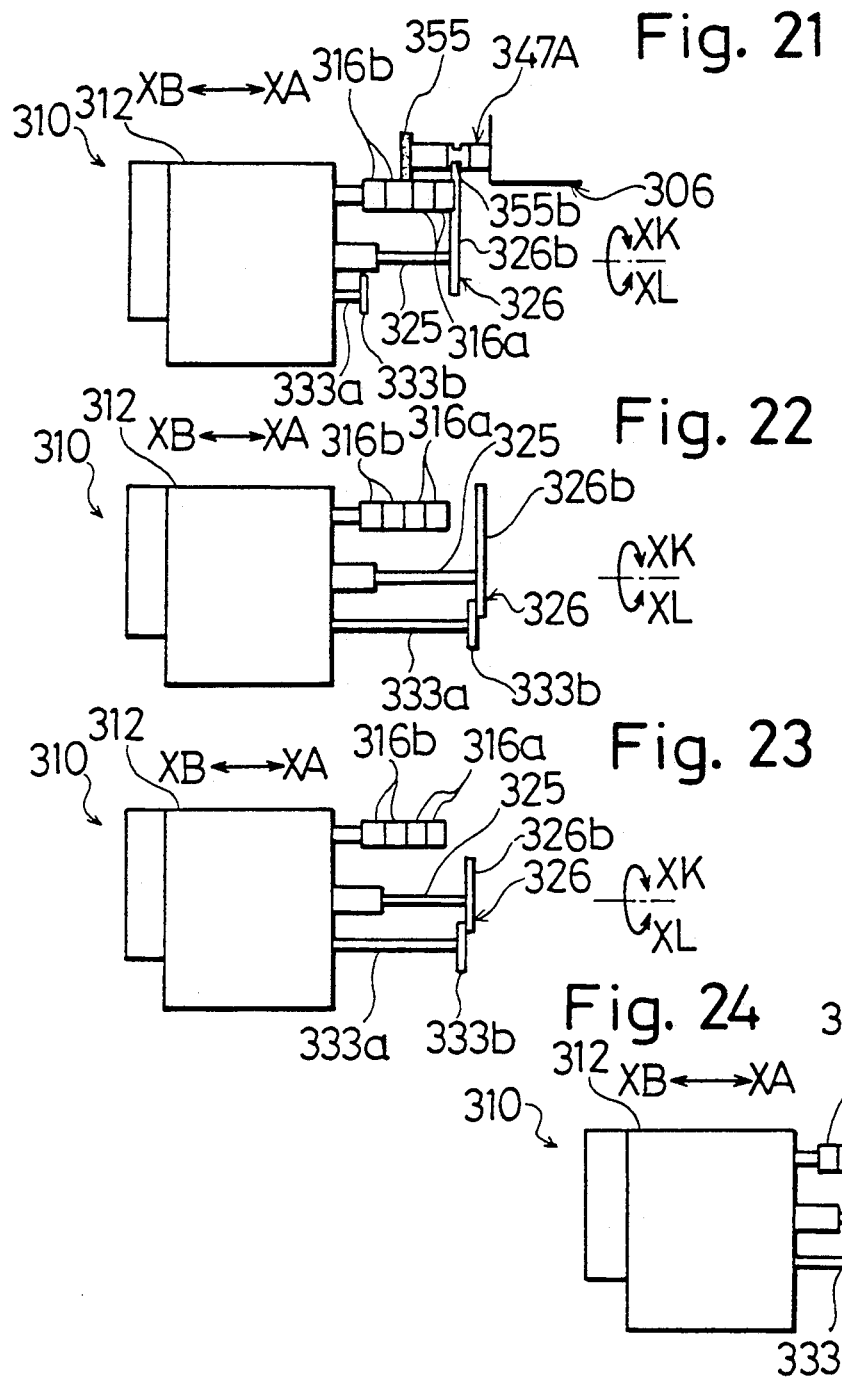

Fig. 25
Fig. 26
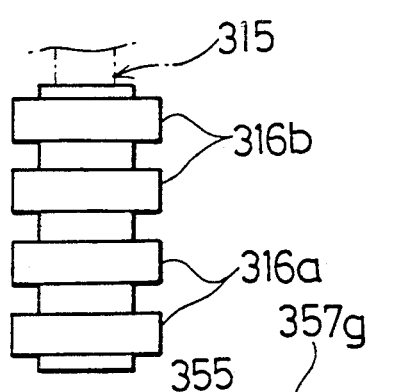
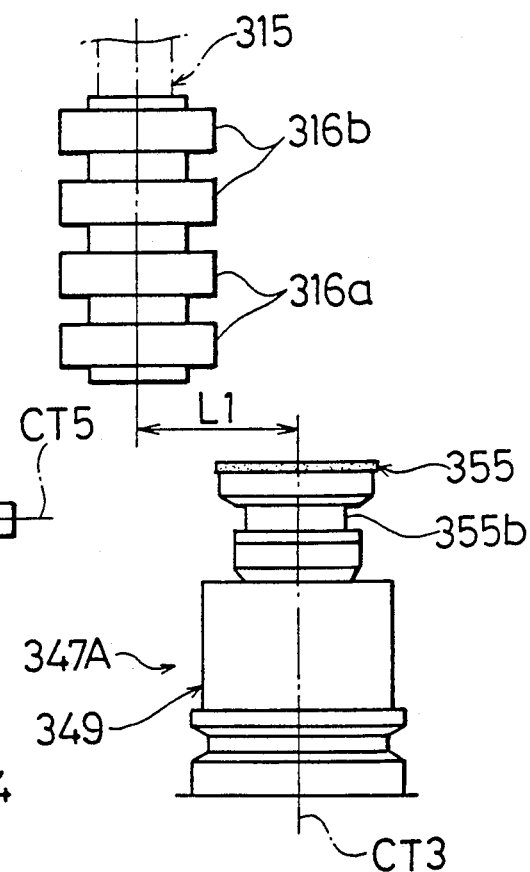

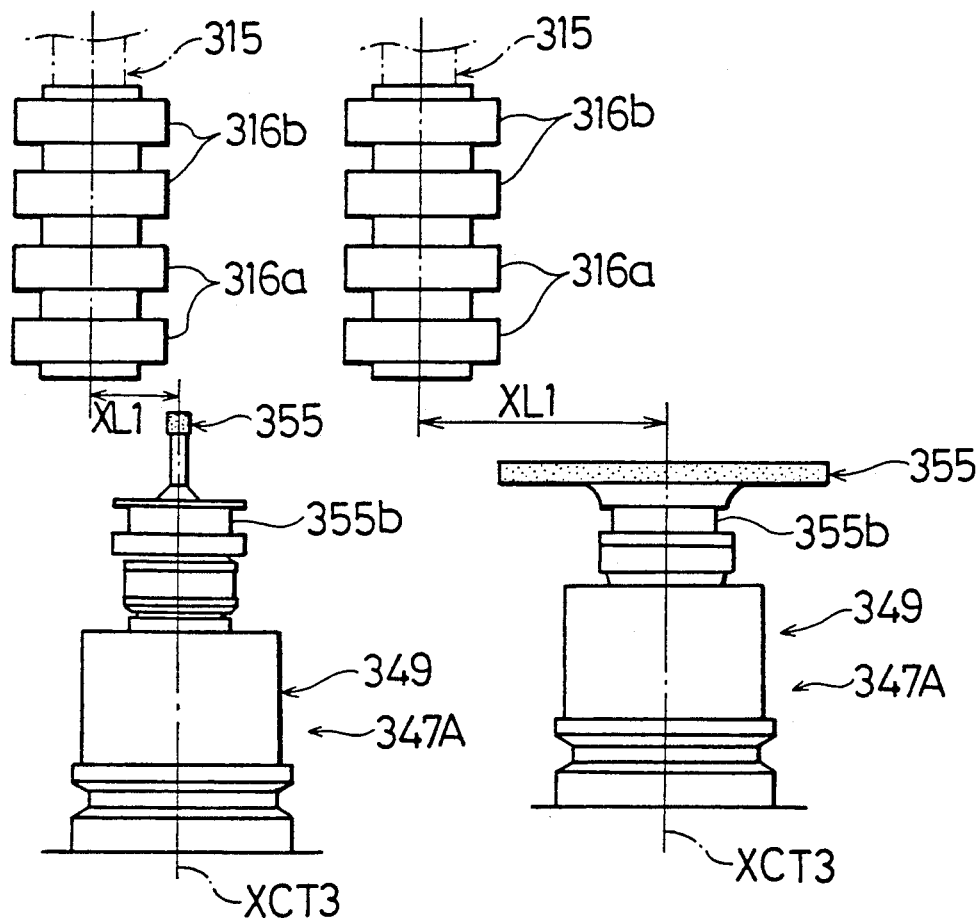

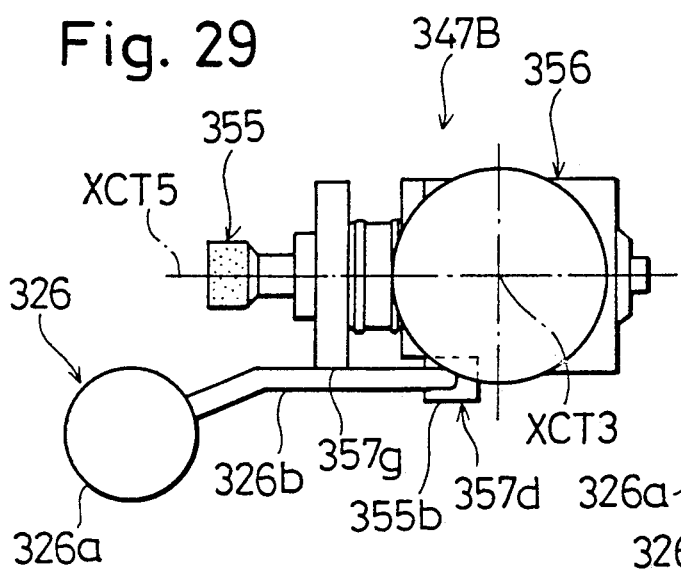
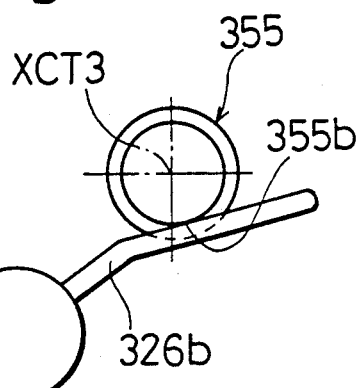
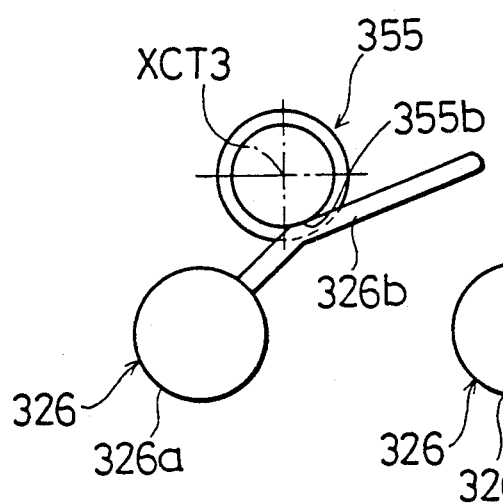
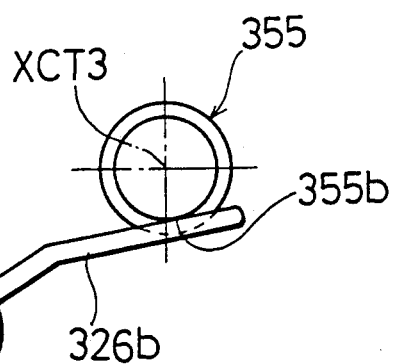

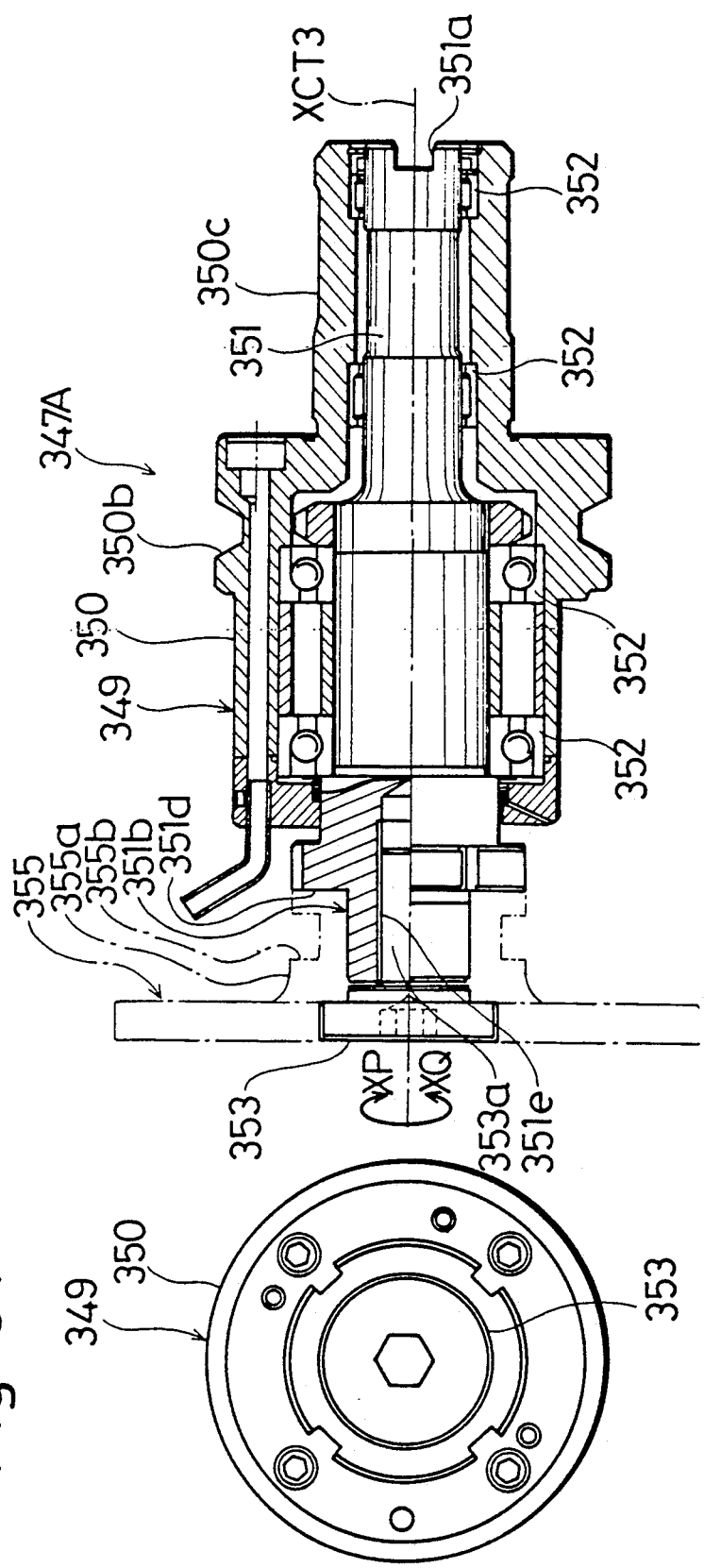

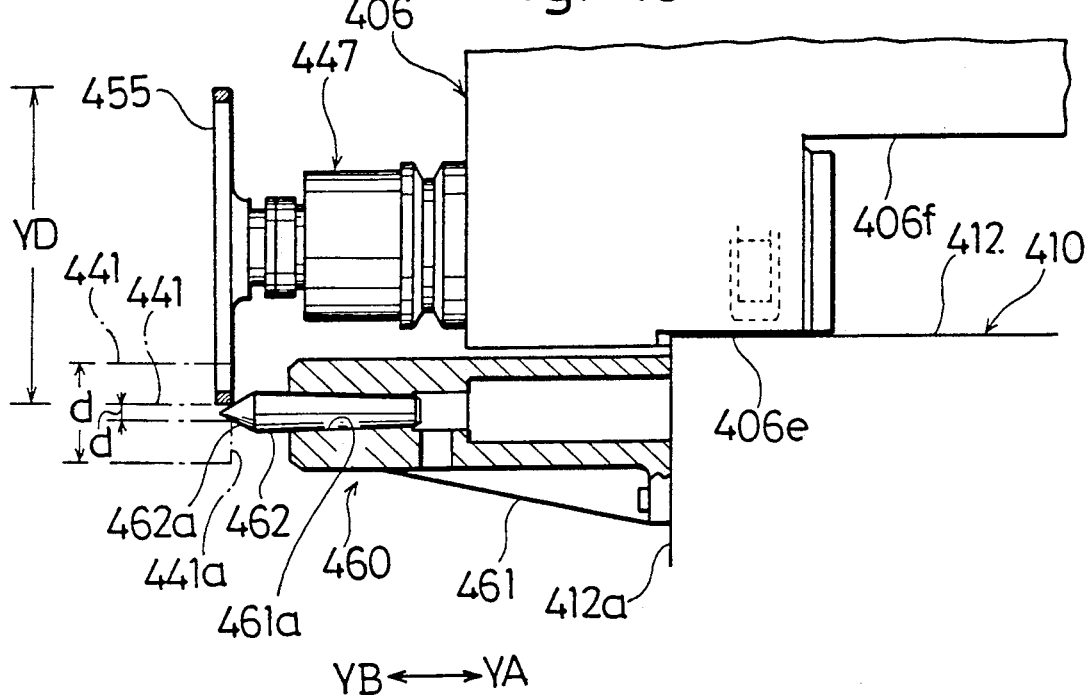
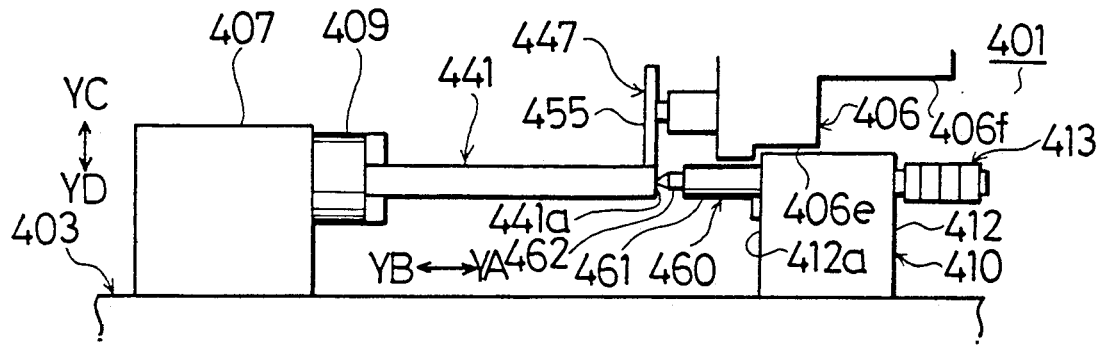
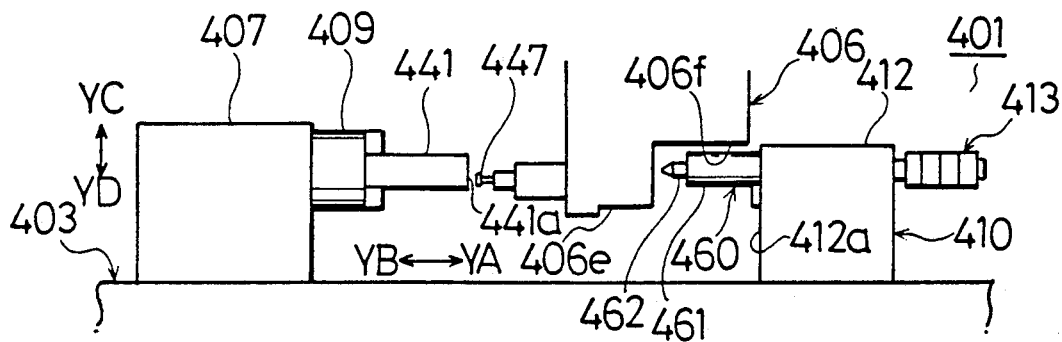

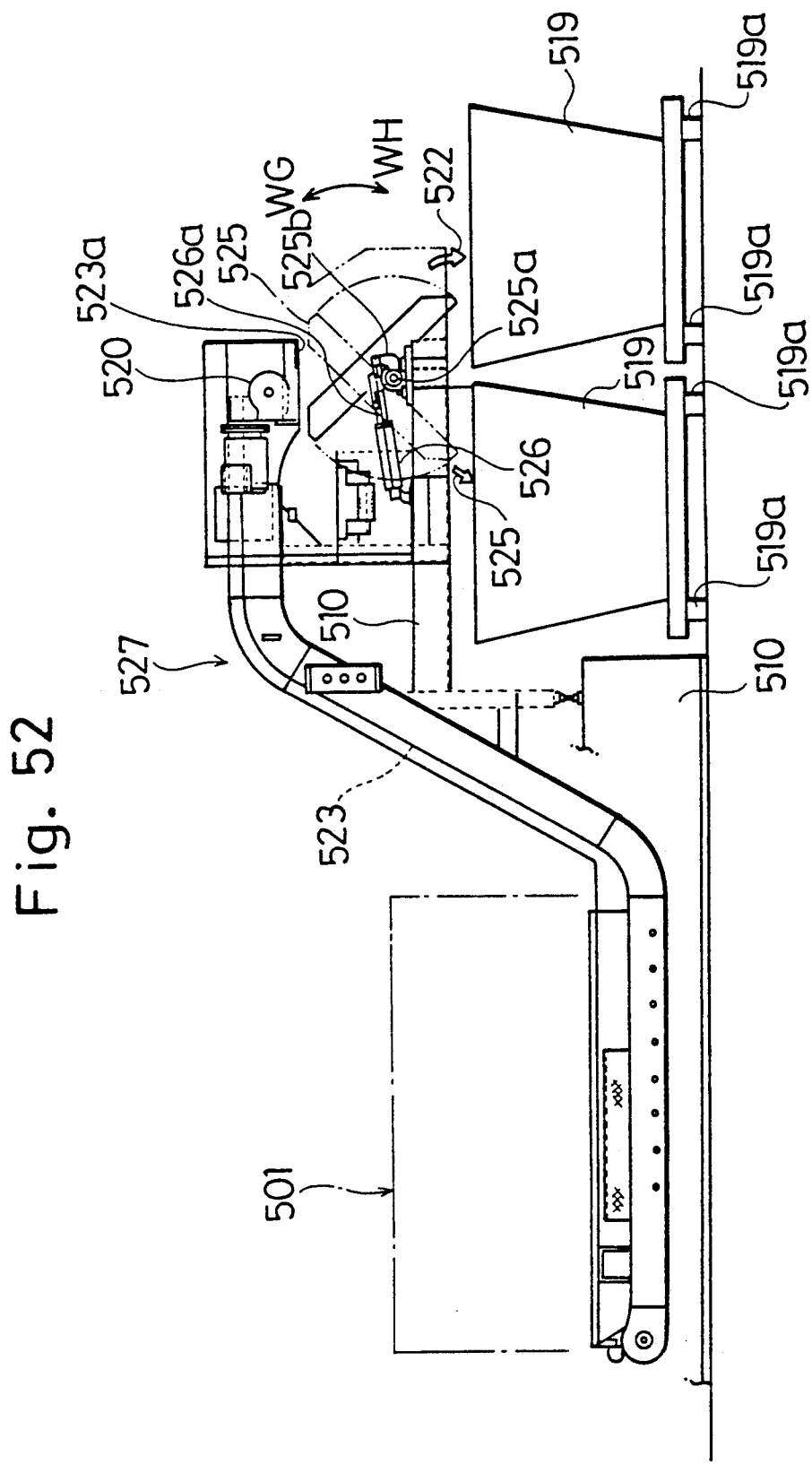

MACHINE TOOL WITH GRINDING FUNCTION AND TRUING/DRESSING METHOD OF GRINDING STONE USING IT

BACKGROUND OF THE INVENTION

This invention relates to a machining tool with a grinding function equipped with an electric discharge truing and dressing apparatus of a metal bond grinding wheel for grinding a workpiece.

This invention also relates to a machine tool having a grinding function capable of performing a center work machining and the like, and capable of dressing in a state where a tool for grinding is installed in a tool rest, a dressing apparatus being used for it and the dressing method, and grinding tool.

Furthermore, this invention relates to a chip collecting apparatus used for a machine tool such as a lathe, and a method of collecting chips.

In recent years, ceramic materials or the like have received a lot of attention because of their characteristics, such as resistance to high temperature and resistance to wear, and have been applied to various kinds of devices. Therefore, developments and proposals have been made in machining arts and techniques so that ceramic materials can be cut and ground as easily as iron materials can. The present inventors have tried to grind a hard and fragile material using a cast iron bond diamond grinding wheel and a machining center. As a result, they have confirmed that highly efficient machining of ceramics and cemented carbide or sintered hard alloy was effective.

In order to perform the grinding machining by a cast iron bond diamond grinding wheel with high accuracy and efficiency, however, truing and dressing is indispensable on the body of a machining tool. Heretofore, it was said that no effective truing and dressing methods were present with respect to a metal bond grinding wheel. The present inventors have proposed a wire electric discharge truing and dressing method on the body of a machining tool.

The illustration of FIGS. 4 and 5 show the principle thereof, in which an electric discharge machining is performed between a wire electrode 95 and a metal bond grinding wheel 90 using a wire cut electric discharge power source 96. Since electric discharge truing and dressing is performed on the body of a machining tool, there can be obtained a high accuracy with minimal errors. The present inventors have proposed a truing center in which the afore-mentioned dressing method is applied.

Furthermore, the present inventors have proposed an electric discharge truing by a block-like electrode as an improvement of an electric discharge truing and dressing method by the afore-mentioned wire electric discharge. The present inventors also have proposed a method for performing an electric discharge truing and dressing of a metal bond grinding wheel mounted on a tool spindle using a generated electrode, obtained by cutting an electrode into a desired configuration with a tool mounted on a tool spindle.

However, since the machining with the wire electrode required the use of a wire electrode, the electric discharge partially takes place, and an average electric current is limited. Therefore, the removal efficiency of the metal portion of the metal bond grinding wheel became insufficient and the truing and dressing efficiency became worse. In addition, since the wire was limited in thickness, the shape truing of the grinding wheel was limited in configuration. For example, there arose such problems as an irregularity having a sharp angle, or a complex configuration could not be generated.

The proposal of the electric discharge truing with a block-like electrode were all no more than the proposals of the principle of the electric discharge truing and dressing method. The proposals were still insufficient in solving the problems relating to the structure and arrangement of the truing and dressing apparatus, particularly in the respect that they were applied to a turning center for grinding and machining a cylindrical workpiece with high efficiency. That is, in a conventional special machining such as electro-chemical machining, one-to-one automatic machining was available, but there was no such machine in which workpiece W having various configurations could be continuously machined without manpower. Therefore, in the prior art, it was impossible to attain automation.

And heretofore a proposal was advanced relating to a dressing apparatus by which truing and the like are performed by means by electric discharge machining toward a grinding stone portion which is blinded. In the prior art, in order to perform truing and the like by means by the dressing apparatus, rough truing and dressing are performed on the grinding stone portion which is blinded by using a machining electrode for rough machining at first. Thereafter, the machining electrode for rough machining is detached from the dressing apparatus and the machining electrode for finishing machining is attached to it in turn. In this way, the finishing truing and dressing are performed.

However, in this method it is necessary that the machining electrode for rough machining is detached after rough truing toward the grinding stone portion of a grinding tool and the machining electrode for finishing machining is attached. It is convenient that finishing truing and the like cannot be performed immediately.

Electricity needs to be fed to a grinding stone portion via an electrode by connecting the electrode with the grinding stone portion so as to be free to connect and separate therefrom. But, such an art is far from development.

Moreover, in the prior art when a center work machining and the like are performed by means of a complex machine tool, one end portion of a workpiece is held by the spindle of the machine tool via a chuck, and the other end portion is supported by the center of a tailstock. In this state, a workpiece is cut in a predetermined form by a tool installed in a tool rest.

In recent years, the proposal, to perform grinding machining toward a workpiece by installing a tool for grinding in a tool rest in a complex machine tool, has been advanced. But, in case blinding arises in a grinding tool, it is necessary to perform dressing. Then a method in which dressing is performed by electric discharge machining toward the grinding stone which is blinded is adopted in the prior art. Dressing is performed in such a manner that the tool for grinding which is blinded is detached from the tool rest and is attached to an electrical discharge machine provided separately from the complex machine tool.

However, according to this method, a worker must perform the operations of the detachment and attachment of a grinding tool whenever dressing is performed. And, it is difficult to perform a grinding activity automatically without manpower in the complex machine tool. Then, it is thinkable that a dressing apparatus is disposed on the machine body of the complex machine tool and dressing is performed in a state that the grinding tool is installed on the tool rest by means of the apparatus. In this method, a new problem occurs. That is, there is a situation in which the machining cannot be performed because of the interference between the tailstock, which is provided free to move on the machine body in the same manner as the dressing apparatus, and the dressing apparatus, when center workpiece machining and the like is performed.

In a conventional machine tool such as a lathe, when the machining is performed on workpieces of different kinds of materials, differentiation of machining is not present, except for specific cases. Therefore, when the chip produced is collected it mixes with different kinds of chips.

This method is defective in the complication of the separation and classification of chips, for the object of effectively utilizing resources. In the case where a workpiece machined is completely different in character, such as metal and ceramic, a chip collecting apparatus capable of collecting and classifying the chip produced from the first is desirable.

OBJECTS OF THE INVENTION

It is therefore an object of the present invention to provide an electric discharge truing and dressing apparatus suitably used for a turning center in which electric discharge truing and dressing of a metal bond grinding wheel is performed on the body of a machining tool.

Another object of the present invention is to provide a machining tool with a grinding function, in which an electrode is automatically exchanged in order to perform the electric discharge truing and dressing of a metal bond grinding wheel of a turning center on the machine body, thereby attaining a long driving time without manpower.

A further object of the present invention is to provide a machining tool with a grinding function in which an electrode is disposed on a workpiece spindle stock so that electric discharge truing and dressing of a metal bond grinding wheel of a turning center is performed on the machine body.

A still further object of the present invention is to provide an electric discharge truing and dressing apparatus which can sufficiently cope with thermal displacement of a spindle stock by a mounting an electrode on the spindle stock of a turning center.

A yet further object of the present invention is to provide an ideal construction of a CNC machining tool with an electric discharge truing and dressing apparatus, and more particularly to provide a machining tool in which an electrode machining tool and a grinding wheel are mounted on a tool rest so that plural kinds of workpieces can be machined.

And it is an object of the present invention to provide a truing and dressing apparatus capable of improving machining efficiency in such a manner that rough truing and dressing is performed on a grinding stone portion of a grinding tool, and thereafter finishing truing and dressing is performed immediately without reattaching the electrode, in order to eliminate the above-described defects.

Moreover, it is an object of the present invention to provide a grinding tool capable of installation in a machine tool and capable of performing truing and dressing in such a manner that electric discharge machining is performed on the grinding stone portion in a state in which an electrode is securely connected with the grinding stone portion, but being free to connect and separate.

And, it is an object of the present invention to provide the machine tool with a dressing apparatus capable of performing center workpiece machining and capable of performing dressing when a grinding tool is installed in the tool rest.

Furthermore, it is an object of the present invention to provide a chip collecting apparatus capable of easily classifying and stocking the chip produced if the material to be machined changes.

SUMMARY OF THE INVENTION

From one aspect of the present invention, there is essentially provided a machining tool having a grinding device comprising a spindle stock for containing and supporting a workpiece spindle, which is driven for rotation while holding a workpiece or an electrode. A tool rest moves parallel and perpendicular to the spindle of the spindle stock and holds an electrode machining tool and a grinding wheel. A feed electricity means is disposed between a workpiece supporting portion of the workpiece spindle and the tool rest. A magazine is disposed at an outside area of a machining area of the tool rest, being adapted to store the workpiece and the electrode, and a loading device is disposed between the magazine and the spindle.

In this way, if a workpiece magazine with an electrode placed thereon is stored, a dressing and truing operation of a metal bond grinding wheel can be performed by handling an electrode like a workpiece. Furthermore, since a workpiece and an electrode tool are placed on a workpiece magazine, a grinding wheel on the tool rest can be corrected and a plurality of workpieces can be machined without attaching or detaching the grinding wheel every time the dressing and truing is performed. Therefore, various kinds of workpieces can be machined for a long time without manpower.

From another aspect of the present invention, the present invention includes an electric discharge truing and dressing apparatus comprising a spindle stock for containing and supporting a workpiece spindle which is driven for rotation while holding a workpiece. A tool rest moves parallel and perpendicular to the workpiece spindle of the spindle stock and holds an electrode machining tool and a metal bond grinding wheel. An electrode holding means is driven for rotation while holding an electrode disposed at an upper portion of the spindle stock, and a feed electricity means for the use of electric discharge machining is disposed between the electrode holding means and the tool rest.

From a further aspect of the present invention, the present invention includes an electric discharge truing and dressing apparatus comprising a spindle stock for containing and supporting a workpiece spindle, which is driven for rotation while holding a workpiece. A tool rest moves parallel and perpendicular to the workpiece spindle of the spindle stock and holds an electrode machining tool and a grinding wheel. An electrode holding means is driven for rotation while holding an electrode disposed at an upper portion of the spindle stock. A feed electricity means for the use of electric discharge machining is disposed between the electrode holding means and the tool rest. A magazine disposed at an outside area of a machining area of the tool rest is adapted to store the workpiece and the electrode, and a loading device feeds or discharges a workpiece disposed between the magazine and the spindle.

In this way, if an electrode is disposed on a spindle stock, a workpiece machining position and a truing and dressing position are near and the movement of a tool rest for holding a grinding tool can be limited to a small amount. Furthermore, the machining accuracy can be prevented from becoming degraded due to thermal displacement of a workpiece spindle, since an electrode holding means is provided separately from the workpiece spindle.

From a still further aspect of the present invention, the present invention includes an electric discharge truing and dressing apparatus truing and dressing a grinding wheel by an electric discharge using a positioning function of a numerical controller. A spindle stock contains and supports a workpiece spindle, which is driven for rotation while holding a workpiece. An electrode holding means is disposed opposite the main spindle stock, and a tool rest moves parallel and perpendicular to the workpiece spindle of the spindle stock and holds an electrode machining tool and a grinding wheel. A feed electricity means for the use of electric discharge machining is disposed between the electrode holding means and the tool rest.

In this way, if an electrode holding means is disposed opposite a workpiece spindle and a tool rest is movably disposed in parallel and perpendicular to a workpiece spindle, the electric discharge truing and dressing can be efficiently performed.

And, this invention is comprised as follows. That is, machining electrodes are provided with a machine body of a machine tool, being free to rotate around their axis center, with the axis center parallel to the Z axis direction. Moreover, the tool electrode with the electric feed means, such as an electrode bar capable of engaging and contacting with the tool for grinding is provided with the machine body being free to move in the Z axis direction and being free to rotate. Moving and driving means for moving the tool electrode in the Z axis direction, such as a positioning cylinder, are connected with the tool electrode. Rotating and driving means for rotating the electrode feed means, such as a supporting cylinder, an engaging member, a rotating shaft, a cylinder for rotating and a spring are connected with the tool electrode.

Accordingly, in case that, dressing and the like are performed on a grinding tool, by driving the moving and driving means and the rotating and driving means, the tool electrode is moved in the Z axis direction and is rotated with a predetermined angle, and the tool electrode and the tool for grinding are connected with each other via the electric feed means. In this state, electric discharge machining is performed on the grinding stone portion in a state in which the grinding stone of the tool for grinding and the machining electrode are separated a predetermined interval from each other. In this way, dressing and the like can be performed on the grinding tool. Therefore, dressing and the like can be performed in state that the grinding tool being installed in the tool rest of a complex machining machine tool is installed in the tool rest as it is.

Furthermore, the present invention has a main body. A machining electrode supporting portion is provided with the main body, being free to rotate and drive, and the plural number of the machining electrodes are installed on the machining electrode supporting portion and are free to be detached and attached.

With the above-described constitution, the machining electrodes having various kinds of shapes are installed on the machining electrode supporting portion, and the machining electrode is selected from among the machining electrodes according to the form of the grinding stone of the grinding tool for performing truing and dressing. Then, truing and dressing can be performed on the grinding stone by means of the selected machining electrodes. Accordingly, truing and dressing can be performed on grinding stones having different and plural forms by means of one truing and dressing apparatus without detaching and attaching the machining electrodes.

And, in case machining electrodes of different materials, that is to say, a machining electrode is composed of copper for finishing machining and a machining electrode is composed of black lead for rough machining, are installed on the machining electrode supporting portion, rough truing and dressing is performed on the grinding stone of the grinding tool by means of the machining electrode for rough machining. Thereafter finishing truing and dressing is performed by the machining electrode for finishing machining without immediately detaching and attaching the electrode. In this way, machining efficiency can be improved.

Furthermore, the present invention has a main body capable of being installed in a machine tool, such as a complex machine tool, and the electrode engaging means, such as an electrode connecting groove, and a grinding stone are rotatably provided on the main body.

With the above-described constitution, in case dressing is performed on the grinding tool installed on the machine tool, the tool electrode is connected with the electrode engaging means, and electricity can be fed the grinding stone portion from the tool electrode via the electrode engaging means. Accordingly, there can be provided a grinding tool capable of being installed in a machine tool and in which a tool electrode can be securely connected with a grinding stone portion, being free to be connected and disconnected.

And, the present invention is comprised as follows. That is, a dressing main body is provided on the machine body of the complex machining machine tool, being free to move and drive in the Z axis direction. A tailstock, such as tail center portion, is provided with the dressing main body, and a dressing means such as a machining electrode portion and an electric feed mechanism for a tool is provided on the dressing main body.

Thus when center work machining and the like are performed, one end of a workpiece is supported by the tailstock means. In this state the workpiece can be machined by means of the tool by moving the tool rest together with the tool in the Z axis direction. And when dressing is performed on the grinding tool, dressing can be performed by means of the dressing means by relatively moving the dressing main body and the tool rest in the Z axis direction. As a result, center work machining and the like can be performed and dressing can be performed in a state in which the grinding tool is installed on the tool rest.

Moreover, according to the present invention, a change-over plate is provided, being free to rotate and move in reciprocal directions at a chip collecting side such as a machine tool side, or at a chip elimination side such as a chip elimination orifice of a chip conveyor. A driving means for rotating and moving the change-over plate, such as a driving cylinder, are provided with the change-over plate.

With the above-described constitution, a chip different in material can be collected, properly sorting chips in such a manner that the driving means is driven according to the material to be machined to switch the change-over plate to reciprocal directions.

Accordingly, the collection and separation of chips can be easily performed, the reclamation of resources can be promoted, and chips different in properties such as ceramic and metal chips can be collected with an initial sorting operation.

BRIEF DESCRIPTION OF THE DRAWINGS

FIG. 14 is a front elevation showing the apparatus of an embodiment of the dressing apparatus according to the present invention being installed in a complex machining machine tool;

FIG. 15 is an air-circuit view of the dressing apparatus according to the present invention;

FIGS. 16 through 24 are views showing a process in which dressing is performed on a grinding tool by means of the dressing apparatus according to the present invention;

FIGS. 25 through 28 are views showing a position relation between the grinding tool being installed in a tool rest of the complex machine tool as shown in FIG. 14 and the machining electrode;

FIGS. 29 through 32 are views showing the contact condition between each grinding tool as shown in FIGS. 25 through 28 and the tool electrode;

FIG. 33 is a front elevation showing an example of the grinding tool being installed in the tool rest of the complex machine tool as shown in FIG. 14;

FIG. 34 is a left side elevation of the FIG. 33;

FIG. 43 is a view for showing the engaging condition between the tool rest and the center portion of the truing and dressing apparatus;

FIGS. 45 through 46 are views showing a process in which the center workpiece grinding machining and the chuck workpiece grinding machining are operated by using the complex machine tool according to the present invention;

FIG. 52 is a front elevation for showing another embodiment of a chip collecting apparatus.

DESCRIPTION OF THE PREFERRED EMBODIMENTS

The present invention will be described in detail hereunder with reference to the accompanying drawings.

Figure 1:
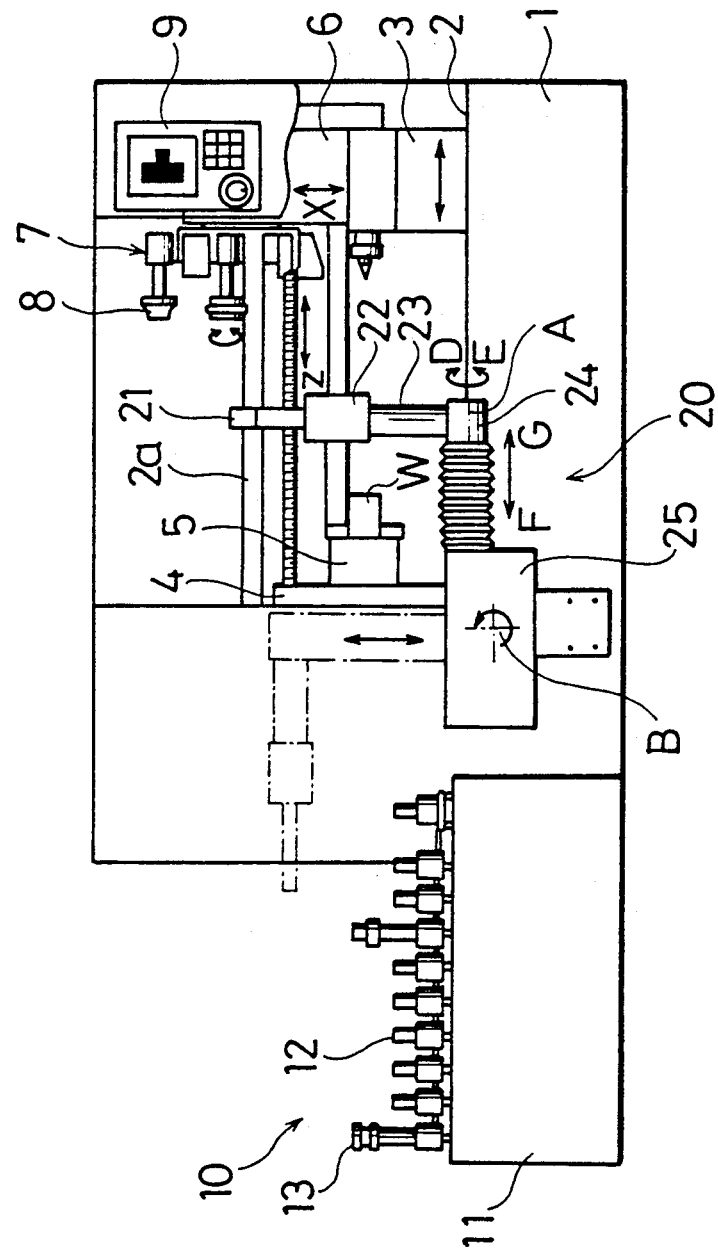
FIG. 1 is a front view of a turning center to which an electric discharge truing/dressing apparatus is applied.

A turning center, as a machining tool, has a bed 1 constituting its body as shown in FIG. 1. The bed 1 is provided thereon with a horizontal slide guiding surface 2. A spindle stock 4 is rotatably provided with a workpiece spindle. This workpiece spindle is driven by a rotation driving means such as an electric motor, known per se. The workpiece spindle is provided with a workpiece chuck 4. The workpiece chuck 5 is provided with a workpiece W and an electrode 13 secured thereto. A tailstock 3 is slidably disposed on the horizontal slide guiding surface 2 for sliding in the Z axis direction (the right and left directions in the figure). A tool rest 6 is slidably disposed on an inclined slide surface 2a, i.e. a slant surface which is inclined by certain angles with respect to the horizontal slide guiding surface 2. This tool rest 6 is movably provided in the longitudinal and transversal directions, i.e., the Z- and X-axis directions. The tool rest 6 is provided thereon with a tool turret 7 disposed around a tool turret shaft. The tool turret 7 is provided with a plurality of tools 8 stored around the turret. The tools 8 stored in the tool turret 7 include cutting or grinding tools for the use of a turning center such as, for example, a machining bit, a boring drill, a shaping end mill and a grinding wheel for grinding the inner or outer peripheral surface of a workpiece.

Furthermore, instead of the ordinary grinding wheels, a metal bond grinding wheel 31 for grinding a hard material such as ceramic is stored thereon. In addition, a measuring touch sensor, etc. are also stored on the turret 7. These tools 8 are exchangeable according to necessity such as wear, change of a workpiece or the like. The tools 8 stored on the tool turret 7 are rotationally driven so that a required tool will be brought to a tool fixing place and secured for use.

The movements of the above components are controlled by a numerical control apparatus 9. Adjacent to the bed 1 is located a magazine 20 containing workpieces 12 and electrodes 13. The magazine 10 comprises a magazine table 11 with a number of workpieces 12 and electrodes 13 connected in a loop shape. The loop is connected to a driving device, and the workpieces 12 and electrodes 13, at the required place, are divided according to commands from the numerical control apparatus 9. The holders of the workpiece 12 and electrodes 13 are each assigned with a magnetic and mechanical identification mark. The kinds of workpieces and the kinds of electrodes are stored in a memory within the numerical control apparatus 9. The required workpiece 12 and electrode 23 are labelled with reference to the identification mark and the data stored within the memory.

A loader 20 adapted to take out workpieces 12 and electrodes 13 within the magazine 10 and transfer them to the chuck 5 is located at the front surface of the bed 1. The loader 20 is provided at its foremost end with a holding nail 21. The holding nail 21 opens and closes its two fingers with a holding nail driving means 22, such as an oil pressure device, so as to hold or release the workpiece 12 and electrode 13. The holding nail 21 is disposed at the foremost end of a swing arm 23. The swing arm 23 is secured to one end of a pivot shaft 24. The pivot shaft 24 is disposed on a loader body 25.

Figure 2:
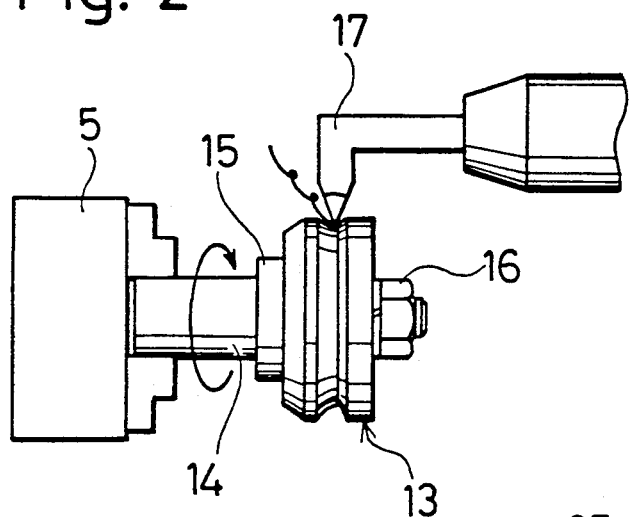
FIG. 2 is an illustration in which an electrode is being cut.

The pivot shaft 24 is pivoted about a pivot axis A in the direction as shown by the arrows D and E within the loader body 25, and is slid in the direction as shown by the arrows F and G. The loader body 25 swings by 90 degrees about an axis B vertical to the pivot axis of the pivot shaft 24. After being swung, the loader body 25 is brought to a position shown by chain line in FIG. 1. FIG. 2 illustrates an electrode 13 being cut by a bit 17. The electrode 13 has a cylindrical configuration and is formed of a conductive material, such as black lead and copper. The electrodes 13 is tightened to a flange 15 formed on a rotating shaft by a nut 16 and secured to the rotating shaft 14. When the electrode 13 is required to be exchanged due to wear and breakage, the electrode 13 is removed from the rotating shaft 14 by untightening the nut 16.

electrode 23 is taken out of the magazine 10 by the loader 20 and is held by the chuck 5. As shown in FIG. 2, when the electrode 13 is fixed to the chuck 5, the cutting bit 17 cuts the outer periphery of the electrode 13. The electrode 13 is cut into a desirably formed electrode 13a by the numerical control apparatus 9. That is, the formed electrode 13a, as will be described, is generated into a configuration where projections, depressions, or irregularities are exhibited oppositely to those of the metal bond grinding wheel 31, which is to be subjected to the truing and dressing machining.

Figure 3:
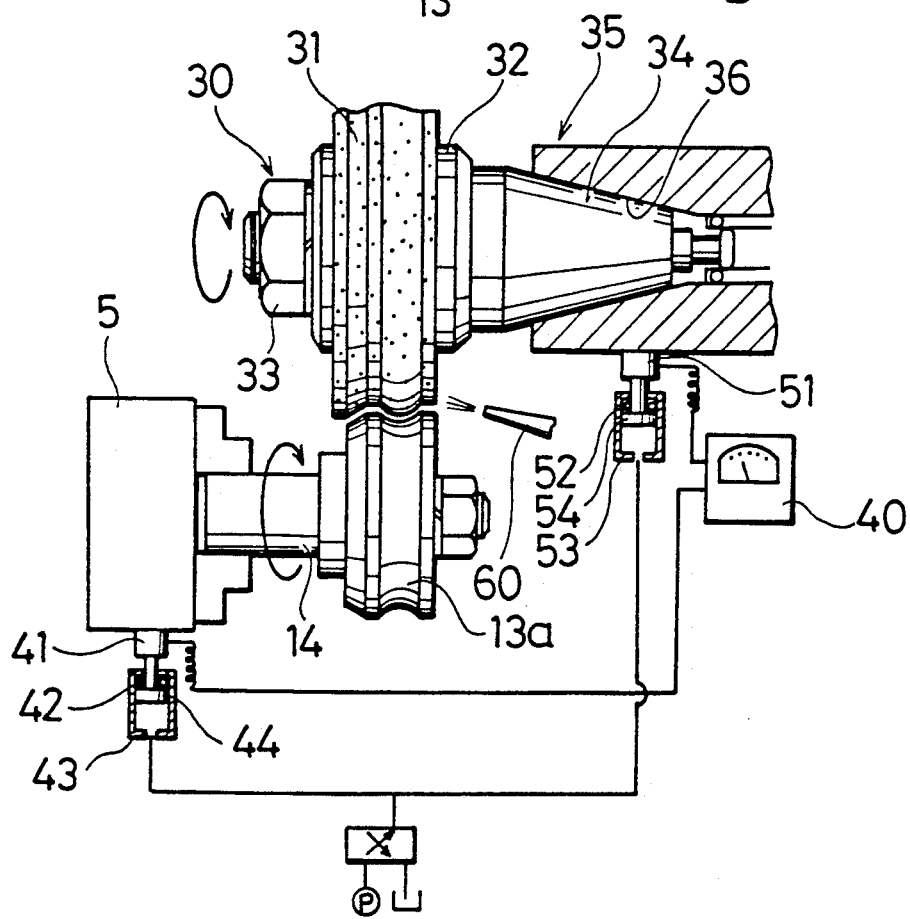
FIG. 3 is an illustration showing a state of electric discharge truing/dressing.
Figure 4:
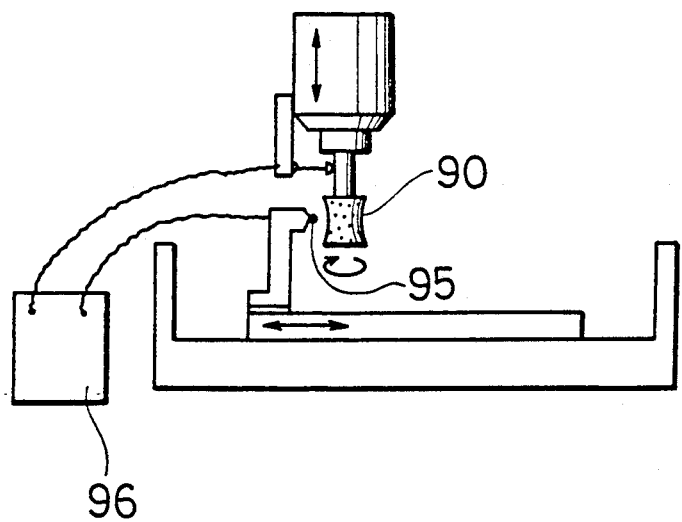
FIGS. 4 and 5 are illustrations showing the prior art.
Figure 5:
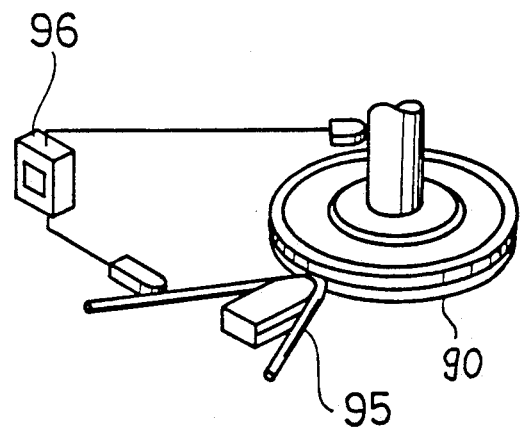

FIG. 3 illustrates an electric discharge truing state with the generated formed electrode 13a. The formed electrode 13a is held by the chuck 5 in the same manner as when generated by the bit 17, and is still mounted on the rotating shaft 14. Accordingly, axial runout of the formed electrode 13a has not occurred. Instead of the bit 17 within the tool turret, the metal bond grinding wheel 31 is brought to the use-position and is secured thereto. The metal bond grinding wheel 31 is removably secured to a flange 32 of a tool holder 30 with a nut 33. A taper shank 34 of a stationary holder is locked in a taper hole 36 of the tool spindle 35 by a fixing means, known per se.

The metal bond grinding wheel 31 according to the present embodiment is a cast iron bond diamond grinding wheel 31. That is, the metal bond grinding wheel 31 comprises diamond grains solidified with a cast iron bond. However, the present invention is not limited to this. As long as it is a metal bond grinding wheel, it may be bonded by any other suitable bonding agent. Vitrified bonding agents or resinoid bonding agents are also acceptable, if they are processed so as to have conductive property. For example, in the case of vitrified bonding agents, the porous thereof may be applied with immersion plating. In case of resinoid bonding agents, they may be mixed with conductive fibers.

Upon completion of the indexing of the metal bond grinding wheel 31, the rotating metal bond grinding wheel 31 and formed electrode 31a are gradually moved to approach each other. At this time, the metal bond grinding wheel 31 and the formed electrode 31a have a voltage applied thereto by an electric discharge machining power source device 40 through feed electricity brushes 41 and 51. The feed electricity brush 41, in this embodiment, is urged against the peripheral surface of the chuck 5. When not operating, a piston 44 is successively returned by a spring 42 disposed within a cylinder 43, and the feed electricity brush 41 and the chuck 5 are separated.

A similar mechanism is provided on the tool spindle 35. In this case, a feed electricity brush 51 is caused to contact the tool spindle 35 by a piston 54 which is actuated by oil pressure within a cylinder 53 and caused to be separated from the tool spindle 35 by a spring 52. When oil pressure acts on both the cylinders 43 and 53, the pistons 44 and 54 are actuated to contact the feed electricity brushes 41 and 51 with the chuck 5 and the spindle 35. As a result, the metal bond grinding wheel 31 and the formed electrode 31a approach each other and start electric discharge.

At this time, a machining liquid is fed from a machining liquid nozzle 60 to the outer peripheral surface of the metal bond grinding wheel 31. As a result, only the metal portion of the metal bond grinding wheel 31 is dissolved by the electric discharge and removed. As a result, only the diamond abrasive grains are embossed. The principle for removing the metal portion by the electric discharge is basically much the same to that for ordinary electric discharge machining. Upon completion of the truing and dressing machining, the metal bond grinding wheel 31 is withdrawn and returned to its original position.

Then the workpiece W held by the chuck 5 is subjected to the ordinary grinding machining. The time of the truing and dressing machining is established by judging the accuracy of the configuration of the metal bond grinding wheel 31, the finished surface of a material to be ground, detection of the grinding torque, etc., in the same manner as in the ordinary tool machine art.

Operation of the electric discharge truing and dressing apparatus will now be described in detail.

As shown in FIG. 1, the workpiece W is held by the chuck 5. The spindle is rotated in accordance with the command from the numerical control device 9, to thereby rotate the chuck 5. The tool turret 7 of the tool rest 6 is rotated to index the predetermined tool 8. The tool rest 6 is moved in the Z- and X-axis directions in order to machine the workpiece W. The workpiece W required to be ground is ground by the metal bond grinding wheel 31.

When the grinding quality of the metal bond grinding wheel 31 becomes dull, the workpiece W is removed from the chuck 5 by the loader 20 and the electrode 13 on the magazine 10 is taken out and held by the chuck 5. Then, the spindle is rotated to rotate the electrode 13. The electrode 13 is cut by the bit 17 in order to correct its configuration and runout. Thereafter, the metal bond grinding wheel 31 is indexed and approaches the formed electrode 13a. Then, oil pressure is introduced into the cylinders 43 and 53 to actuate the feed electricity brushes 41 and 51 so as to contact the chuck 5 and the tool spindle 35. An electric current passage capable state is created between the metal bond grinding wheel 31 and the formed electrode 13a, and the electric discharge machining power source 40 is actuated. As a result, both of them start an electric discharge.

Only the metal portion of the metal bond grinding wheel 31 is removed, and the truing and dressing machining is performed. Upon completion of the truing/dressing machining, the formed electrode 13a is returned to the magazine 10 by the loader 20.

The loader 20 of the preceding embodiment is specially designed for the exclusive use of the turning center of this embodiment. However, instead of the loader 20, a general purpose robot may be employed. In other words, any robot or the like may be employed as long as it has such a function as to move the electrode 13 to the chuck 5. In the preceding embodiment, the magazine 10 is provided only with the electrode 13 and workpiece W. However, the magazine 10 may be provided therein with a tool 8, such as the metal bond grinding wheel 31, so that the tool 8 on the tool turret 7 can be exchanged by the loader 20. By virtue of the foregoing arrangement, a wide range of tools 8 become usable.

Although the tool turret 7 of the above-mentioned embodiment is of the type in which the tool 8 is disposed at the outer periphery of the polygonal turret body, a chain type tool turret may be employed.

Figure 8:
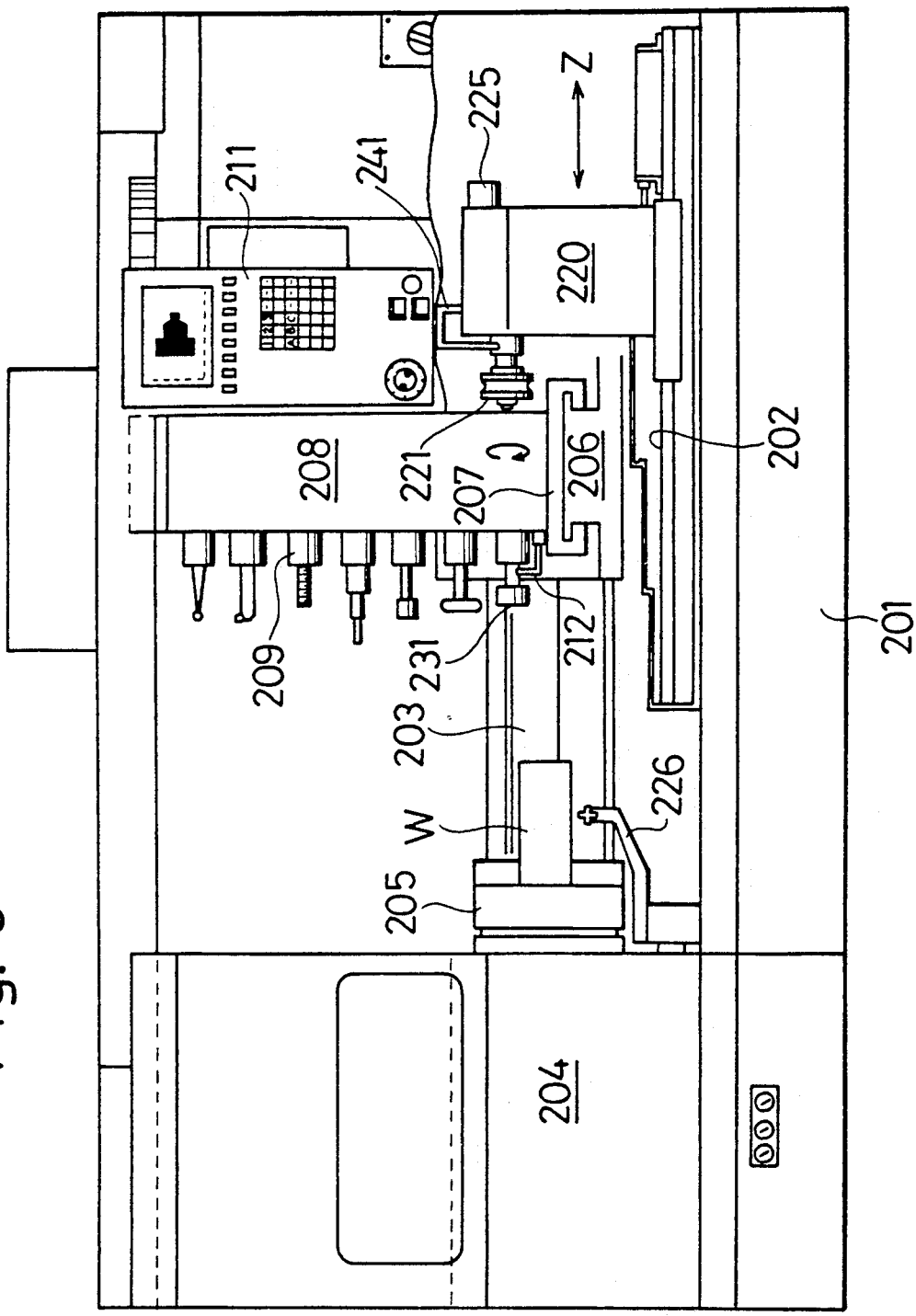
FIG. 8 is a front view showing another example of the turning center to which an electric discharge truing and dressing apparatus is applied.
Figure 11:
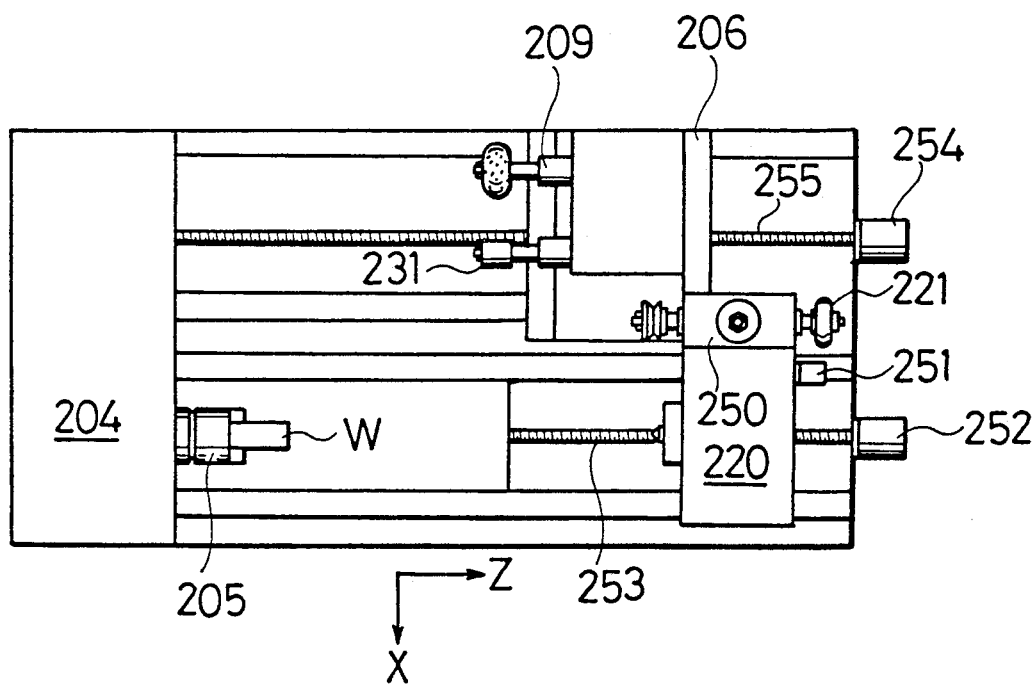
FIG. 11 is an illustration showing still another embodiment.

Referring now to FIG. 8 and FIG. 11, another embodiment of the present invention will be described. A turning center as a machining tool, as shown in FIG. 8, comprises a bed 201 constituting the body thereof, and a horizontal slide guiding surface 202 is disposed on the bed 201. The turning center further includes an inclined slide guiding surface 203 which is inclined with respect to the horizontal slide guiding surface 202. A workpiece spindle is rotatably mounted on a spindle stock 204 and is driven by a rotation driving means, such as an electric motor, known per se. The workpiece spindle is attached with a workpiece chuck 205. A workpiece W is held by the chuck 205 and fixed thereto.

The inclined slide guiding surface 203 is a guiding surface of the so-called "slant type", and is inclined with respect to the horizontal slide guiding surface 202 by certain angles. A reciprocating table 206 is slidably disposed on the inclined slide guiding surface 203 in the Z-axis direction. A cross feed table 207 is slidably disposed on the reciprocating table 206 in the direction perpendicular to the sliding direction of the reciprocating table 206. A tool magazine 208 is disposed on the cross feed table 207. The tool magazine 208 contains therein a plurality of tools 209. The tools 209 contained in the tool magazine 208 include various kinds of cutting and grinding tools for use in a turning center such as, for example, cutting bits, boring drills, shaping end mills and grinding wheels for grinding inner and outer surfaces.

In addition, instead of these ordinary grinding wheels, a metal bond grinding wheel is contained in the tool magazine 208. A touch sensor for measuring is also contained therein. These tools can be exchangeable according to necessity, such as wear, or the change of an object to be machined. The tools 209 within the tool magazine 208 are linked by a chain to form a loop (not shown). A tool 209 required for machining is indexed and brought to a tool fixing place, i.e., a machining place, by rotating the chain, and is then fixed in a machining position.

Figure 10:
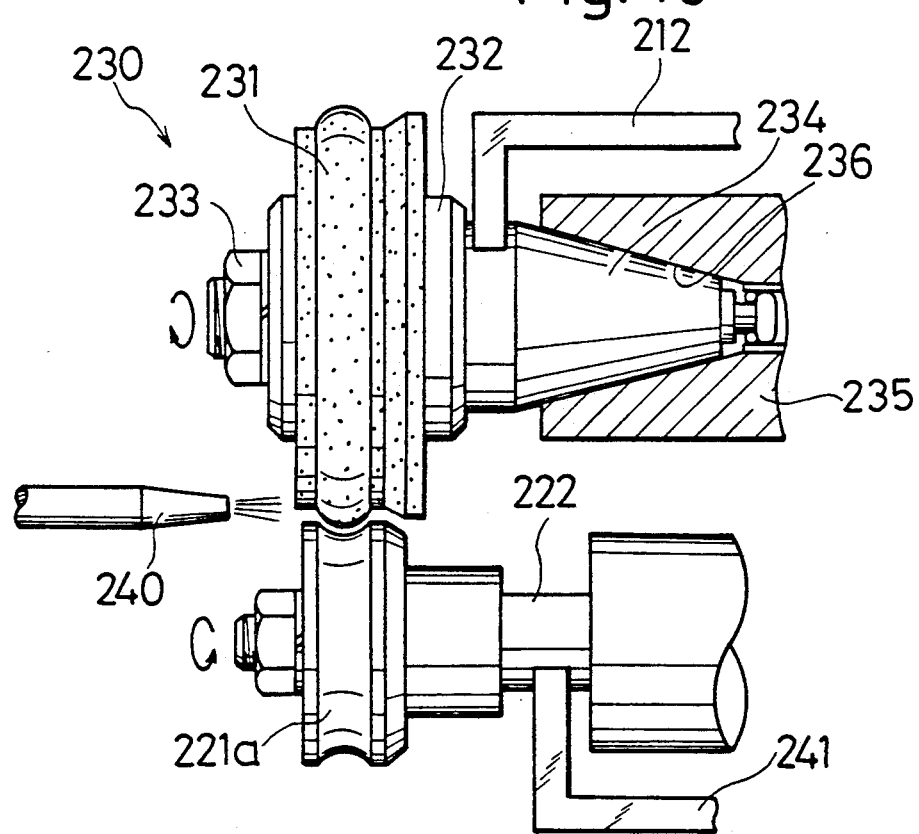
FIG. 10 is an illustration showing the state of electric discharge truing and dressing.

The movements of these components are controlled by a numerical control apparatus 211. In this embodiment, a tool, when used for machining, is indexed and fixed to the lowermost end of the tool magazine 208. A feed electricity brush 212 is placed on the cross feed table 207 as shown in FIG. 10. The feed electricity brush 212 is adapted to electrically convert the cross feed table 207 and the tool 209. When the tool 209 has been fixed to the afore-mentioned machining position, the brush portion of the feed electricity brush 212 is contacted with the tool 209. The feed electricity brush 212 is moved into contact with the tool 209 and separated from the tool 209 by a driving device (not shown).

This driving device uses a driving means, such as a solenoid, air pressure and oil pressure, known per se. The driving means is driven in accordance with the commands of the numerical control device 211 only when the tool 209, which has been indexed to a held position, requires an electric connection, as will be described. A tailstock 220 is disposed on the bed 201 at a position opposite the spindle stock 204. The tailstock 220 is slidable on the horizontal slide guiding surface 202 in the direction parallel to the axis of the spindle. It is driven by a hydraulic cylinder, a feed screw driving device, etc.

The tailstock 220 is provided with an ordinary machining center and an electrode 221. The electrode 221 is fixed to an upper portion of the tailstock 220 by a holding means such as a socket. The electrode 221 is rotated about the axis thereof by an electric motor 225. The tailstock 220 is driven by its driving device and moved to the fixed position of the metal bond grinding wheel 231 to perform the truing and dressing machining based on the afore-mentioned principle. Instead of moving the tailstock 220, the reciprocating table 206 may be moved to the position of the tailstock 220 when the truing and dressing machining is to be performed.

Figure 9:
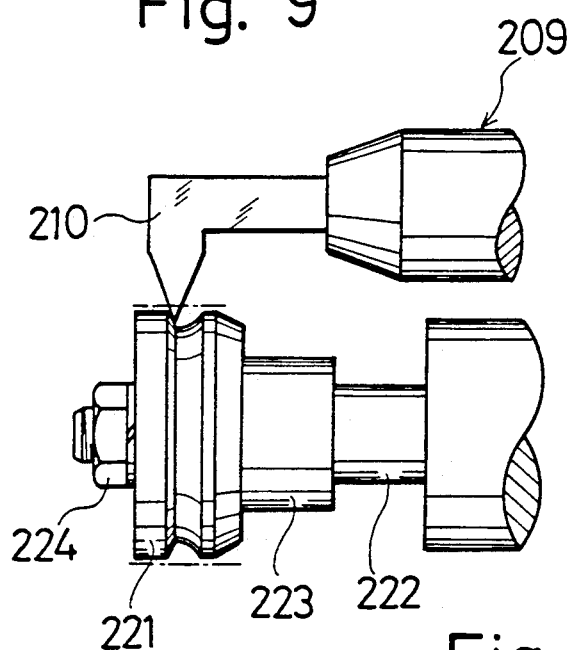
FIG. 9 is an illustration in which an electrode is being cut.

FIG. 9 illustrates the electrode 221 being cut by the bit 210. The electrode 221 is of a cylindrical shape and made of a conductive material, such as black lead and copper. The electrode 221 is secured to a flange 223 formed on a rotating shaft 222 by tightening a nut 224, and is thus fixed to the rotating shaft 222. When the electrode 221 is to be exchanged, the electrode 221 is removed from the flange 223 by untightening the nut 224. Otherwise, the structure of the rotating shaft 222 can be held by a tool chuck, so that the electrode 221 can be removed and exchanged.

The rotating shaft 222 is rotated by reducing the rotating speed of the motor 225, or by being directly connected to the motor 225. When the tool 209 of the tool magazine 208 has been indexed to the machining position and fixed thereto, the cutting bit 210 cuts the outer periphery of the electrode 221. The electrode 221 is cut into a desired formed electrode 221a by the numerical control apparatus 211. In other words, the formed electrode 221a is generated into a configuration where the projection and the depression or irregularities are exhibited in the opposite way as those of the metal bond grinding wheel which is to be subjected to the truing and dressing machining.

FIG. 10 illustrates one state of the electric discharge truing and dressing machining by the generated formed electrode 221a. The electrode 221a is still mounted on the rotating shaft 222, as when generated. Instead of the bit 210, a metal bond grinding wheel 231 is indexed to the use position and fixed thereto. The metal bond grinding wheel 231 is removably secured to a flange 232 of a tool holder 230 by a nut 233. A taper shank 234 of the fixing holder is locked to a taper hole 236 of a tool spindle 235 by a fixing means, known per se. Of course, the connection of the tool is not limited to the use of a taper shank as in this embodiment. Alternatively, a straight shank may be used as the connection of the tool.

The metal bond grinding wheel 231 according to the present embodiment is a cast iron bond diamond grinding wheel. That is, the metal bond grinding wheel 231 comprises diamond grains solidified with a cast iron bond. However, the present invention is not limited to this. As long as it is a metal bond grinding wheel, it may be bonded by any other suitable bonding agent. Vitrified bonding agents or resinoid bonding agents are also acceptable if they are processed so as to have conductive properties. For example, in the case of vitrified bonding agents, the porous portion thereof may be applied with immersion plating. In the case of resinoid bonding agents, they may be mixed with conductive fibers so as to provide conductive properties.

Upon completion of the exchange of the metal bond grinding wheel 231, the rotating metal bond grinding wheel 231 and formed electrode 221a are gradually moved toward each other. At this time, the metal bond grinding wheel 231 and the formed electrode 221a have a voltage applied thereto by an electric discharge machining power source device (not shown) through feed electricity brushes 212 and 241. Therefore, when the metal bond grinding wheel 231 and the formed electrode 221a approach each other, they start electrically discharging therebetween. At this time, a machining liquid is fed from a machining liquid nozzle 240. As a result, only the metal portion of the metal bond grinding wheel 231 is dissolved by the electric discharge and removed. As a result, only the diamond abrasive grains are embossed. This principle is basically much the same as that of ordinary electric discharge machining.

Upon completion of the truing and dressing machining, the metal bond grinding wheel 231 is withdrawn and returned to its original position, and the formed electrode 221a is also withdrawn and returned to its original position. Then the workpiece W is held by the chuck 205 is subjected to ordinary grinding machining.

The time of the truing and dressing machining is established by judging the accuracy of the configuration of the metal bond grinding wheel 231, the finished surface of a material to be ground, detection of the grinding torque, etc., in the same manner as in the ordinary machine tool art.

Operation of the electric discharge truing and dressing apparatus according to the present embodiment will now be described in detail.

The workpiece W held by the workpiece chuck 205 is rotated. The reciprocating table 206 is moved on the side guiding surface 203 and the workpiece W is ground by the metal bond grinding wheel 231 within the tool magazine 208 of the reciprocating table 206. When the metal bond grinding wheel 231 is subjected to the truing and dressing machining, the bit 210 within the tool magazine 208 is indexed. The reciprocating table 206 is moved to bring the bit 210 to the position of the electrode 221. With the bit 210, the electrode 221 on the tailstock 220 is cut and the formed electrode 221 is generated.

When the generating machining of the formed electrode 221 is over, the bit 210 within the tool magazine 208 is withdrawn and the metal bond grinding wheel 231 is indexed. The metal bond grinding wheel 231 and the formed electrode 221a are relatively rotated by the grinding machining motor and the electric motor 225. They approach each other and have a voltage applied to a space between them so as to discharge electricity. The metal portion of the metal bond grinding wheel 231 is removed by the electric discharge, and the dressing and truing machining has been performed.

FIG. 11 is a plan view showing a modified embodiment of the electrode 221 of the above-mentioned embodiment. The tailstock 220 is provided at its side surface with an electrode turret 250. The electrode turret 250 is provided on its peripheral surface with a plurality of electrodes 221. The electrode turret 250 is indexed and the electrodes 221 themselves are rotated by the driving motor 251. When the electric discharge dressing and truing machining is performed, the tailstock 220 is moved in the Z-axis direction by rotating a feed screw 253 with a tailstock driving motor 252. Otherwise a Z-axis driving motor 254 is driven to rotate a feed screw 255 to thereby move the reciprocating table 206 in the Z-axis direction. by the movement of the tailstock 220 or the reciprocating table 206, the metal bond grinding wheel 231 and the formed electrode 221a are subjected to the electric discharge dressing and truing machining. The electrode is also subjected to the configuration machining in the same manner as in the above-mentioned embodiment.

Figure 6:
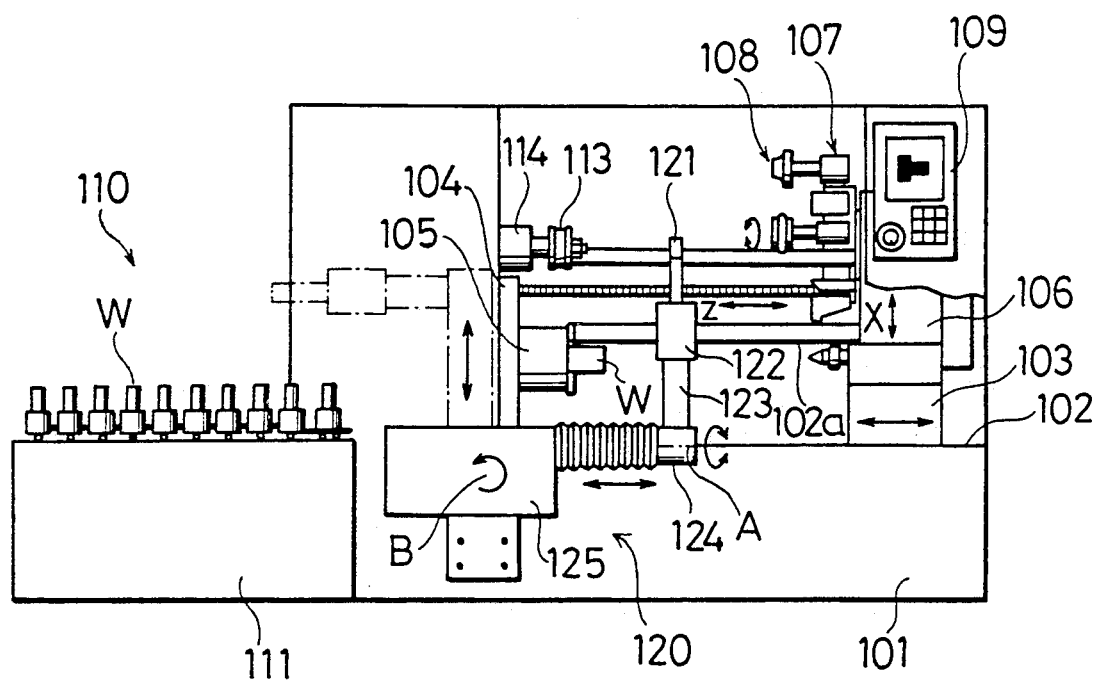
FIG. 6 is a front view showing a modified embodiment of the turning center to which an electric discharge truing/dressing apparatus is applied.
Figure 7:
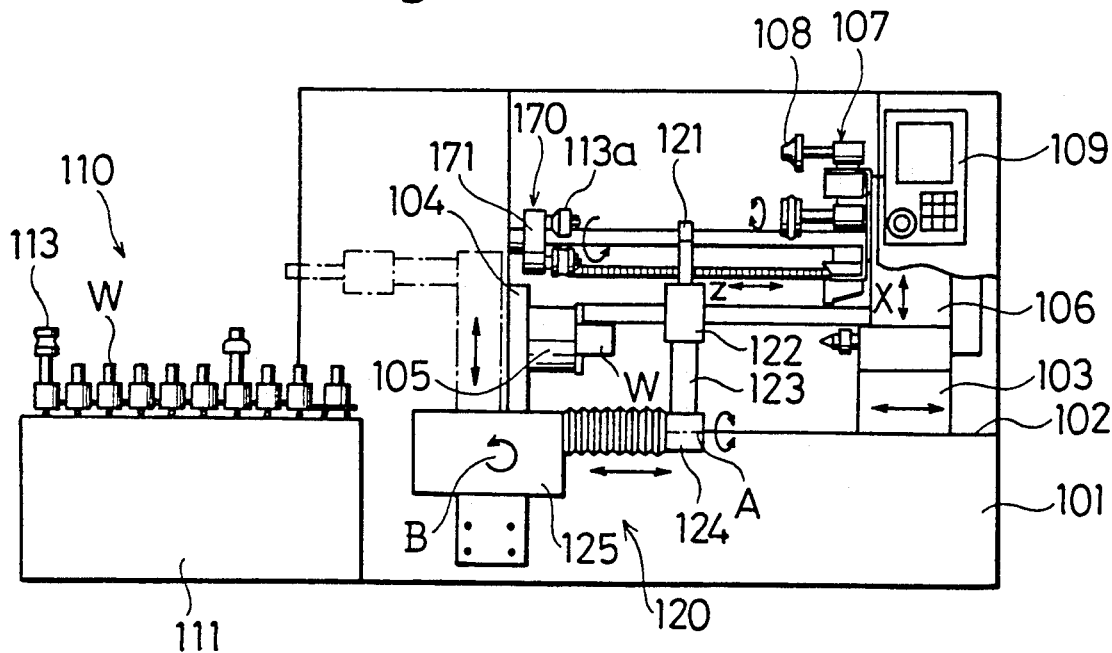
FIG. 7 is a front view showing another embodiment.

Referring now to FIGS. 6 and 7, another embodiment of the present invention will be described. A turning center as a machining tool has a bed 101 constituting its body as shown in FIG. 6. The bed 101 is provided thereon with a horizontal slide guiding surface 102. A main spindle stock 104 is rotatably provided with a workpiece spindle. This workpiece spindle is driven by a rotation driving means, such as an electric motor, known per se. The workpiece spindle is provided with a workpiece chuck 105. A workpiece W is held by the workpiece chuck 105 and fixed thereto.

A tailstock 103 is slidably disposed on the horizontal slide guiding surface 102 for movement in the Z-axis direction. A tool rest 106 is slidably disposed on an inclined slide surface 102a, i.e., a slant surface which is inclined at certain angles with respect to the horizontal slide guiding surface 102. The directions of movement of the tool rest 106 are in the longitudinal and transversal directions, i.e., the Z- and X-axis directions. The tool rest 106 is provided thereon with a tool turret 107 disposed around a tool turret shaft. The tool turret 107 is provided with a plurality of tools 108 stored around the turret. The tools 108 stored in the tool turret 107 include cutting or grinding tools for the use of the turning center such as, for example, a machining bit, a boring drill, a shaping end mill and a grinding wheel for grinding an inner or outer peripheral surface.

Furthermore, instead of the ordinary grinding wheels, a metal bond grinding wheel for grinding a hard material such as ceramics is stored therein. In addition, a measuring touch sensor, etc. are also stored in the tool turret 107. These tools 108 are exchangeable according to necessity, e.g. due to wear, change of a workpiece or the like. The tools 108 stored within the tool turret 107 are rotationally driven so that a required tool will be indexed to a tool fixing place and secured thereto for use.

The movements of the above components are controlled by a numerical control apparatus 109. Adjacent to the bed 101 is located a magazine 110 for containing workpiece W. On the magazine table 111, a plurality of workpieces W are connected in a loop shape. The loop is connected to a driving device, and the workpiece W at the required place is indexed according to the commands from the numerical control apparatus 109. The holders of the workpieces W are each assigned with magnetic and mechanical identification marks. The kinds of the workpieces W are stored in a memory within the numerical control apparatus 109. The required workpiece W is called with reference to the identification marks and the data stored within the memory.

A loader 120, adapted to take out a workpiece W within the magazine 110 and transfer it to the chuck 105, is located at the front surface of the bed 101. The loader 120 is provided at its foremost end with a holding nail 121. The holding nail 121 opens and closes a plurality of its fingers with a holding nail driving means 122, e.g. using oil pressure, so as to hold or release the workpiece W. The holding nail 121 is disposed at the foremost end of a swing arm 123. The swing arm 123 is secured to one end of a pivot shaft 124. The pivot shaft 124 is disposed at a loader body 125.

The pivot shaft 124 is pivoted about the pivot axis A within the loader body 125 and is reciprocally moved in the direction of the pivot axis. The loader body 125 is swung by 90 degrees about an axis B vertical to the pivot axis A of the pivot shaft 124. When swung, the loader body 125 and the pivot shaft 124 are brought to the position shown by the chain line. An electrode holder 114 adapted to hold the electrode 113 is rotatably disposed on the main spindle stock 104 at the upper portion of the chuck 105. The electrode holder 114 is rotated by the rotation driving device (not shown). The cutting of the electrode 113 and the dressing of the metal bond grinding wheel 31, which is performed thereafter, are performed in the same manner as in FIGS. 2 and 3.

FIG. 7 illustrates still another embodiment of the electrode holder 114, in which an electrode turret 170 is disposed. A turret body 171 is provided on its outer periphery with a plurality of electrodes 113. The turret body 171 is capable of rotationally indexing, whereas the electrode 113 is capable of rotation. A plurality of formed electrodes 113a having various configurations can be stored. The loader 120 of the above-mentioned embodiment is for the exclusive use of the turning center of the present embodiment. However, instead of the loader 120, a general purpose robot may be employed, as is apparent from the foregoing description. In other words, any robot or the like may be employed as long as it has a function as to move the workpiece W from the magazine 110 to the chuck 105.

Hereafter, other embodiments of the present invention will be described, according to FIGS. 12 through 39.

A complex machine tool 301 has a machine body 302 as shown in FIG. 14, and a bed 303 is provided on the machine body 302. A carrier 306, which is comprised of a tool rest 306, is supported being free to move and drive along the bed 303 in the directions as shown by the arrows XA and XB (that is, in the Z axis direction) on the bed 303. The tool rest 306 has a main body 306b, as well as the carrier 306a. That is, on the carrier 306a, the main body of the tool rest 306b is provided being free to move and drive in a direction perpendicular (that is, the directions as shown by arrows XC and XD in FIG. 13) to the directions as shown by the arrows XA and XB (that is, the Z axis direction). And, a tool holding portion 306d is provided on the main body of the tool rest 306b as shown in FIG. 14. A chain type tool magazine 306c is provided on the main body of the tool rest 306b, selectively supplying tools to the tool holding portion 306d. Since the tool rest 306 having the chain type tool magazine 306c and the tool holding portion 306d and the like are already known, a detailed description thereof is omitted here.

A lot of tools 347 are installed in the chain type tool magazine 306c. Among the tools 347 are grinding tools 347A, 347B, 347C and the like, which are different kinds of grinding tools. The grinding tools 347A, 347B and 347C will be explained hereunder.

Figure 36:
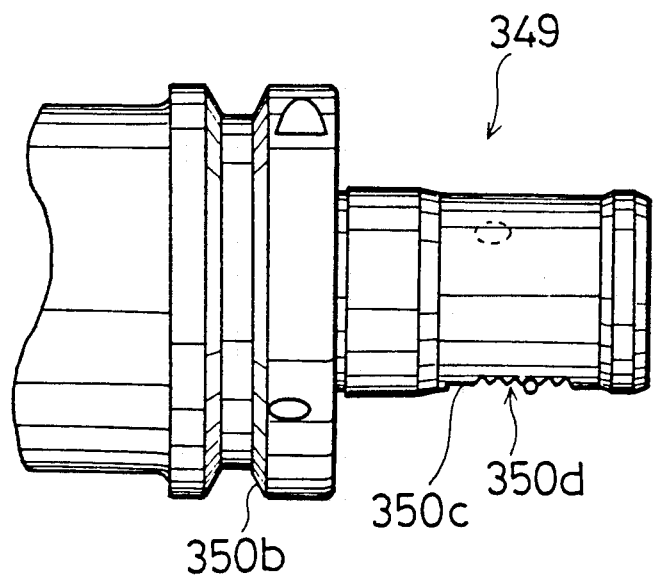
FIG. 36 is a view showing the shank portion of the grinding tool of FIG. 33.

The grinding tool 347A has a grinding stone holder 349 formed in a hollow state, as shown in FIG. 33, and the grinding stone holder 349 has a main body 350. An annular holding groove 350b is formed on the outer circumferential face of the main body 350. A serration groove 350d is provided at the shank portion 350c of the main body 350, as shown in FIG. 36. And, a grinding stone holding shaft 351 is rotatably supported via plural bearings 352 with an axis center XCT3 of the grinding stone holding shaft 351 as its center in the directions as shown by the arrows XP and XQ in the main body 350, as shown in FIG. 33. A connecting groove 351a capable of engaging with a rotation shaft (not shown) provided at the tool holding portion 306d is formed at the right edge portion of the grinding stone holding shaft 351 in the figure.

A grinding stone holding portion 351b is provided so as to project toward the left in the figure in comparison with the main body 350 with the grinding stone holding shaft 351 as shown in FIG. 33, and a holding face 351d is formed at the grinding stone holding portion 351b. A female screw 351e is formed in the axis center XCT3 of the grinding stone holding shaft 351. And, a clamping member 353 is connected with the grinding stone holding portion 351b by fitting a screw portion 353a in the female screw 351e. A grinding stone 355 is formed as a disk and is installed on the grinding stone holding portion 351b free to be detached and attached to be held between the clamping member 353 and the holding face 351d. An electrode connecting groove 355b is formed at a boss 355a of the grinding stone 355 along the outer circumferential face of the boss 355a in a direction perpendicular to the directions as shown by the arrows XA and XB, which are directions of the dressing and truing of the grinding stone 355.

Figure 37:
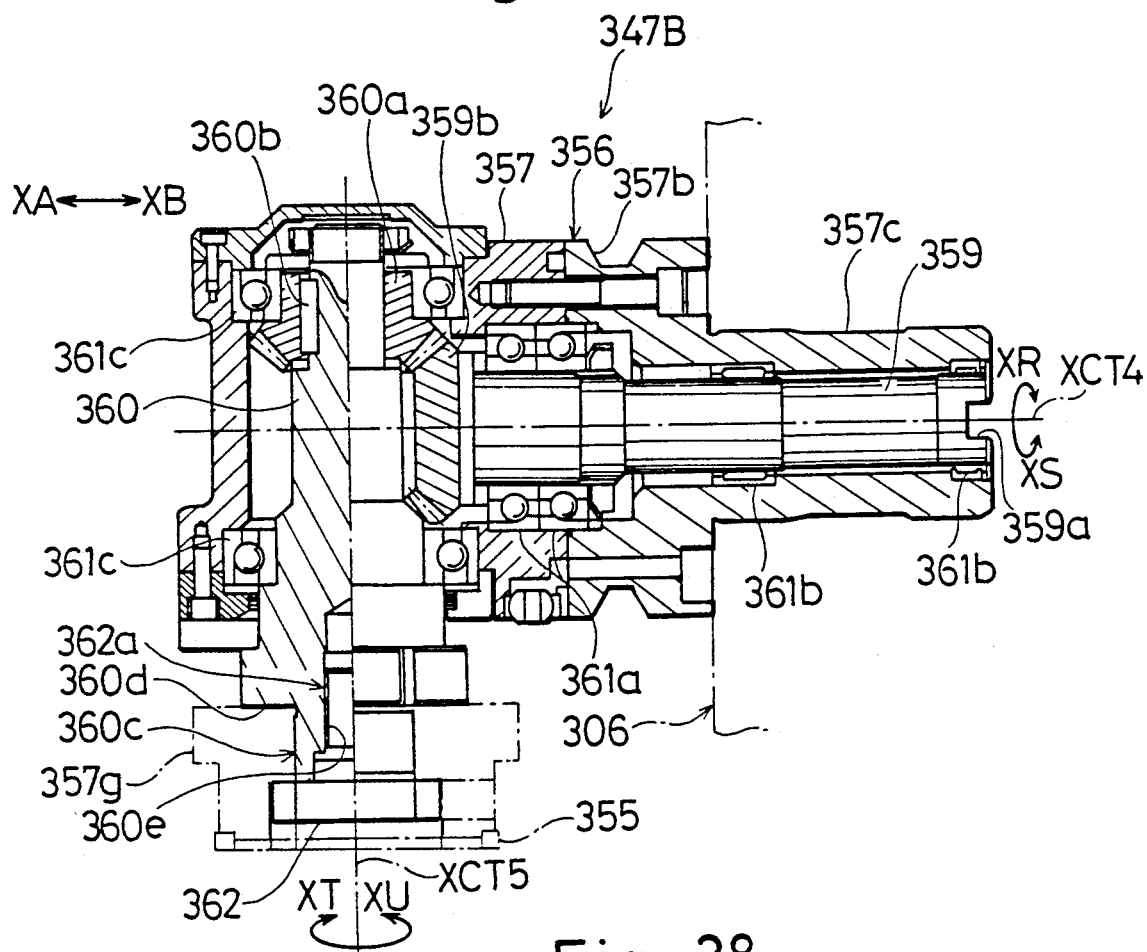
FIG. 37 is a front elevation for showing another example of a grinding tool being installed in the tool rest of the complex machine tool as shown in FIG. 14.
Figure 38:
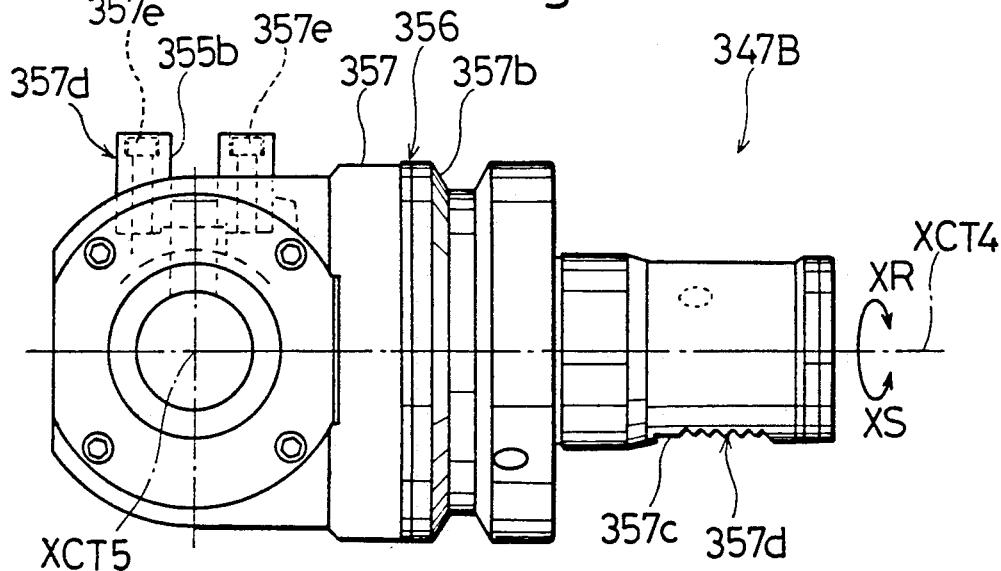
FIG. 38 is a top view of FIG. 37.

The grinding tool 347B has a grinding holder 356 as shown in FIG. 37, and the grinding holder 356 has a main body 357 formed in the shape of an elbow. A holding groove 357b is formed along the outer circumferential face of the main body 357. And, a serration groove 357d is formed at a shank portion 357c of the main body 357 as shown in FIG. 38. An electrode connecting member 357f, composed of insulating material, is fixed to the main body 357, as shown in FIG. 38, via bolts 357e. An electrode connecting groove 355b is formed at the electrode connecting member 357f at a predetermined angle (90 degrees in the present embodiment) to the directions as shown by the arrows XA and XB (the directions of the dressing and truing of the grinding stone 355 described hereinafter).

A connecting shaft 359 is inserted and supported to be free to rotate in the main body 357, as shown in FIG. 37, via bearings 361a, 361b and the like, about a center axis XCT4 in the directions as shown by the arrows XR and XS. A connecting groove 359a capable of engaging with a rotation shaft (not shown) provided at the tool holding portion 306d is formed at the right edge portion of the connecting shaft 359 a bevel gear 359b is installed on the left end portion of the connecting shaft 359 in FIG. 37.

A grinding stone holding shaft 360 is inserted and supported in the main body 357 to be free to rotate about a center axis XCT5 in the directions as shown by arrows XT and XU via bearings 361c. The center axis XCT5 of the holding shaft 360 is perpendicular to the center axis XCT4 of the connecting shaft 359. A bevel gear 360a is installed on the upper end portion of the grinding stone holding shaft 360 in the figure via a key 360b. The bevel gear 360a meshes with the above-described bevel gear 359b to be free to rotate in the directions as shown by the arrows XT and XU. And, a grinding stone holding portion 360c is provided at the lower end portion of the grinding stone holding shaft 360 in FIG. 37, projecting downwardly in the figure in comparison with the main body 357. A holding face 360d is formed at the grinding stone molding portion 360c. Moreover, a female screw 360e is formed along the center axis XCT5 of the grinding stone holding shaft 360 in the grinding stone holding portion 360c. A clamping member 362 is connected with the grinding stone holding portion 360c by fitting a screw portion 362a in the female screw 360e. And, the grinding stone 355, having an annular ring form, is installed on the grinding stone holding portion 360c so as to be held between the clamping member 362 and the holding face 360d.

Figure 39:
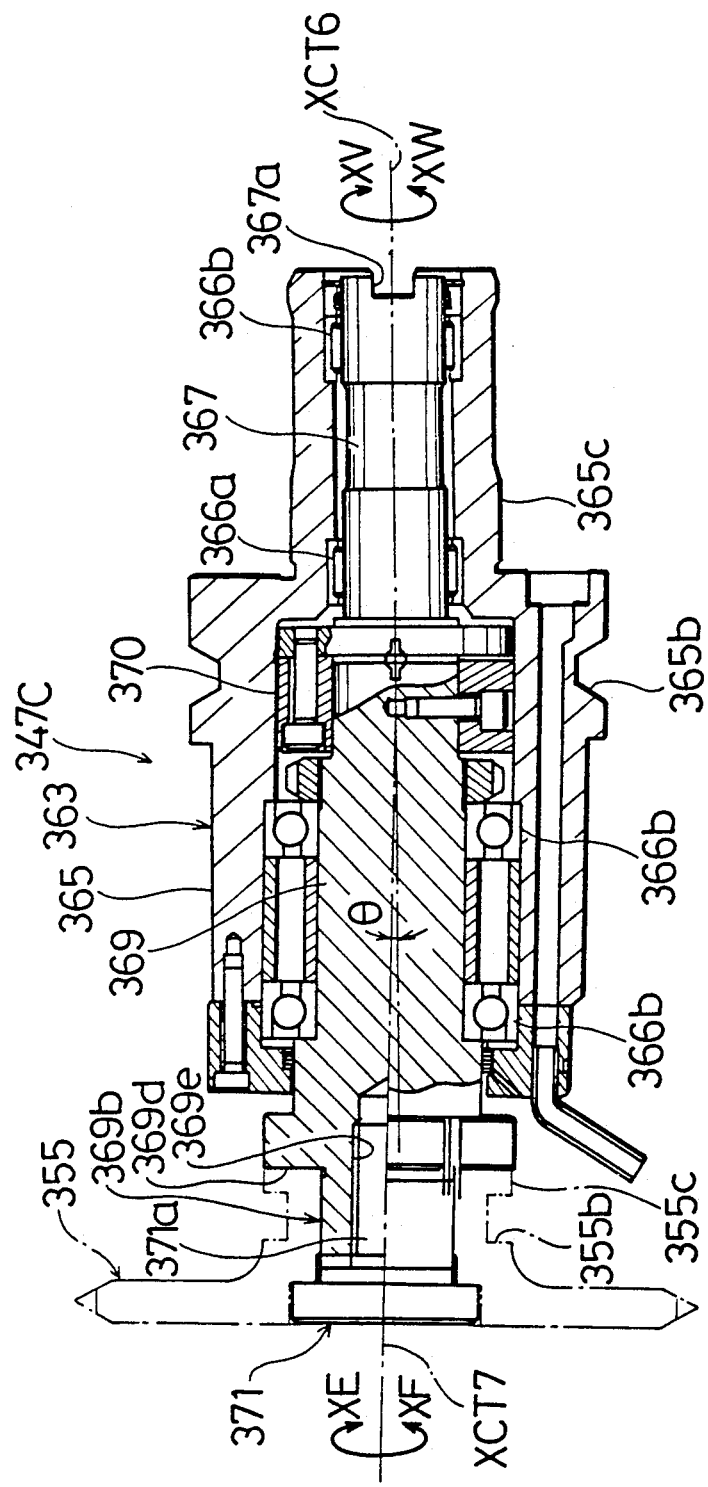
FIG. 39 is a front elevation showing another example of a grinding tool being installed in the tool rest of the complex machine tool as shown in FIG. 14.

A grinding tool 347C has a grinding stone holder 363 formed in a hollow state as shown in FIG. 39, and the grinding stone holder 363 has a main body 365. A holding groove 365b is formed along the outer circumferential face of the main body 365. And, a serration groove (not shown) is formed at a shank portion 365c of the main body 365. A connecting shaft 367 is rotatably inserted in the main body 365 as shown in FIG. 39 via bearings 366a, with a center axis XCT6 of the connecting shaft 367 as its center, rotatable in the directions as shown by the arrows XV and XW. A connecting groove 367a is formed at the right end portion of the connecting shaft 367 in the figure.

A grinding stone holding surface 369 is inserted and supported in the main body 365 via bearings 366b, being free to rotate around a center axis XCT7 in the directions as shown by the arrows XE and XF. The center axis XCT7 of the holding shaft 369 is given a slop with a predetermined angle Θ to the center axis XCT6 of the connecting shaft 367. The grinding stone holding shaft 369 connects with the above-described connecting shaft 367 via a flexible joint 370. And, a grinding stone holding portion 369 is provided on the grinding stone holding shaft 369, projecting toward the left in FIG. 39 in comparison with the main body 365. A holding face 369d is formed at the grinding stone holding portion 369b. A female screw 369e is formed in the grinding stone holding portion 369b in the direction of the center axis XCT7 of the grinding stone holding shaft 369. And, a clamping member 371 is connected with the grinding stone holding portion 369b by fitting a screw portion 371a in the female screw 369e. A grinding stone 355 having an annular ring form is installed in the grinding stone holding portion 369b as shown in FIG. 39 so as to be held between the clamping member 371 and the holding face 369d. An annular electrode connecting groove 355b is formed at a boss 355c of the grinding stone 355 along the outer circumferential face of the boss 355c at 90 degrees to the directions as shown by the arrows XA and XB (the directions of dressing and truing of the grinding stone 355).

A spindle stock 307 is provided at the left side of the machine body 302 in FIG. 14. A chuck 309 is installed on the spindle stock 307 via a spindle (not shown) free to rotate and drive. A workpiece 341 is held by the chuck 309 the workpiece being freely detachable therefrom.

Figure 12:
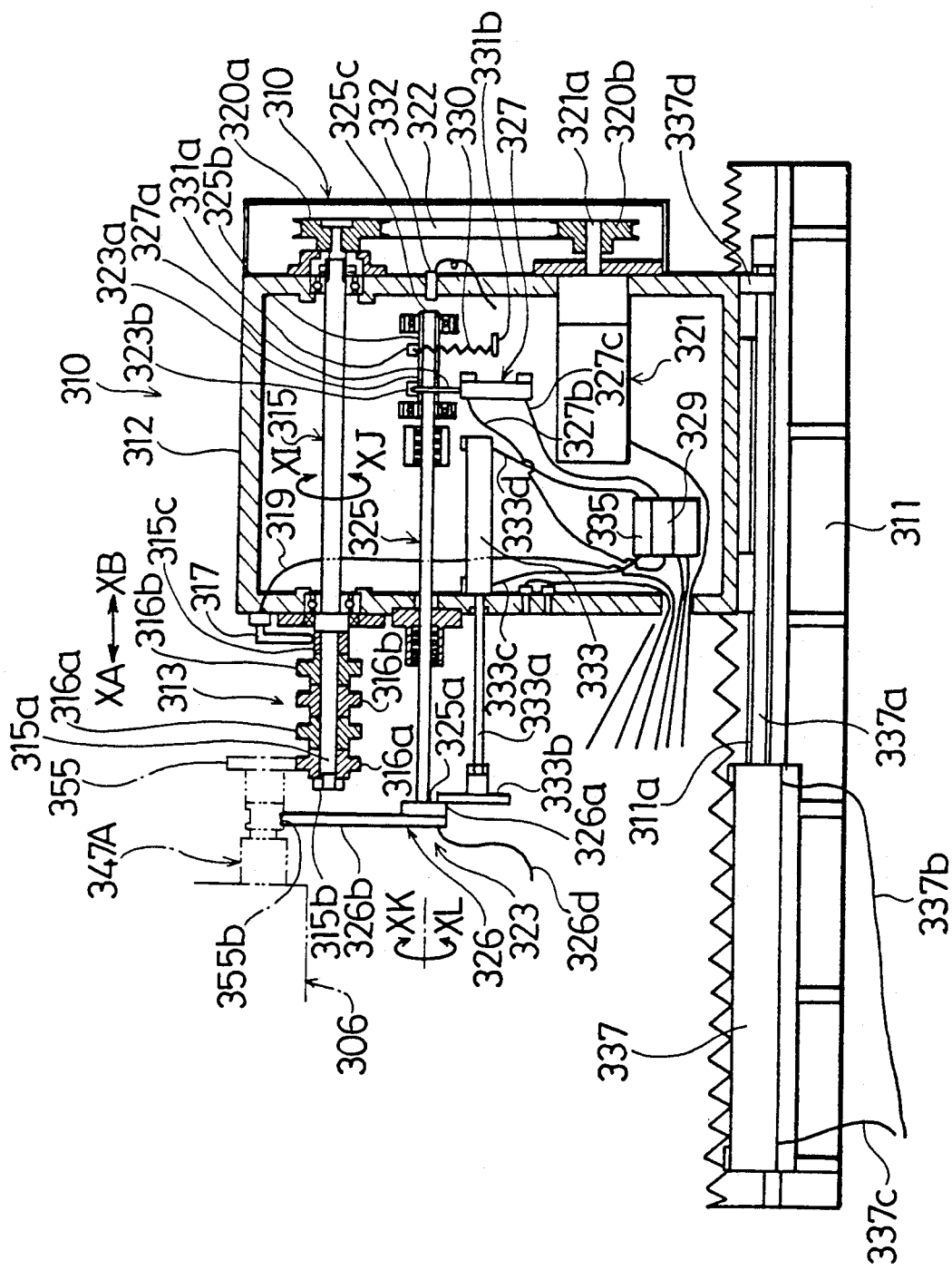
FIG. 12 is a back elevation of a dressing apparatus as shown in FIG. 14.

A dressing apparatus 310 according to the present invention is provided at the machine body 302, as shown in FIG. 14. The dressing apparatus 310 has a base 311, a main body 312, a driving cylinder 337 and the like as shown in FIG. 12. That is, the base 311 is provided on the machine body 302 elongated in the directions as shown by the arrows XA and XB (that is, the Z axis direction). That main body 312 is disposed on the base 311 via guide rails 311a on the base 311, being free to move in the directions as shown by the arrows XA and XB (that is, the Z axis direction). A machining electrode portion 313 is provided at the main body 312 as shown in FIG. 12. The machining electrode portion 313 has a supporting shaft 315, machining electrodes for finishing machining and rough machining 316a and 316b, a driving motor 321 and the like.

The supporting shaft 315 is mounted on the main body 312 as shown in FIG. 12 via the plural number of bearings and the like on a center axis parallel with the directions as shown by the arrows XA and XB (that is the Z axis direction). And, the supporting shaft 315 is rotatably provided in the directions as shown by the arrows XI and XJ. An electrode supporting portion 315a is formed on the supporting shaft 315 projecting in the direction as shown by the arrow XA. An initial power receiving annular ring 315c is fixed to the right end portion of the electrode supporting portion 315a in the figure. And, the machining electrodes 316a, being composed of copper for finishing truing and dressing, and the machining electrodes 316b being composed of black lead for rough truing and dressing, are installed on the electrode supporting portion 315a so as to be pushed toward the initial power receiving ring 315c by means of a clamping member 315b in series in the directions as shown by the arrows XA and XB. An electrode 317 is slidably connected with the initial power receiving ring 315c. The electrode 317 is connected with an electric discharge unit (not shown) via a feed cable 319.

A pulley 320a is installed on the right end portion of the supporting shaft 315. The driving motor 321 is provided at the lower end portion of the main body 312 in the figure, spaced a predetermined distance from the supporting shaft 315. A driving shaft 321a is rotatably supported by the driving motor 321. A pulley 320b is installed on the driving shaft 321a. A belt 322 having no edge is provided, stretched between the pulley 320a installed on the supporting shaft 315 and the pulley 320b.

Figure 13:
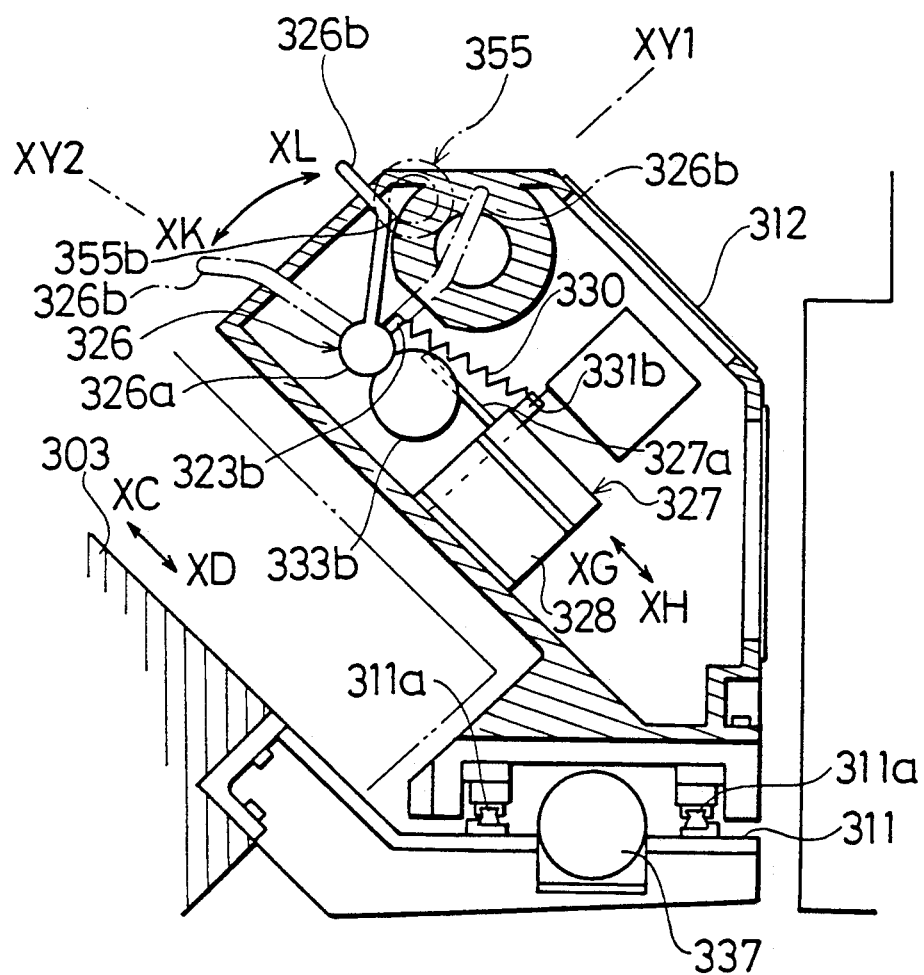
FIG. 13 is a left side elevation of FIG. 12.
Figure 35:
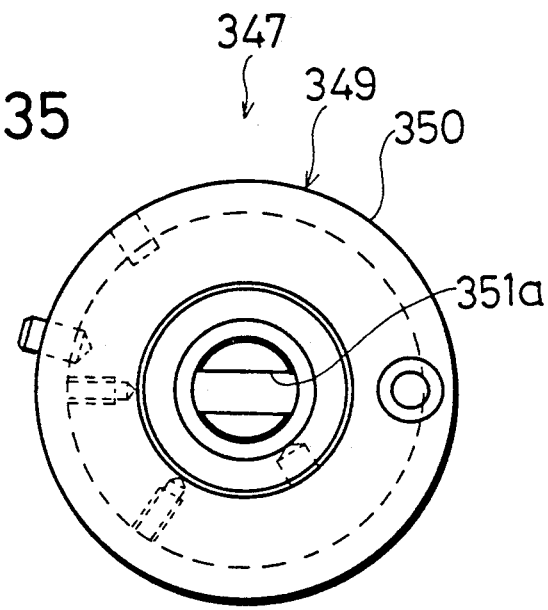
FIG. 35 is a right side elevation of the FIG. 33.

An electric feed mechanism for a tool 323 is provided on the main body 312 as shown in FIG. 12. The electric feed mechanism for tool 323 has a supporting cylinder 323a, a rotating shaft 325, a rotatable cylinder 327, a positioning cylinder 333 and the like. That is, the supporting cylinder 323a, being formed in a hollow state, is provided with the main body 312 so as to be free only to rotate in the directions as shown by the arrows XK and XL via the plural number of bearings and the like. An engaging member 323b is provided at the outer circumferential face of the supporting cylinder 323a as shown in FIG. 13. The rotating shaft 325 is inserted and supported in the supporting cylinder 323a via a sliding means (not shown), such as a key being free to move in the directions as shown by the arrows XA and XB (that is, the Z axis direction) only. A tool electrode 326 is installed on a left end portion 325a of the rotating shaft 325 via a boss 326a. An electrode bar 326b, formed in the shape of an elbow, is provided at the boss 326a for engaging and contacting the above-described grinding tool 347A and the like as shown in FIG. 13.

The rotatable cylinder 327 is provided at the lower portion of the supporting cylinder 323a on the main body 312 in FIG. 13 via a base 328. A rod 327a is supported by the rotatable cylinder 327, free to project and withdraw in the directions as shown in the arrows XG and XH in FIG. 13. And, the cylinder 327 is connected with a solenoid valve 329 via tubes 327b and 327c as shown in FIG. 15. The solenoid valve 329 connects with a compressed air supply means (not shown).

A spring 330 is provided stretching between the base 328 and the supporting cylinder cylinder 323a via supporting blocks 331a and 331b. The supporting cylinder 323a (that is, the rotating shaft 325) is always energized by the spring 330 in the direction as shown by the arrows XL. A rotating shaft terminal acknowledge sensor 332 is provided on the main body portion 312, spaced a predetermined distance from the right end 325c of the rotating shaft 325 on the right side in FIG. 12.

A positioning cylinder 333, which an electric feed mechanism for tool 323 comprises, is provided on the main body 312 as shown in FIG. 12 spaced a predetermined distance from the rotating shaft 325 in the lower portion of the figure. A rod 331a is supported by the positioning cylinder 333, and is free to project and withdraw in the directions as shown by the arrows XA and XB (that is, the Z axis direction). A disc shaped pressure plate 333b is provided on the end portion of the rod 333a such that the above-described tool electrode 326 is pressured in the direction as shown by the arrow XA. A solenoid valve 335 is connected with the positioning cylinder 333 via tubes 333c and 333d as shown in FIG. 15. The solenoid valve 335 connects with a compressed air supply source (not shown) via a tube 345.

On the other hand, a cylinder 337, which the dressing apparatus 310 comprises, is provided between guide rails 311a on the base 311 as shown in FIG. 13. A rod 337a is supported by the cylinder 337, being free to project and withdraw in the directions as shown by the arrows XA and XB (that is, the Z axis direction). The end portion of the rod 337a in FIG. 12 connects with the lower portion of the main body 312 in the figure via a connecting member 337d. A solenoid valve 339 is connected with the cylinder 337 via tubes 337b and 337c as shown in FIG. 15. The solenoid valve 339 connects with a compressed air supply source (not shown) via the tube 345.

With the above-described constitution of the complex machine tool 301, grinding machining is performed on the workpiece 341 by using the complex machine tool 301 as follows. That is, the workpiece 341 to be machined is installed in the spindle stock 307 as shown in FIG. 14 via the chuck 309. And, the chain tool magazine 306c of the tool rest 306 is properly rotated to supply the grinding tool 347A to be used for machining to the tool holding portion 306d provided with the tool rest man body 306b from the plural number of tools 347 installed in the magazine 306c.

Thereafter, the workpiece 341 is rotated by the chuck 309 in such a manner that the grinding stone 355 of the grinding tool 347A, as shown in FIG. 33, is rotated, and the spindle, which isn't shown in the figure, is driven. In this state, the tool rest main body 306b is moved a predetermined distance along the carrier 306a together with the grinding tool 347A in the direction as shown by the arrow XD in FIG. 14, and the carrier 306b is properly moved and driven along the bed 303 in the directions as shown by the arrows XA and XB. Then, the workpiece 341 is ground by means of the grinding stone 355 of the grinding tool 347A. Of course, the predetermined grinding machining can be performed on the workpiece 341 by means of the grinding tools 347B and 347C instead of the grinding tool 347A in such a manner that the grinding tools 347B and 347C, which are installed in the chain tool magazine 306c, are supplied to the tool holding portion 306d of the tool rest main body 306b.

In the process of such a grinding machining, each grinding stone 355 of the grinding tools 347A, 347B and 347C comes to be deformed and blind. In case that the blinding and the like becomes ugly, it is necessary to perform truing and dressing on those grinding tools 347a, 347b and 347C in order to maintain machining accuracy. The explanation which is described hereinafter is in relation relation to the case in which dressing and the like are performed by using the dressing apparatus 310 as shown in FIG. 12 a state in which the grinding tools 347A, 347B and 347C are installed on the tool holding portion 306d of the tool rest 306.

The solenoid valve 335 as shown in FIG. 15 is switched, the positioning cylinder 333 as shown in FIG. 12 is driven, and the rod 333a is projected together with the pressure plate 333b in the direction as shown by the arrow XA. Then, the pressure plate 333b abuts the boss 326a of the tool electrode 326. And, the tool electrode 326 is pushed by the pressure plate 333b to extract the rotating shaft 325 from the supporting cylinder 323a in the direction as shown by the arrow XA, and moves a predetermined distance in the direction as shown by the arrow XA and is positioned at a predetermined waiting position. Thereafter, in this state, the solenoid valve 339 as shown in FIG. 15 is properly switched to drive the cylinder 337 as shown in FIG. 12, and the rod 337a is moved in the direction as shown by the arrow XB. Then the main body 312, which the dressing apparatus comprises, is moved from the waiting position as shown in FIG. 16 in the direction as shown by the arrow XB, being pushed by the rod 337a via the connecting member 337d, and is positioned at the dressing position as shown in FIG. 17.

In this state, the driving motor 321 as shown in FIG. 12 is driven and the driving shaft 321a is rotated together with the pulley 320b. Accordingly, the supporting shaft 315 is rotated together with the machining electrodes 316a and 316b via the belt 322 and the pulley 320a in the direction as shown by the arrow XI or XJ. And, by rotating the chain type tool magazine 306c of the tool rest 306 as shown in FIG. 14 properly, a tool for cutting 347, installed in the magazine 306c, such as a bit, is supplied to the tool holding portion 306d.

Moreover, in this state, the tool rest main body 306b is fed a predetermined distance together with the tool 347, such as a bit, along with the carrier 306a in the direction as shown by the arrow XD in FIG. 13. And, the tool rest main body 306b is properly moved and driven together with the tool 347 via the carrier 306a in the directions as shown by the arrows XA and XB. Then, the machining electrodes 316a for finishing machining and the machining electrodes 316b for rough machining of the dressing apparatus 310 as shown in FIG. 18 are cut in the shape of a cylinder and molded along their outer circumference by means of the tool. When the forming of the machining electrodes 316a and 316b is finished, the tool rest 306 is moved a predetermined distance together with the tool 347 in the direction as shown by the arrow XC. Accordingly, the tool rest 306 is withdrawn from the dressing apparatus 310.

In this way, when the machining electrodes 316a and 316b are formed, the operation is performed connecting the tool electrode 326, of which the electric feed mechanism for tool 323 is comprised, with the grinding tool 327A for performing dressing. For performing the operation, the rod 327a of the cylinder 327 is projected in the direction as shown by the arrow XG in FIG. 13 by switching the solenoid valve 329 as shown in FIG. 15. Then the rod 327a abuts the engaging member 327b, which is provided with the supporting cylinder 323a. Moreover, in this state, it is moved with a predetermined distance in the direction as shown by the arrow XG. Then, the supporting cylinder 323a resists the elasticity of the spring 330, together with the rotating shaft 325, being pushed by the rod 327a via the engaging member 323b, and rotates the predetermined amount in the direction as shown by the arrow XK. Therefore, the tool electrode 326, which is installed on the rotating shaft 325, is rotated the predetermined amount from the waiting position XY1 in the direction as shown by the arrow XK, and is positioned at the connecting preparation position XY2 (see FIG. 19).

The grinding tool 347A for performing dressing is then supplied to the tool holding portion 306d by rotating the chain type tool magazine 306c of the retreating tool rest 306 properly. Moreover, in this state, the tool rest 306 is properly moved and driven together with the grinding tool 347A in the directions as shown by the arrows XC and XD. Then the grinding tool 347A is positioned at a predetermined electrode connecting position XC1 (see FIG. 20), and the electrode connecting bar 355b faces the electrode bar 326b.

Next, in this state, the rod 327a of the cylinder for rotating 327 is withdrawn in the direction as shown by the arrow XH in FIG. 13 by switching the solenoid valve 329 as shown in FIG. 15. Then the engaging member 323b rotates the predetermined amount together with the supporting cylinder 323a in the direction as shown by the arrow XL by means of the rod 327a is released. As a result, the rotating shaft 325, which is supported by the supporting cylinder 323a, rotates the predetermined amount together with the tool electrode 326 in the direction as shown by the arrow XL, and the electrode bar 326b of the tool electrode 326 inserts and engages with the grinding tool 347A as shown in FIG. 20, being free to slide via the electrode connecting groove 355b.

In this way, when the tool electrode 326 is connected with the grinding tool 347A, the rod 333a of the positioning cylinder 333 is withdrawn together with the pressure plate 333b in the direction as shown by the arrow XB as shown in FIG. 21 by driving the solenoid valve 335 as shown in FIG. 12. Then the pressure plate 333b is positioned at the position distant a predetermined distance from the boss 326a of the tool electrode 326 in the direction as shown by the arrow XB.

Next, the grinding stone 355 of the grinding tool 347A is positioned at the position facing the electrode 316b for rough machining, as shown in FIG. 21, in such a manner that the tool rest 306 as shown in FIG. 20 is moved a predetermined distance together with the grinding tool 347A in the direction as shown by the arrow XB. Then the tool electrode 326 is moved in the predetermined distance in the direction as shown by the arrow XB, following the grinding tool 347A, via the electrode bar 326b which is inserted into the electrode connecting groove 355b of the grinding tool 347A, pressing the rotating shaft 326 into the main body 312. At this point, the electrode connecting groove 355b is at 90 degrees to the direction as shown by the arrows XA and XB (that is, the Z axis direction). And, since the tool electrode 326 is always energized in the direction as shown by the arrow XL by the spring 330, the tool electrode 326 does not slip out of the electrode connecting groove 355b during the movement of the grinding tool 347A in the direction as shown by arrow XB.

In this state the driving motor 321 as shown in FIG. 12 is driven to rotate the driving shaft 321a together with the pulley 320b. The supporting shaft 315 is then rotated together with the machining electrodes 316a, and 316b via the belt 222 and the pulley 320a in the direction as shown by the arrow XI or XJ. And, the grinding stone 355 is rotated so as to be distant a predetermined distance away from the machining electrode 316b. Furthermore, electricity is fed between the grinding stone 355 of the grinding tool 347A and machining electrode 316b via the feed cables 326d, 319 and the like by driving the electric discharge unit (not shown). Then high voltage is charged between the grinding stone 355 of the grinding tool 347A and the machining electrode for rough machining 316b, and the electric discharge occurs. And, electric current runs in the electric discharge circuit being formed by the electric discharge unit, the feed cable 326d, the tool electrode 326, the electrode connecting groove 355b, the grinding stone 355, the machining electrode 316b, the initial power receiving ring 315c, the electrode 317 and the feed cable 319. Therefore, electric discharge machining is performed on the grinding stone 355 on the outer circumferential face, and rough truing and dressing are performed. On this occasion, since the electrode bar 326b of the tool electrode 326 is pressed toward the electrode connecting groove 355b of the grinding tool 347A at a predetermined pressure by the elasticity of the spring 330 (see FIG. 13), the electrode bar 326b does not slip out of the electrode connecting groove 355b during the machining, and rough machining and the like are smoothly performed.

In this way, when rough truing and the like are performed on the grinding stone 355A of the grinding tool 347A, the tool rest 306 as shown in FIG. 21 is moved a predetermined distance together with the grinding tool 347A in the direction as shown by the arrow XA, and the grinding stone 355 of the grinding tool 347A faces the machining electrode 316a for finishing truing and dressing. Then, tool electrode 326 is moved a predetermined distance in the direction as shown by the arrow XA by extracting the rotating shaft 325 from the main body 312, following after the grinding tool 347A via the electrode bar 326b which is inserted in the electrode connecting groove 355b of the grinding tool 347A. Since the electrode connecting groove 355b is formed at 90 degrees to the moving direction of the grinding tool 347A, which directions are ones as shown by the arrows XA and XB (that is, the Z axis direction), the tool electrode 326 does not slip out of the electrode connecting groove 355b during the movement of the grinding tool 347A in the direction as shown by the arrow XA.

Next, in this state, high voltage is charged between the grinding stone 355 of the grinding tool 347A and the machining electrode 316a for finishing machining via the feed cables 326d, 319 and the like by driving the electrode discharge unit, and electric discharge occurs. Then, finishing truing and dressing are performed on the grinding stone 355. Since the electrode bar 326b of the tool electrode 326 is securely connected with the grinding stone 355 via the electrode connecting groove 355b of the grinding tool 347A as described before, the electric discharge circuit being formed by the electric discharge unit, the feed cable 326b, the tool electrode 326, the electrode connecting groove 355b, the grinding stone 355, the machining electrodes 316a and 316b, the initial power receiving ring 315c, the electrode 317 and the feed cable 319 is not broken off during machining, and finishing truing and dressing is smoothly performed.

When the truing and dressing operations are performed, the distance XL1 between the axis center of the machining electrodes 316a and 316b for finishing machining and rough machining (the axis center of the supporting shaft 315) and the axis center XCT3 of the grinding stone 355 is different due to the size of the diameter of the grinding stone 355 of the grinding tool 347A, as shown in FIGS. 26 through 28, in order to keep regular intervals between the outer circumferential faces of the machining electrodes 316a and 316b and the outer circumferential face of the grinding stone 355 for performing dressing/truing. However, the electrode bar 326b of the tool electrode 326 is formed in a long and narrow shape. Therefore, in case the diameter of the grinding stone 355 is large, as shown in FIG. 28 and FIG. 32, the end portion of the electrode bar 326b in the figure is inserted in the electrode connecting groove 355b of the grinding stone 355. And in case the diameter is small, as shown in FIG. 27 and FIG. 31, the root portion of the electrode bar 326b is inserted in the electrode connecting groove 355b. Moreover, in case the diameter of the grinding stone 355 has a middle size, as shown in FIG. 26 and FIG. 30, the center portion of the electrode bar 326b is inserted in the electrode connecting groove 355b. In all cases, as described before, truing and dressing can be performed without hindrance by connecting the tool electrode 326 with the grinding stone 355 via the electrode connecting groove 355b.

When the grinding tool 347B, as shown in FIG. 37, is installed on the tool rest 306 of the complex machine tool 301 and truing and dressing is performed on the grinding tool, in which the axis center XCT5 of the grinding stone 355 intersects the directions as shown by the arrows XA and XB (the Z axis direction) at 90 degrees, the axis center of the machining electrodes 316a and 316b (the axis center of the supporting shaft 315) and the axis center XCT5 of the grinding stone 355 are orthogonal to each other, as shown in FIG. 25. In this case, the electrode bar 326b of the tool electrode 326 contacts an electrode contact portion 357g of the grinding stone 355 as shown in FIG. 29 in such a manner that the end portion of the electrode bar 326b in the figure is inserted in the electrode connecting groove 355b of the electrode connecting member 357d, parallel with the axis center XCT5 of the grinding stone 355, that is, perpendicular to the Z axis direction. Therefore, truing and dressing can be performed without hindrance by connecting the tool electrode 326 with the grinding stone 355 via the electrode contact portion 357g rotating together with the grinding stone 355.

Moreover, in case that truing and dressing are performed on the grinding tool 347C for screw grinding, as shown in FIG. 39, truing and dressing can be performed without hindrance in such a manner that the tool electrode 326 is connected with the grinding stone 355 via the electrode connecting groove 355b by inserting the electrode bar 326b of the tool electrode 326 in the electrode connecting groove 355b of the grinding stone 355, as shown in FIG. 39.

In this way, when finishing truing and dressing are performed on the grinding tool 347A and the like, the engaging member 323b is rotated only a predetermined angle in the direction as shown by the arrow XK together with the supporting cylinder 323a, resisting the elasticity of the spring 330 in such a manner that the solenoid valve 329 as shown in FIG. 15 is switched, and the rod 327a of the cylinder for rotating 327 is projected in the direction as shown by the arrow XG in FIG. 13. Then, the rotating shaft 325 also rotates only the predetermined angle, together with the tool electrode 326, in the direction as shown by the arrow XK, the engaging state is released between the electrode 326 and each electrode connecting groove 355b, and the electrode 326 returns to the connecting preparation position XY2.

In this state, the rod 333a of the positioning cylinder 333 is projected together with the pressure plate 333b in the direction as shown by the arrow XA, as shown in FIG. 22, by switching the solenoid valve 335. Then the rotating shaft 325 moves in the direction as shown by the arrow XA in such a manner that the tool electrode 326 is pushed by the pressure plate 333b and is positioned at the predetermined waiting position.

When the rotating shaft 325 moves in the direction as shown by the arrow XA, the grinding tool 347A is withdrawn together with the tool rest 306 in the direction as shown by the arrow XC, then the rod 347a of the cylinder for rotating 327 is retreated in the direction as shown by the arrow XH in FIG. 13 in such a manner that the solenoid valve 329 is driven, and the engaging member 323b, that is to say, the supporting cylinder 323a is rotated only the predetermined angle in the direction as shown by the arrow XL by the elasticity of the spring 330. Then the rotating shaft 325 also rotates the predetermined angle together with the tool electrode 326 in the direction as shown by the arrow XL, as shown in FIG. 23, and returns to the waiting position XY1 from the connecting preparation position XY2.

Furthermore, in this state the rod 337a is withdrawn a predetermined distance in the direction as shown by the arrow XA by driving the cylinder 337, as shown in FIG. 12. Then the main body 312 of which the dressing apparatus 310 is comprised moves in the direction as shown by the arrow XA from the dressing position as shown in FIGS. 17 through 23 to be pulled via the connecting member 337d, and is positioned at the waiting position as shown in FIG. 16 and FIG. 24.

In case the machining electrodes 316a and 316b are to be detached from the electrode supporting portion 315a of the supporting shaft 315 as shown in FIG. 12, according to necessity, the clamping member 315b is removed from the supporting shaft 315, and the machining electrodes 316a and 316b are pulled out along the electrode supporting portion 315a in the direction as shown by the arrow XA. And, in order to attach the machining electrodes 316a and 316b to the electrode supporting portion 315a, the machining electrodes 316a and 316b are positioned facing toward the left end of the electrode supporting portion 315a in the figure. In this state, the machining electrodes 316a and 316b are moved a predetermined distance along the supporting portion 315a in the direction as shown by the arrow XB, and are clamped by means of the clamping member 315b in this state in such manner that the machining electrodes 316a and 316b are pushed to the initial power receiving ring 315c.

In the above-described embodiment, it was mentioned that truing and dressing are performed on the flat portion of each grinding stone 355 of the grinding tool 347A and the like (for instance, the left end surface, in the figure, of the grinding stone 355 in FIG. 25 and the outer circumferential face in the figure of the grinding stone 355 in FIGS. 26 through 28) by using the machining electrodes 316a and 316b, but this is not the only manner of truing and dressing. It is possible that rough truing and finishing truing can be performed on a grinding stone 355 portion having various shapes, by properly changing the shape of the machining electrodes 316a and 316b. For instance, in case the outer circumferential face of the grinding stone 355 for performing truing in FIG. 12 is formed in an arc shape, the outer circumferential faces of the partial electrodes, among the plural number of the machining electrodes 316a and 316b, are formed in a shape for making an indentation in an arc shape corresponding to the grinding stone 355. Then, rough truing and finishing truing can be performed on the outer circumferential face of the grinding stone 355 by means of the machining electrodes. In the above-described embodiment, it was mentioned that the dressing apparatus 310 is disposed on the machine body 302 of the machine tool 301 as shown in FIG. 14 in such a manner that the machining electrodes 316a and 316b, the tool electrode 326 and the like are located on the right side of the figure of the main body 312. However, this is not the only way of installing the dressing apparatus 310. Any installation method for the machine tool 301 is available if the tool electrode 326 can be moved in the directions as shown by the arrows XA and XB (the truing and dressing directions) and the machining electrodes 316a and 316b can be installed along the same direction. For instance, it is possible that the dressing apparatus 310 is disposed on the machine body 302 of the machine tool 301 in such a manner that the machining electrodes 316a and 316b, the tool electrode 326 and the like are located in the reverse direction to the position as shown by full lines in FIG. 15, that is to say, the machining electrodes 316a and 316b and the like are located on the left side in the figure of the main body 312.

The other embodiments of the present invention will be described in FIGS. 40 through 49.

Figure 40:
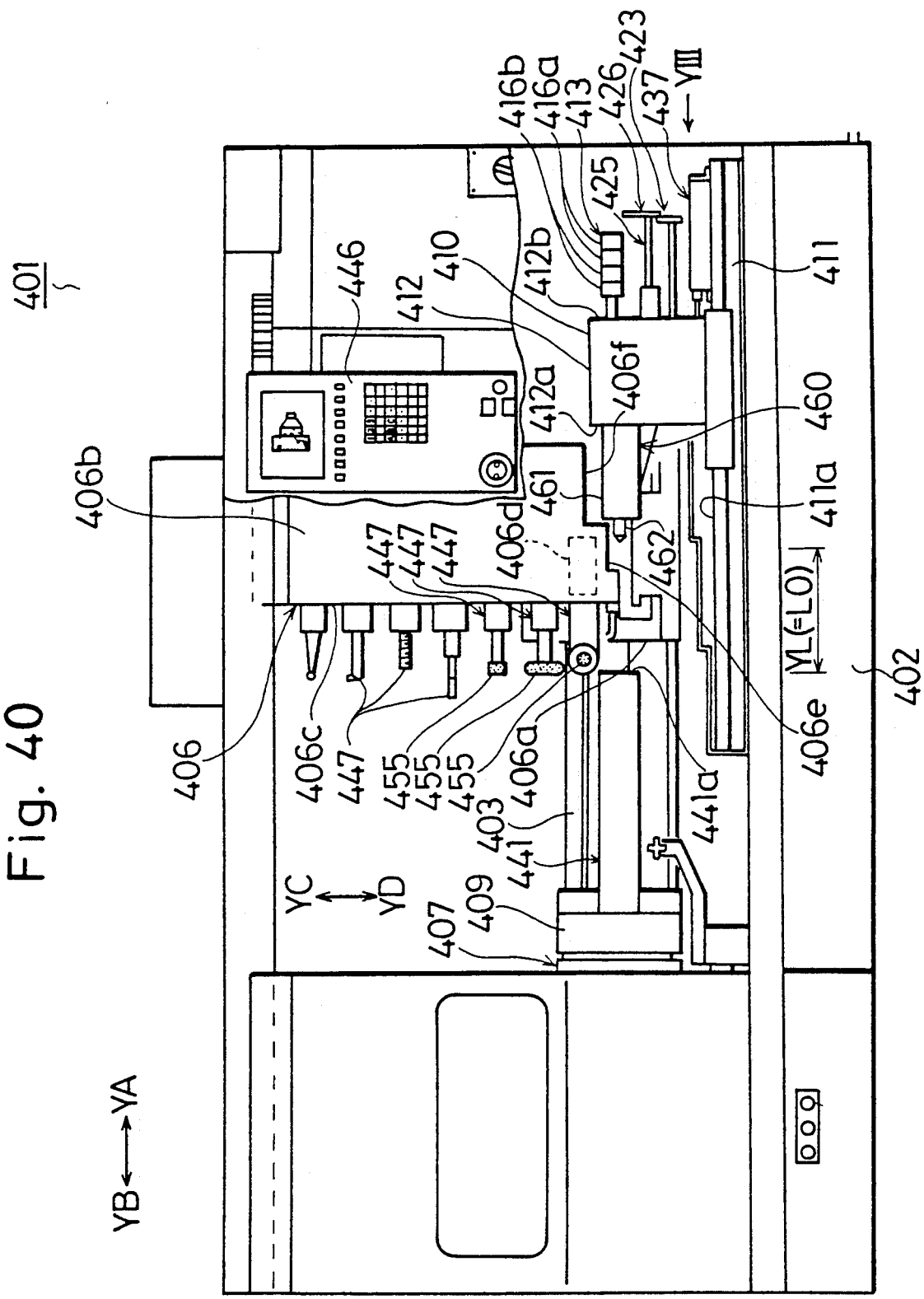
FIG. 40 is a front elevation showing an embodiment of a complex machining machine tool with a truing and dressing apparatus according to the present invention.

A complex machine tool 401 has a machine body 402 as shown in FIG. 40. With the machine body 402, a bed 403 is provided. A carrier 406a of a tool rest 406 is supported on the bed 403, being free to move and drive along the bed 403 in the directions as shown by the arrows YA and YB (that is, the Z axis direction). A tool rest main body 406b of the tool rest 406 is provided with the carrier 406a, being free to move and drive in a direction perpendicular to the directions as shown by the arrows YA and YB (that is, the Z axis direction). A tool holding portion 406d is provided with the tool rest main body 406b, as shown in FIG. 40. And, a chain type tool magazine 406c is provided with the tool rest main body 406b such that a number of tools 447 stored in the magazine 406c can be selectively supplied to the tool holding portion 406d. Since the tool rest 406 having the chain type tool magazine 406c and the tool holding portion 406d is well-known already, a detailed explanation is omitted here.

A spindle stock 407 is provided on the left side of the machine body 402 in FIG. 40. A chuck 409 is rotatably and drivably installed in the spindle stock 407 via a spindle (not shown). And, a workpiece 441 is held by the chuck 409, free to be detached and attached.

A dressing apparatus 410 is provided with the machine body 402 as shown in FIG. 40. The dressing apparatus 410 has a base 411, a main body 412, a driving cylinder 437, a tail center portion 460 and the like, as shown in FIG. 40. That is, the base 411 is provided on the machine body 402 extending in the directions as shown by the arrows YA and YB (that is, the Z axis direction). The main body 412 is movably provided on the base 411 via guide rails 411a along the base 411 in the directions as shown by the arrows YA and YB (that is, the Z axis direction). A machining electrode portion 413 is provided on the main body 412 as shown in FIG. 41, and the machining electrode portion 413 has a supporting shaft 415, machining electrodes 416a and 416b, a driving motor 421 and the like.

Figure 41:
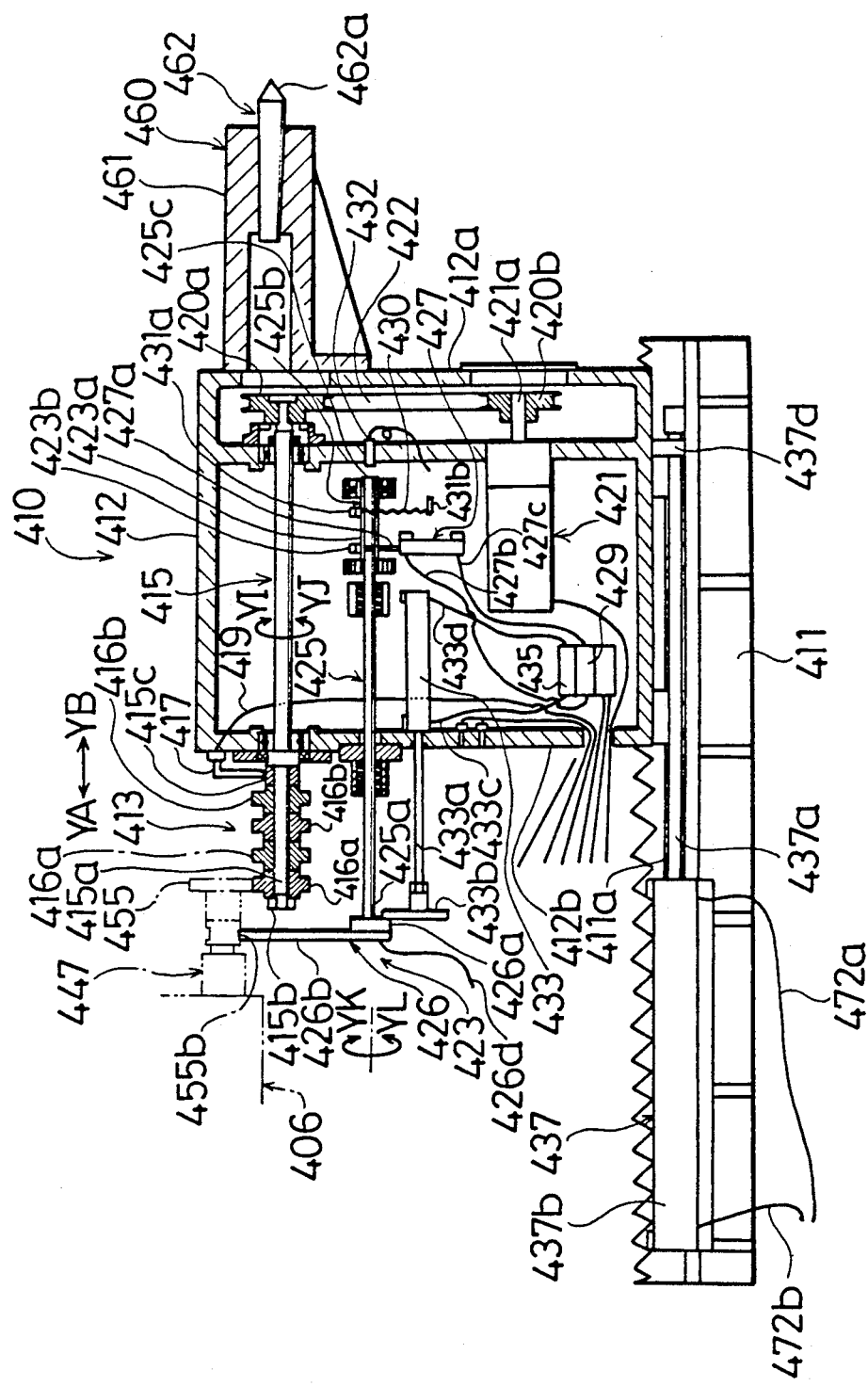
FIG. 41 is a back elevation of the truing and dressing apparatus portion of the complex machine tool as shown in FIG. 40.

That is, the supporting shaft 415 is provided on the main body 412 as shown in FIG. 41 via a plural number of bearings and the like in such a manner that the axis center of the left is parallel with the directions as shown by the arrows YA and YB (that is, the Z axis direction), and is rotatable in the directions as shown by the arrows YI and YJ. The electrode supporting portion 415a is provided at the supporting shaft 415 so as to project in the direction as shown by the arrows YA from the main body 412. An initial power receiving ring 415c having a circular annular form is fixed at the right end portion in the figure of the electrode supporting portion 415a. The machining electrodes 416a, which are composed of copper for finishing truing and dressing, and the machining electrodes 416b which are composed of black lead for rough truing and dressing, are installed on the electrode supporting portion 415a, being pushed to the initial power receiving ring 415c by means of a clamping member 415b. An electrode 417 slidably connects with the initial power receiving ring 415c. The electrode 417 is connected with an electric discharge unit (not shown) via a feed cable 419.

Moreover, a pulley 420a is installed on the right end portion of the supporting shaft 415 in FIG. 41. And, a driving motor 421 is provided at the lower end portion of the main body 412, of being separated a predetermined distance down in the figure from the supporting shaft 415. A driving shaft 421a is rotatably supported by the driving motor 421, and a pulley 420b is installed on the driving shaft 421a. A belt 422 having no edge is provided, being stretched between the pulley 420b and the pulley 420a installed on the supporting shaft 415.

Figure 42:
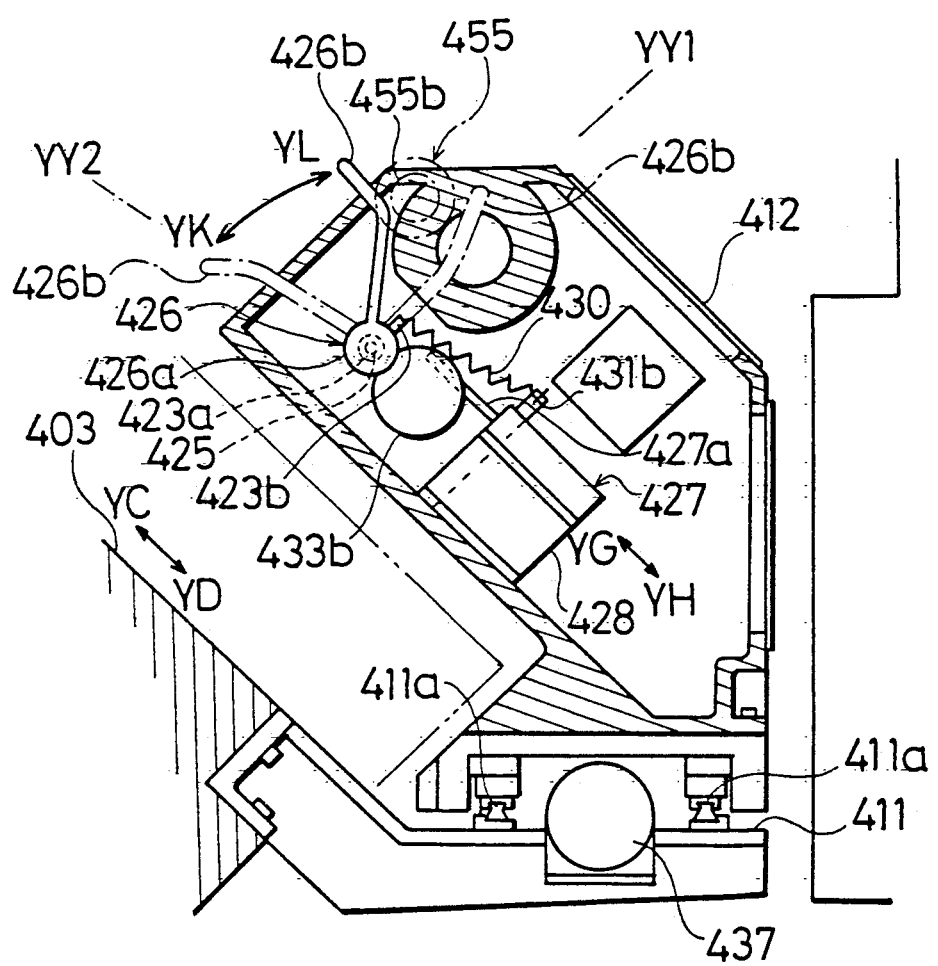
FIG. 42 is a view from the direction of arrow YIII of the complex machine tool in FIG. 40.

An electric feed mechanism for tool 423 is provided with the main body 412is shown in FIG. 41. The electric feed mechanism for tool 423 has a supporting cylinder 423a, of rotating shaft 425, a cylinder for rotating 427, a positioning cylinder 423 and the like. The supporting cylinder 423a is hollow and is provided on the main body 312 via a plural number of bearings, being free to rotate only in the directions as shown by the arrows YK and YL. An engaging member 423b is provided on the outer circumferential face of the supporting cylinder 423a as shown in FIG. 42. The rotating shaft 425 is inserted in and supported by the supporting cylinder 423a via slidable movement means (not shown), such as a key being free to move only in the directions as shown by the arrows YA and YB (that is, in the Z axis direction), as shown in FIG. 41. A tool electrode 426 is installed on the left end portion 425a of the rotating shaft 425 in the figure via a boss 426a of the electrode 426. An electrode bar 426b, being formed in the shape of an elbow, is provided with the boss 426a as shown in FIG. 42 so as to be capable of engaging and contacting with the above-described tool 447 and the like.

Moreover, the cylinder for rotating 427 is provided on the lower part of the supporting cylinder 423a of the main body 412 in FIG. 41, via a base 428 as shown in FIG. 42. A rod 427a is supported by the cylinder for rotating 427, being free to project and withdraw in the directions as shown by the arrows YG and YH. The cylinder for rotating 427 is connected with a solenoid valve 429 via tubes 427b and 427c, as shown in FIG. 41. The solenoid valve 429 connects with a compressed air supply means, which is not shown in the figure.

A spring 430 is provided between the base 428 and the supporting cylinder 423a as shown in FIG. 42, stretching between supporting blocks 431a and 431b. The supporting cylinder 423a, and thus the rotating shaft 425, is always energized in the directions as shown by the arrow YL by means of the spring 430. A rotating shaft terminal acknowledge sensor 432 is provided on the main body 412, being separated a predetermined distance from the right end 425c of the rotating shaft 425, on the right side in FIG. 41.

A positioning cylinder 433 of the electric feed mechanism for tool 423 is provided on the main body 412 as shown in FIG. 41, separated a predetermined distance from the rotating shaft 425 to the lower side in the figure. A rod 433a is supported by the positioning cylinder 433, being free to project and withdraw in the directions as shown by the arrows YA and YB (that is, in the Z axis direction). A pressure plate 433b, being formed in the shape of a disk, is provided on the left end portion of the rod 433a in the figure in such a manner that the above-described tool electrode 426 can be pressed in the direction as shown by the arrow YA. A solenoid valve 435 is connected with the positioning cylinder 433 via tubes 433c and 433d. The solenoid valve 435 connects with the compressed air supply source (not shown).

Figure 44:
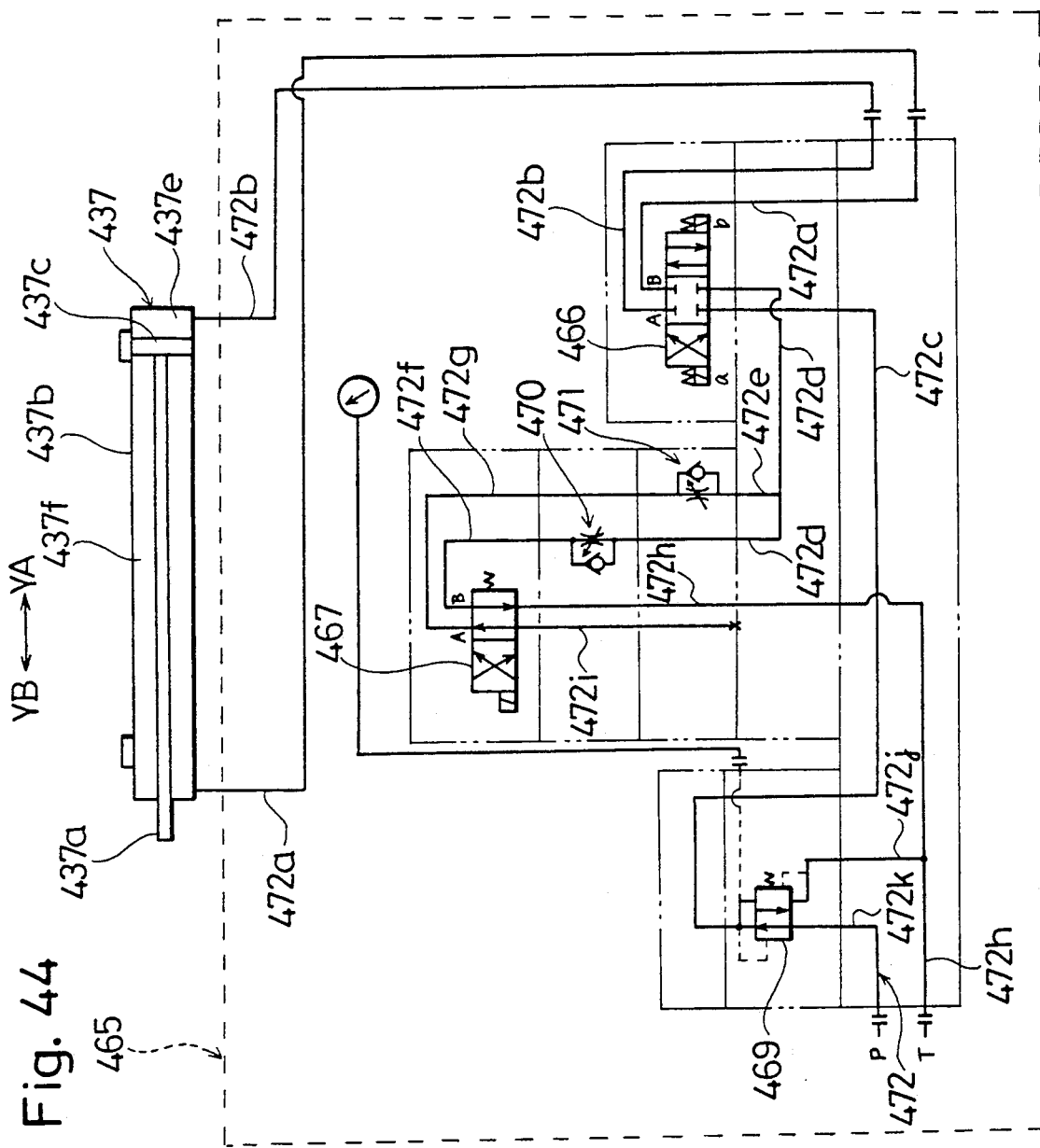
FIG. 44 is a schematic hydraulic pressure circuit showing an example of a driving cylinder for moving the truing and dressing apparatus.

A driving cylinder 437 of the dressing apparatus 410 is provided between the guide rails 411a on the base 411 of which the complex machining machine tool 401 is comprised as shown in FIG. 40 and FIG. 41. The driving cylinder 437 has a cylinder main body 437b, formed in the shape of a cylinder, as shown in FIG. 41. A piston 437c is inserted and engaged in the main body 437b, being free to move slidably in the directions as shown by the arrows YA and YB as shown in FIG. 44. Oil chambers 437e and 437f are formed in the main body 437b, partitioned by the piston 437e. A rod 437a is installed on the piston 437c, and the left end portion of the rod 437a connects with the lower surface, in FIG. 41, of the main body 412 via a connecting member 437d.

A hydraulic circuit 465 is connected with the driving cylinder 437, and the hydraulic circuit 465 has solenoid controlled valves 466, and 467, a pressure reducing valve 469, a speed control valve for high speed 470 having little throttling capacity, a speed control valve for low speed 471 having great throttling capacity, and the like. That is, the solenoid controlled valve 466 for performing the control between two positions connects with the oil chambers 437e and 437f of the cylinder main body 437b of the driving cylinder 437 via oil paths 472a and 472b. The speed control valves 470 and 471 for high speed and low speed connect with the solenoid controlled valve 466 via the oil paths 472d and 472e, respectively. The solenoid controlled valve 467 connects with the speed control valves 470 and 471 for high speed and low speed via oil paths 472f and 472g, and the pressure reducing valve 469 connects with the solenoid controlled valve 467 via oil paths 472h and 472j. The above-describe solenoid controlled valve 466 connects with the pressure reducing valve 469 via oil path 472c, and a hydraulic oil supply apparatus (not shown) connects with the pressure reducing valve 469 via the oil paths 472k and 472m.

A tail center portion 460 is provided with the main body 412 of the dressing apparatus 410 as shown in FIG. 40, and the tail center portion 460 has a tail sleeve 461, a center 462 and the like. That is, the tail sleeve 461 is provided on a back face 412a of the main body 412 as shown in FIG. 43 (that is, the face which faces a front face 412b on which the machining electrode portion 413 is provided. A center supporting hole 461a is provided in the tail sleeve 461 in the directions as shown by the arrows YA and YB (the right and left directions in FIG. 43). The center 462 is inserted and supported by the center supporting hole 461a, and a workpiece supporting portion 462a is formed at the left end of the center 462, in the shape of a circular cone.

Figure 47:
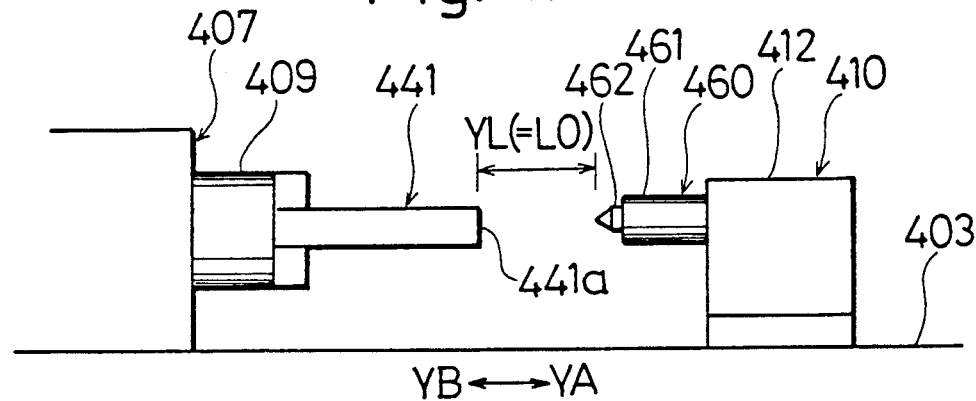
FIGS. 47 through 49 are views for showing a process in which one edge portion of a workpiece being held by a chuck is supported by means of the center portion of the dressing apparatus.
Figure 48:
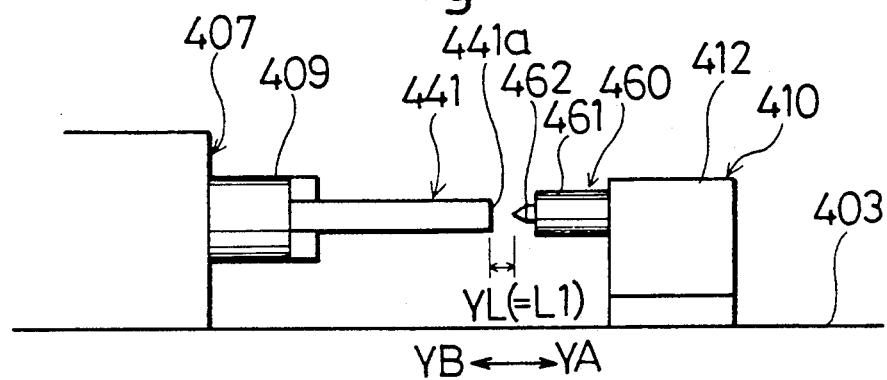

With the above-described constitution of the complex machine tool 401, in order to preform center workpiece machining on a workpiece 441 by means of the machine tool 401, the workpiece is projected a predetermined length to the right in the figure in comparison with the chuck 409, and is clamped by the chuck 409 as shown in FIG. 40 at first. Thereafter, the right end 441a of the workpiece 441, as shown in FIG. 47, is supported by the tail center 462 of the center portion 460, provided on the back face 412a of the main body 412 of the dressing apparatus 410. For this purpose it is necessary that the dressing apparatus 410 is moved a predetermined distance from the waiting position as shown in FIG. 40 and FIG. 47 in the direction as shown by the arrow YB by using the driving cylinder 437. The waiting position means the position at which the distance between the center 462 of the tail center portion 460 and the right end 441a of the workpiece 441 in FIG. 40, that is to say, the access distance YL, becomes a predetermined length L0. In order that the dressing apparatus 410 can be moved, the oil path 472c is connected with the oil path 472b and the oil path 472d is connected with the oil path 472a in such a manner that the pressure oil supply apparatus (not shown) is driven and, moreover, the solenoid controlled valve 466 of the hydraulic circuit 465 is driven as shown in FIG. 44. Then the pressure oil is supplied to the oil chamber 437e in the cylinder main body 437b from the oil path 427k via the pressure reducing valve 469, the oil path 472c, the solenoid controlled valve 466 and the oil path 472b, and the hydraulic oil in the oil chamber 437f is drained via the oil path 472a, the solenoid controlled valve 466, the oil path 472d, the speed control valve for high speed 470, the solenoid controlled valve 467 and the oil path 472h. Then the rod 437a moves at a high speed in the direction as shown by the arrow YB, being pushed by the pressure oil being supplied to the oil chamber 437e via the piston 437c. Then the main body 412 of the dressing apparatus 410 moves together with the tail center portion 460 in the direction as shown by the arrow YB, being pushed by the pressure oil being supplied to the oil chamber 437e via the piston 437c. Then the main body 412 of the dressing apparatus 410 moves together with the tail center portion 460 in the direction as shown by the arrow YB, being pushed by the rod 437a by the connecting member 437d as shown in FIG. 41. When the tail center portion 460 moves toward the workpiece 441, and the access distance YL becomes a length L1 as shown in FIG. 48, the line 472g is connected with the line 472h by driving the solenoid controlled valve 467. Then the hydraulic oil in the oil chamber 437f is drained via the oil path 472a, the solenoid controlled valve 466, the oil paths 472d and 472e, the control valve having little throttling capability 471 and the oil path 472h. Therefore, the speed at which the pressure oil is drained becomes slow. As a result, the moving speed of the rod 437a in the direction as shown by the arrow YB becomes slow, and the main body 412 of the dressing apparatus 410 reduces its speed in the moving direction, shown by the arrow YB.

Figure 49:
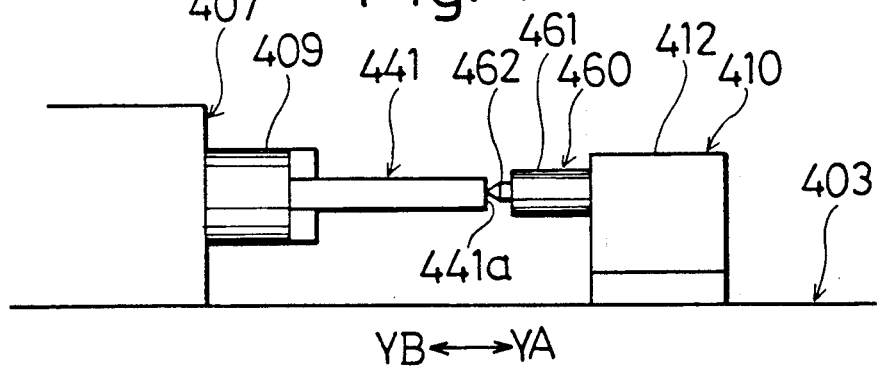

In this way, when the dressing apparatus 410 moves together with the tail center portion 460 in the direction as shown by the arrow YB, the access distance YL becomes 0 as shown in FIG. 49, the center 462 of the tail center portion abuts a center hole (not shown) provided on the right end 441a of the workpiece 441 in the figure, and the workpiece 441 is rotatably supported. In this state the tool 447 for grinding, which is used for the machining, is held by the tool holding portion 406d among the tools 447, the tool being stored in the magazine 406c in such a manner that the chain type tool magazine 406c installed on the tool rest 306 as shown in FIG. 40 is rotated and driven. Next, the chuck 409 is rotated together with the workpiece 441 at a predetermined rotating speed by driving the spindle stock 407 as shown in FIG. 40. A grinding stone 455 of the tools 447 moves and faces toward the right end portion of the workpiece 441 as shown in FIG. 45 in such a manner that the tool rest 406 is moved together with the grinding tool 447 in the direction as shown by the arrow YA or YB. Next, the tool for grinding 447 is driven to rotate. In this state, the tool rest 406 is fed a predetermined quantity together with the tool 447 in the direction as shown by the arrow YD. However, in this state the outer circumferential portion of the workpiece 441 is ground only the predetermined quantity and in such a manner that the tool rest 406 is moved together with the tool 447 in the direction as shown by the arrow YB.

Since escape planes 406e and 406f are formed at the lower end portion of the tool rest 406 in FIG. 43 with indentations according to the form of the upper portion of the main body 412 of the dressing apparatus 410, the tool rest 406 does not interfere with the main body 412, and the workpiece 441 is smoothly ground by means of the tool 447. And since the workpiece 441 is rotatably supported by the center 462 of the tail center portion 460 in the right edge 441a in the figure, defection does not occur during the machining, and the grinding machining is performed on the workpiece 441 accurately.

In case the chucked workpiece machining is performed by means of the complex machine tool 401, the dressing apparatus 410 is moved as far as possible in the direction as shown by the arrow YA as shown in FIG. 46. In this state, the workpiece 441 to be machined is held by the chuck 409, projecting a predetermined length toward the right in the figure in comparison with the chuck 409. In this state, the chuck 409 is rotated together with the workpiece 441 at a predetermined rotating speed by driving the spindle stock 407. The tool for grinding 447 faces toward the right end 441a of the workpiece 441 as shown in FIG. 46 in such a manner that the tool rest 406 is moved together with the tool for grinding 447 in the direction as shown by the arrow YA or YB and in the direction as shown by the arrow YD. Next, the tool for grinding 447 is driven to rotate, and the tool rest 406 is fed a predetermined quantity together with the tool 447 in the direction as shown by the arrow YB. Moreover, in this state the right end 441a of the workpiece 441 is ground a predetermined quantity in such a manner that the tool rest 406 is moved together with the tool 447 in the directions as shown by the arrows YC and YD. Since the escape plane 406f is formed at the tool rest 406, the tool rest 406 does not interfere with the main body 412 of the dressing apparatus 410 during the machining, and the right end 441a of the workpiece 441 is smoothly ground.

As described before, in case the workpiece 441 to be machined is big in its projecting quantity, in the direction as shown by the arrow YA, in comparison with the chuck 409, the dressing apparatus 410 is moved and withdrawn in the direction as shown by the arrow YA in order that the tool rest 406 cannot interfere with the dressing apparatus 410. For this the oil path 472c is connected with the oil path 472a and the oil path 472d is connected with the oil path 472b by switching the solenoid controlled valve 466 of the hydraulic circuit 465 as shown in FIG. 44. Then, pressure oil is supplied to the oil chamber 437f in the cylinder main body 437b from the oil path 472k via the pressure reducing valve 469, the oil path 472c, the solenoid controlled valve 466 and the oil path 472a. The hydraulic oil in the oil chamber 437e is drained via the oil path 472b, the solenoid controlled valve 466, the oil path 472d, the speed control valve for high speed 470, the solenoid controlled valve 467 and the oil path 472h. Then the rod 437a of the driving cylinder 437 moves via the piston 437c in the direction as shown by the arrow YA, being pulled by the pressure oil being supplied to the oil chamber 437f. Then the dressing apparatus 410 moves and withdraws together with the tail center portion 460 via the connecting member 437d as shown in FIG. 41 in the direction as shown by the arrow YA, being pulled by the rod 437a.

While the grinding machining is being performed on the workpiece 441 by means of the tool for grinding 447 installed on the tool rest 406, the grinding stone 455 of the tool for grinding 447 generates blinding. In case the blinding becomes ugly, it is necessary that dressing is performed on the tool for grinding 447 in order to maintain machining accuracy. Then, the dressing is performed by means of dressing apparatus 410 as shown in FIG. 40, in a state in which the tool for grinding 447 is held by the tool holding portion 406d of the tool rest 406.

For the sake of this, the dressing apparatus 410 is pressed via the connecting member 437d in such a manner that the rod 437a is projected in the direction as shown by the arrow YB by driving the driving cylinder 437, as shown in FIG. 41. The dressing apparatus 410 is thus positioned at a predetermined dressing position by moving in the direction as shown by the arrow YB. Thereafter, the operation at which the tool electrode 426 of the dressing apparatus 410 is connected with the tool for grinding 447 for performing dressing is performed. The rod 427a of the cylinder for rotating 427 is first projected in the direction as shown by the arrow YG in FIG. 42 by switching the solenoid valve 429 as shown in FIG. 41. Then, the rod 427a abuts the engaging member 423b on the supporting cylinder 423a. In this state, the rod 427a moves the predetermined distance in the direction as shown by the arrow YG. Then the supporting cylinder 423a rotates a predetermined angle together with the rotating shaft 425 in the direction as shown by the arrow YK against the elasticity of the spring 430, being pushed by the rod 427a via the engaging member 423b. Therefore the tool electrode 426, being installed on the rotating shaft 425, rotates the predetermined angle from a waiting position YY1 in FIG. 42 in the direction as shown by the arrow YK and is positioned at a connecting preparation position YY2.

Thereafter, the tool for grinding 447 for performing dressing is supplied to the tool holding portion 406d by rotating the chain type tool magazine 406c of the tool rest 406 as shown in FIG. 40. Moreover, in this state the tool is positioned at the position as shown by imaginary line in FIG. 41 in such a manner that the tool rest 406 is properly moved and driven together with the tool for grinding 447 in directions as shown by the arrows YA and YB and in the directions as shown by the arrows YC and YD.

Next, in this state, the rod 427a of the cylinder for rotating 427 is withdrawn in the direction as shown by the arrow YH in FIG. 42 by switching the solenoid valve 429. Then the engaging member 423b rotates the predetermined angle together with the supporting cylinder 423a in the direction as shown by the arrow YL by the elasticity of the spring 430, since the regulation of the movement in the direction as shown by the arrow YL by the rod 427a has been released. Therefore, the rotating shaft 425 inserted in and supported by the supporting cylinder 423a rotates with the predetermined angle together with the tool electrode 426 in the direction as shown by the arrow YL, and the electrode bar 426b of the tool electrode 426 contacts the tool for grinding 447, as shown by the imaginary line in FIG. 41, via the electrode connecting groove 455b, able to move slidably therein.

When the tool electrode 426 is connected with the tool for grinding 447, the rod 433a of the positioning cylinder 433 is withdrawn together with the pressure plate 433b in the direction as shown by the arrow YB by driving the solenoid valve 435 as shown in FIG. 41. Then the pressure plate 433b is positioned at a position distant a predetermined distance from the boss 426a of the tool electrode 426 in the direction as shown by the arrow YB.

The grinding stone 455 of the tool 447 is positioned at a position facing the electrode 416a for dressing in such a manner that the tool rest 466, as shown in FIG. 41, is moved a predetermined distance together with the tool for grinding 447 in the direction as shown by the arrow YB. Then the tool electrode 426 moves the predetermined distance by the electrode bar 426b being inserted in the electrode connecting groove 455b of the tool for grinding 447 in the direction as shown by the arrow YB, following the tool 447, in such a manner that the rotating shaft 425 is pushed into the main body 412. Since the electrode connecting groove 455b is formed at 90 degrees to the directions as shown by the arrows YA and YB (that is, the Z axis direction) and the tool electrode 426 is always energized in the directions as shown by the arrow YL by the spring 430, the tool electrode 426 does not slip out of the electrode connecting groove 455b during the movement of the tool for grinding 447 in the direction as shown by the arrow YB.

The driving shaft 421a is then rotated together with the pulley 420b by driving the driving motor 421 shown in FIG. 41. The supporting shaft 415 is rotated together with the machining electrodes 416a, and 416b via the belt 422 and the pulley 420a in the direction as shown by the arrow YI or YJ. And, the grinding stone 455 of the tool for grinding 447 is rotated, separated a predetermined distance from the machining electrode 416a. Moreover, in this state electricity is fed between the tool for grinding 447 and the machining electrode 416a via the feed cables 426d, 419 and the like by driving the electric discharge unit (not shown). Then high voltage is charged between the grinding stone 455 of the tool for grinding 447 and the machining electrode 416a, electric discharge occurs, and current flows in the electric discharge circuit being formed by the electric discharge unit, the feed cable 426d, the tool electrode 426, the electrode connecting groove 455b, the grinding stone 455, the machining electrodes 416a and 416b, the initial power receiving ring 415c, the electrode 417 and the feed cable 419. Accordingly, the electric discharge machining is performed on the outer circumference of the grinding stone 455 to perform dressing. Since the electrode bar 426b of the tool electrode 426 contacts with the electrode connecting groove 455b of the tool for grinding 447 with a predetermined pressure by the elasticity of the spring 430, the electrode bar 426b does not slip out of the electrode connecting groove 455b during the machining, and dressing is smoothly performed.

In this way, when the dressing has been performed on the grinding stone 455 of the tool for grinding 447, the solenoid valve 429 as shown in FIG. 41 is switched, and the rod 427a of the cylinder for rotating 427 is projected in the direction as shown by the arrow YG in FIG. 42. Then, the engaging member 423b is rotated with the predetermined angle together with the supporting cylinder 423a in the direction as shown by the arrow YK, resisting the elasticity of the spring 430. Then the rotating shaft 425 rotates with the predetermined angle together with the tool electrode 426 in the direction as shown by the arrow YK, the engaging state between the electrode 426 and the electrode connecting groove 455b is released, and the electrode 426 returns to the connecting preparation position YY2.

In this state, the tool 447 on which dressing has finished is withdrawn together with the tool rest 406, in the upper portion of FIG. 41. The rod 433a of the positioning cylinder 433 is projected together with the pressure plate 433b in the directions as shown by the arrow YA by switching the solenoid valve 435. Then the rotating shaft 425 moves in the direction as shown by the arrow YA in such a manner that the tool electrode 426 is pushed by the pressure plate 433b and is positioned at the predetermined waiting position.

When the rotating shaft 425 moves in the direction as shown by the arrow YA, the rod 427a of the cylinder for rotating 427 is withdrawn in the direction as shown by the arrow YH in FIG. 42 by driving the solenoid valve 429, and the engaging member 423b, that is to say, the supporting cylinder 423a, is rotated the predetermined angle in the direction as shown by the arrow YL by elasticity of the spring 430. Then the rotating shaft 425 rotates the predetermined angle together with the tool electrode 426 in the direction as shown by the arrow YL and returns to the waiting position YY1 from the connecting preparation position YY2.

Moreover, in this state the rod 437a is withdrawn the predetermined distance in the direction as shown by the arrow YA by driving the driving cylinder 437 as shown in FIG. 41. Then the main body 412 moves in the direction as shown by the arrow YA, being pulled via the connecting member 437d, and is positioned at the waiting position as shown in FIG. 40.

Rough truing and finishing truing can be performed on the tool 447 by a similar procedure to the case in which dressing is performed on the tool for grinding 447. In case that rough truing is performed on the tool 447 for grinding 447, the grinding stone 455 of the tool 447 is moved to face the machining electrode 416b for rough machining. In case of finishing truing, the grinding stone 455 is moved to face the machining electrode 416a for finishing machining/dressing. Then, electric discharge machining is performed.

In the above-described embodiment, it was mentioned that the tool for grinding 447 is supplied to the tool holding portion 406d of the tool rest 406, and the center work grinding machining and the chuck work grinding machining are performed on the workpiece 441 by means of the tool for grinding 447. But these aren't the only machinings that can be performed. Various kinds of machining can be performed on the workpiece 441 by supplying all kinds of tools 447 to the tool holding portion 406d. For instance, it is possible that a tool for turning 447, such as a cutting tool, is supplied to the tool holding portion 406d, and turning machining is performed on the workpiece 441 by the tool 447.

In the above-described embodiment, it was mentioned that the driving cylinder 437 as shown in FIG. 41 is used as a moving and driving means of the dressing apparatus 410 in the directions as shown by the arrows YA and YB, and in case that dressing is performed on the tool for grinding 447 being installed in the tool rest 406, the dressing apparatus 410 is moved its maximum stroke from the waiting position in the direction as shown by the arrow YB to a position at the predetermined dressing position by driving the driving cylinder 437. However, the moving and driving means of the dressing apparatus 410 isn't limited to the driving cylinder 437. Any actuator is available as long as the dressing apparatus 410 can be smoothly moved in the directions as shown by the arrows YA and YB. For instance, a servo-motor may be connected with the main body 412 of the dressing apparatus 410 via a ball screw extending in the directions as shown by the arrows YA and YB instead of the driving cylinder 437. The servo-motor is then driven, the ball screw is rotated in the two reciprocal directions, and then the dressing apparatus 410 is moved in the directions as shown by the arrows YA and YB (the servo-motor and the ball screw aren't shown in the figure). This case is different from the case in which the dressing apparatus 410 is moved between the waiting position and dressing position by means of the driving cylinder 437. The movement quantity of the dressing apparatus 410 in the directions as shown by the arrows YA and YB can be optionally changed by controlling the rotating quantity of the ball screw, and dressing can be performed on the tool for grinding 447 by means of the dressing apparatus 410 at the optional position on the machine body 402 as shown in FIG. 40.

In case the grinding stone 455 of the tool for grinding 447 generates blinding during the center work grinding machining and a bad influence appears in the machining accuracy, the grinding machining stops for a while, and the tool rest 406 is moved and withdrawn the predetermined quantity together with the tool 447 in the direction as shown by the arrow YC. In this state, the tool rest 406 is moved with a predetermined distance together with the tool for grinding 447 in the direction as shown by the arrow YA. Moreover, the tool rest 406 is moved the predetermined distance in the direction as shown by the arrow YD to a position at the position as shown by the imaginary line in FIG. 41. Next, the electric feed mechanism for tool 423 is driven as described before, and the tool electrode 426 is connected with the tool for grinding 447. In this state, dressing is performed on the grinding stone 455 of the tool 447 by the machining electrode portion 413. When dressing is performed on the grinding stone 455, the connection between the tool 447 and the tool electrode 426 is released. In this state, the tool rest 406 is properly moved together with the tool 447 to which dressing is performed in the directions as shown by the arrows YC and YD and in the directions as shown by the arrows YA and YB. Then the tool 447 is returned to the position as shown in FIG. 45 and the center work grinding machining is started again. Since the dressing apparatus 410 supports, by the center 462, one end of the workpiece 441 during dressing, the center work grinding machining can be started immediately after the dressing of the tool for grinding 447.

Another embodiment of the present invention will be explained in FIGS. 50 through 52.

Figure 50:
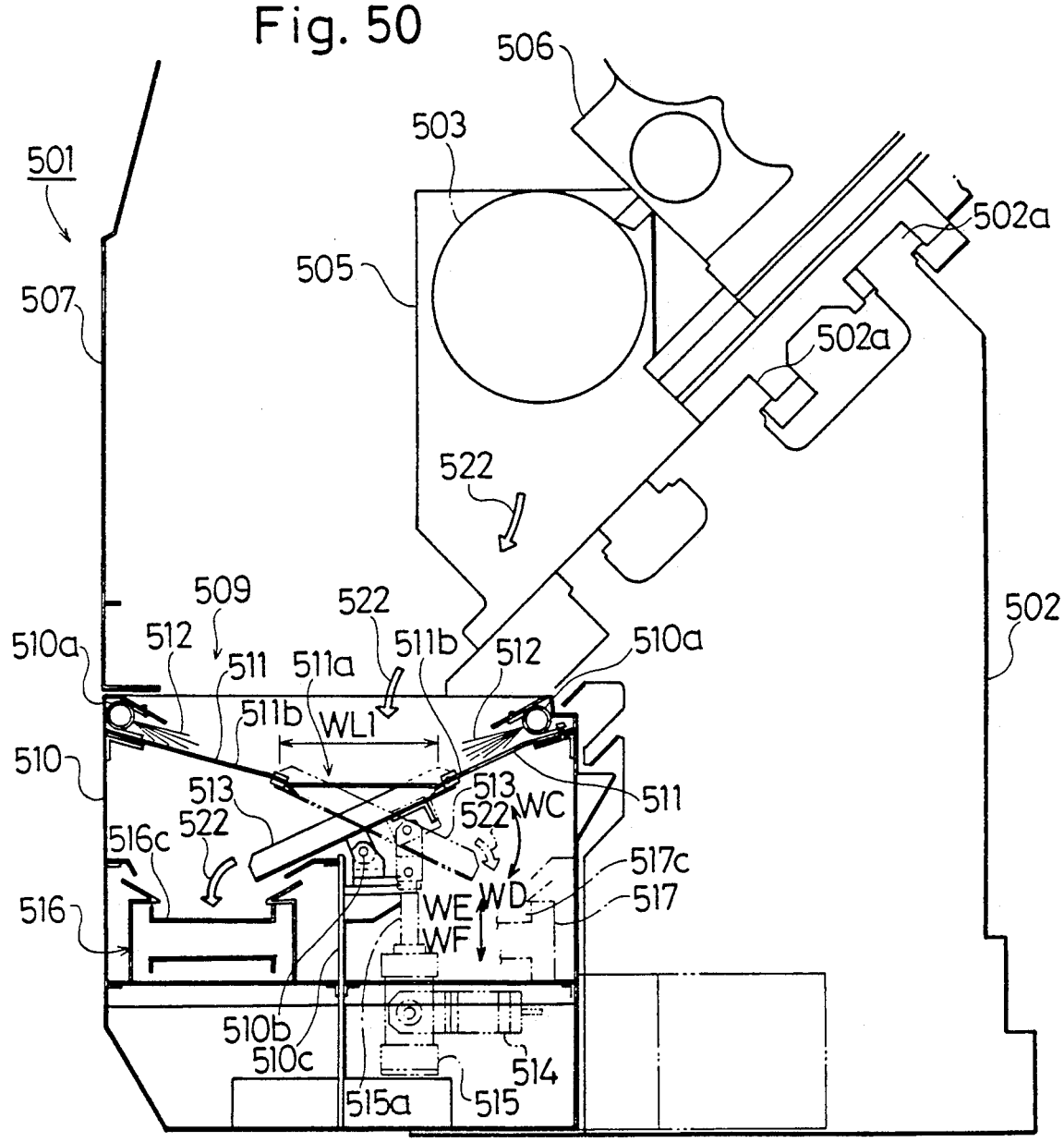
FIG. 50 is a sectional view showing an embodiment of a chip collection apparatus according to the present invention.

A machine tool 501, such as a lathe, has a bed 502 as shown in FIG. 50. A spindle stock 505, by which a workpiece spindle 503 is rotatably supported, is provided on the bed 502. A guide rail 502a is formed on the bed 502 in a direction perpendicular to the paper of the figure (the Z axis direction), and a tool rest 506 for having a tool installed thereon is movably supported by the guide rail 502a. A cover 507 is provided on a front face of the bed 502, that is to say, the left side of the figure, covering the whole machine tool 501. A chip collecting apparatus 509 according to the present invention is provided at the lower end of the cover 507 in the figure, at the front of the bed 502.

Figure 51:
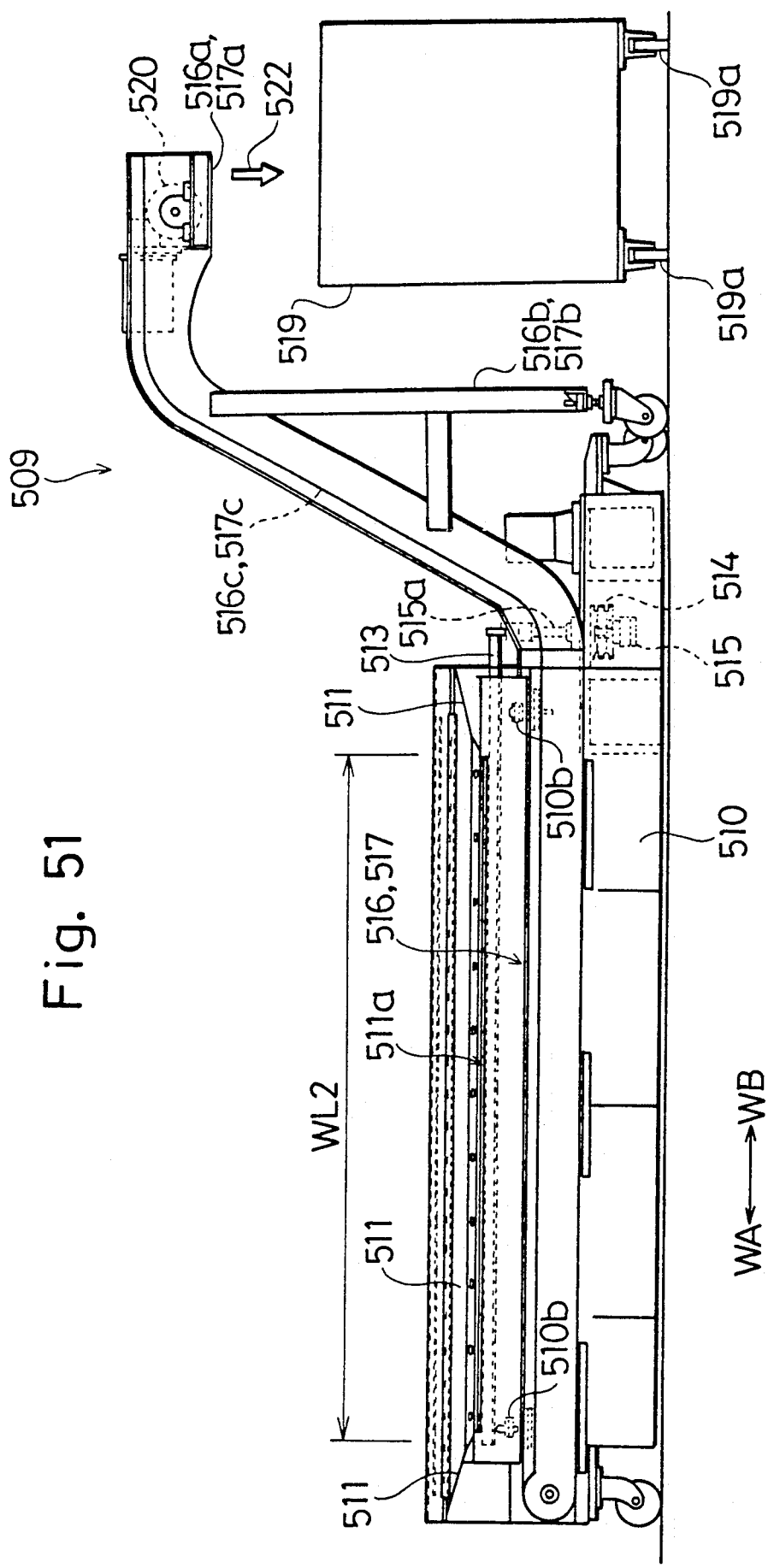
FIG. 51 is a front elevation of the chip collecting apparatus of FIG. 50.

The chip collecting apparatus 509 has a frame 510 which is formed as a whole in a box shape as shown in FIG. 50 and FIG. 51. Chip pans 511 are disposed on the upper portion of the frame 510 in FIG. 50, facing each other in a direction perpendicular to the paper in FIG. 50, that is, in the directions as shown by arrows WA and WB in FIG. 51. The chip pans 511 are formed obliquely in such a manner that the nearer portion to the center portion in FIG. 50 becomes lower, in the shape of a funnel as a whole, as shown in FIG. 51. A chip falling space 511a is formed at the center, having a width WL1 and a length WL2. Washing pipes 510a are formed at both sides of the chip pans 511 in FIG. 50 along the chip pans 511 in the direction perpendicular to the paper. A number of discharge holes, which are not shown in the figure, are provided on each washing pipe 510a facing in the direction of the chip pans 511 in order to discharge a coolant 512 washing toward a chip pan face 511b.

At the lower portion of the chip falling space 511a in FIG. 50, a change-over plate 513, extending over the entire length in the directions as shown by the arrows WA and WB in FIG. 51, is supported at both its sides via pins 510b on the frame 510, the change-over plate 513 being free to rotate and move in the directions as shown by the arrows WC and WD in FIG. 50. A driving cylinder 515 is provided near the pin 510b on the right side in FIG. 51 of the change-over plate 513 via bracket 514 fixed to the frame 510 between the change-over plate 513 and the frame 510. A rod 515a is provided with the driving cylinder 515, being free to project and drive in the directions as shown by the arrows WE and WF, and the top end of the rod 515a is connected with the change-over plate 513 such that the change-over plate 513 is free to rotate and move.

A pair of chip conveyors 516 and 517 are disposed at below the change-over plate 513 in FIG. 50 via a partition plate 510c, conveying in the directions as shown by the arrows WA and WB (only a part of the chip conveyor 517 is shown in FIG. 50). The chip conveyors 516 and 517 project from the right side face of the frame 510 in the figure to the outside, stretching to the right in FIG. 51 in the frame 510. The chip conveyors 516 and 517 extend in a gentle S-form at the upper portion of the figure, being supported by legs 516b and 517b, and chip elimination orifices 516a and 517a are provided at the upper end, opening downward in the figure. Two chip boxes 519 are in a row in a direction perpendicular to the paper face in FIG. 51, and are provided below the chip elimination orifices 516a and 517a, the chip boxes 519 being free to move via wheel 519a provided on the lower surfaces of the chip boxes 519. On the chip conveyors 516 and 517, belts 516c and 517c, having no edge and being provided for delivering the chips, are disposed between the left end portion of the frame 510 in FIG. 51 and the chip elimination orifices 516a and 517a of the chip conveyors 516a and 517, that is, in the directions as shown by the arrows WA and WB along the frame 510. Motors 520 are disposed at the end of the chip elimination orifices 516a and 517a. The motors 520 are provided for the respective chip conveyors 516 and 517. Therefore, the chip conveyors 516 and 517 can be selectively driven by selectively driving the motors 520.

With the above-described constitution of the machine tool 501 and the chip collecting apparatus 509, in case a workpiece which is composed of a first material is machined by means of the machine tool 501, the workpiece is installed in the workpiece spindle 503 of the spindle stock 505. In this state, the predetermined machining, such as turning, grinding and milling machining, is performed by means of the tool installed in the tool rest 506 in such a manner that the workpiece spindle 503 is rotated together with the workpiece. Chips 522 which are generated during the machining fall to the lower portion in FIG. 50 of the bed 502 and fall on the chip pans 511 of the chip collecting apparatus 509. A coolant 512 is always spouted from the washing pipe 510a to the chip pans 511, and the chips 522 which fall on the chip pans 511 are moved by being washed down, and fall into the chip falling space 511a formed at the center portion of the chip pan 511 by means of the spouting coolant 512.

The chips 522 which flow together with the coolant 512 into the chip falling space 511a fall on the change-over plate 513. At this point the change-over plate 513 is in a state in which the rod 515a of the driving cylinder 515 is projected in the direction as shown by the arrow WE. Accordingly, the change-over plate 513 is in a state rotated and moved on the pins 510b as its center in the direction as shown by the arrow WC. Then the chip falling space 511a is in a state communicating with the chip conveyor 516 on the left side in FIG. 20, and the chips 522 which fall on the change-over plate 513 fall on the belt 516c of the chip conveyor 516 by means of the coolant 512. The coolant 512 passes through the chip conveyor 516 and is retrieved in a drain tank, which is not shown in the figure, and is fed to the washing pipe 510a by a circulating pump for reclamation. Moreover, when the coolant 512 falls toward the lower portion of FIG. 50 from the chip conveyor 516, the chips 522 remain on the belt 516c of the chip conveyor 516. Then the motor 620 of the chip conveyor 516 is rotated and driven, the belt 516c is moved and driven between the chip elimination orifice 516a and the chip falling space 511a, the chips 522 which fall on the belt 516c is conveyed to the chip elimination orifice 516a, and the chips 522 are discharged into the chip box 519 disposed below the elimination orifice 516a.

In this way, while the workpiece which is composed of one kind of material is being machined, the change-over plate 513 is kept in a state rotated and moved in the direction as shown by the arrow Wc in FIG. 50, and all the chips 522 which are generated during machining fall to the chip conveyor 516 side and are retrieved.

In case the material of a workpiece to be machined changes from the first material into a second material, before the start of machining, the coolant 512 is flowed via the washing pipe 510a and the chips 522 which adhere to the chip pans 511 and which are composed of the first material are washed down, falling to the chip conveyor 516 side. When this washing operation finishes, the rod 515a of the driving cylinder 515 is retracted in the direction as shown by the arrow WF. Then the change-over plate 513 rotates and moves with retraction of the rod 515a on the pins 510b in the direction as shown by the arrow WD, the communication between the chip falling space 511a and the chip conveyor 516 being broken, and the chip falling space 511a and the chip conveyor 517 are communicated with each other.

In this state the motor 520 of the chip conveyor 517 side is rotated and driven, the belt 517c of the chip conveyor 517 side is driven, and the machining of the workpiece of the second material, which is different from the prior material, is started. Then the chips 522 which are generated during machining fall from the chip pans 511 to the change-over plate 513, being washed and flowing down by means of the coolant 512 as described before. Moreover, the chips 522 are discharged from the change-over plate 513 to the chip conveyor 517 side and are expelled from the chip elimination orifice 517a into the other chip box 519 disposed below the elimination orifice 517a by the same procedure.

In case the workpiece which is composed of the first material is machined again when the machining of the workpiece being different in material has been performed and the machining finishes, as in the above-described case, washing by the washing pipe 510a is performed for a predetermined time, and thereafter the driving cylinder 515 is again driven to rotate and move the change-over plate 513 in the direction as shown by the arrow WC. The chip falling space 511a and the chip conveyor 516 are communicated with each other, and the communicating state is broken between the chip conveyor 517 and the chip falling space 511a. In this state, when the machining is started on the workpiece of the first material, the chips 522 fall to the chip conveyor 516 side by the change-over plate 513 and are stored in the chip box 519 in which the chips 522 were stored when the machining of the workpiece of the first material was last performed.

In the above-described embodiment, it was mentioned that the change-over plate 513 is provided at the machine tool side of the chip collecting apparatus 509, that is to say, at the chip collection side. However, the installation position of the change-over plate 513 is not restricted to the chip collection side. The change-over plate 513 can of course be provided at the chip elimination orifice side, at which the chips are thrown in the chip boxes. The case in which the change-over plate is provided at the chip elimination orifice side will be explained in FIG. 52 hereinafter. The explanation of portions similar to the arrangement of FIGS. 50 and 51 is omitted by using the same reference numerals.

A chip collecting apparatus 527 has a chip conveyor 523 as shown in FIG. 52. Only one chip conveyor is provided. This is different from the prior case in FIG. 50. Below a chip elimination orifice 523a of the chip conveyor 523, a change-over plate 525 is supported by the frame 510, being free to rotate and move in the directions as shown by the arrows WG and WH via a shaft 525a. An arm 525b is provided on one end of the shaft 525a. The top end of a rod 526a of a driving cylinder 526 rotatably supported by the frame 510 is connected to the arm 525b so as to be free to rotate and move. Moreover, two chip boxes 519 are disposed at the lower portion of the change-over plate 525 in the figure.

With the above-described constitution of the chip collecting apparatus 527, the chips 522 which are generated at the machine tool 501 fall together with coolant onto the chip conveyor 523 in the frame 510 as a regular chip collecting apparatus. Only chips 522 are conveyed to the chip elimination orifice 523a side provided at the upper right portion of the figure, the chips 522 being separated from the coolant by means of the chip conveyor 523. The chips 522 which are conveyed to the chip elimination orifice 523a fall and are expelled onto the change-over plate 525 immediately. Regarding the change-over plate 525, the rod 526a of the driving cylinder 526 is properly projected and retracted according to the material of the workpiece which is being machined by the machine tool 501. When the rod 526a projects, the change-over plate 525 rotates and moves via the shaft 525a in the direction as shown by the arrow WH, and the chip elimination orifice 523a is connected with the chip box 519 at the right side of the figure. When the rod 526a retracts, the change-over plate 525 rotates and moves via the shaft 525a in the direction as shown by the arrow WG, and the chip elimination orifice 523a is connected with the chip box 519 at the left side of the figure. Accordingly, the chips 522 are thrown and stored in the chip boxes 519 according to the material in such a manner that the driving cylinder 526 is driven on the basis of either manual operation or a machining program whenever the material of the workpiece to be machined changes, and the change-over plate 525 is properly switched in direction as shown by the arrow WG or WH.

The present invention has been explained on the basis of the embodiments presented herein. However, the embodiments which are described in the present specification are illustrative and not limiting. The scope of the invention is designated by the accompanying claims and is not restricted by the description of the specific embodiments. Accordingly, all the transformations and changes belonging to the claims are included in the scope of the present invention.

We claim:

1. A truing and dressing apparatus in a complex machine tool, said complex machine tool having a single machine body and a tool rest on said machine body free to be driven and moved in a first direction and a second direction perpendicular to said first direction, said tool rest having a tool holding means, and said truing and dressing apparatus further comprising:
   a plurality of grinding tools for grinding a workpiece, said plurality of tools provided so as to be free to be attached to and detached from said tool holding means;
   a plurality of turning tools for turning a machining electrode, said plurality of tools provided so as to be free to be attached to and detached from said tool holding means;
   means for supporting a machining electrode for truing and dressing on said grinding tools disposed on said machine body such that a central axis of said machining electrode is parallel to said first direction and such that said machining electrode can be driven and rotated about said central axis; and
   a tool electrode means for engaging and contacting said grinding tool, said tool electrode means having a tool electrode provided on said machine body so as to be free to be driven and moved.

2. The truing and dressing apparatus as set forth in claim 1, wherein:
   said tool holding means has said plurality of grinding tools and said plurality of turning tools removably attached thereto; and
   said tool rest further comprises means for enabling movement of said tool rest on said machine body in said first and second directions.

3. A truing and dressing method using a machine tool having a truing and dressing apparatus, said machine tool having a truing and dressing apparatus comprising:
   a single machine body;
   a tool rest disposed on said machine body so as to be driven and moved in a first direction and a second direction perpendicular to said first direction, said tool rest having tool holding means for holding installed therein at least a turning tool and a grinding tool;
   means for supporting a machining electrode for truing and dressing on said grinding tools disposed on said machine body such that a central axis of said machining electrode is parallel to said first direction and such that said machining electrode can be driven and rotated about said central axis; and a tool electrode means for engaging and contacting with said grinding tool, said tool electrode means having a tool electrode provided on said machine body so as to be free to be driven and moved;

said truing and dressing method comprising:

rotating said machining electrode and shaping said machining electrode by turning said machining electrode with said turning tool installed on said tool rest;

maintaining said grinding tool installed on said tool rest at a predetermined truing and dressing position and driving said tool electrode so as to engage and contact said grinding tool at said predetermined truing and dressing position with said tool electrode;

performing truing and dressing between said rotating machining electrode shaped by said turning tool and said grinding tool while said grinding tool is rotated at said predetermined truing and dressing position;

wherein said step of shaping said machining electrode by turning and said step of truing and dressing said grinding tool with said shaped machining electrode are both performed on said single machine body.

4. A truing and dressing apparatus in a complex machine tool, said complex machine tool having a single machine body and a tool rest on said machine body free to be driven and moved in a first direction and a second direction perpendicular to said first direction, said tool rest having a tool holding means, and said truing and dressing apparatus further comprising:

at least one grinding tool for grinding a workpiece, said at least one grinding tool provided so as to be free to be attached to and detached from said tool holding means;

at least one turning tool for turning a machining electrode, said at least one turning tool provided so as to be free to be attached to and detached from said tool holding means;

a machining electrode supporting means for supporting a machining electrode, said machining electrode supporting means provided on said machine body so as to be free to be driven and rotated about an axis parallel to said first direction;

a plurality of machining electrodes for truing and dressing said grinding tool, said plurality of machining electrodes installed on said machining electrode supporting means so as to be free to be attached and detached therefrom; and a tool electrode capable of engaging and contacting with said grinding tool provided on said machine body so as to be free to be driven and moved.

5. The truing and dressing apparatus as set forth in claim 4, wherein:

said plurality of machining electrodes comprise machining electrodes different in material.

6. The truing and dressing apparatus as set forth in claim 4, wherein:

said plurality of machining electrodes comprise a said machining electrode for finishing truing and dressing and a said machining electrode for rough truing and dressing.

7. The truing and dressing apparatus as set forth in claim 4, wherein:

said plurality of machining electrodes are connected in series.

8. The truing and dressing apparatus as set forth in claim 4, wherein:

said tool holding means has said grinding tool and said turning tool removably attached thereto; and said tool rest further comprises means for enabling movement of said tool rest on said machine body in said first and second directions.

9. A truing and dressing method using a machine tool having a truing and dressing apparatus, said machine tool having a truing and dressing apparatus comprising:

a single machine body;

a tool rest disposed on said machine body so as to be driven and moved in a first direction and a second direction perpendicular to said first direction, said tool rest having tool holding means for holding installed therein at least a turning tool and a plurality of grinding tools, said grinding tools each having a grinding stone;

a machining electrode supporting device provided on said machine body so as to be free to be driven and rotated about an axis parallel to said first direction and machining electrodes for truing and dressing said grinding stones of said grinding tools, wherein said machining electrodes are installed on said machining electrode supporting device so as to be free to be attached and detached therefrom; and a tool electrode capable of engaging and contacting with said grinding tool, said tool electrode being provided on said machine body so as to be free to be driven and moved;

wherein said truing and dressing method using said complex machine tool having a truing and dressing apparatus comprises:

rotating said machining electrodes and shaping said machining electrodes into a plurality of different forms with said turning tool installed on said tool rest, said forms corresponding to a plurality of different forms of said grinding stones of said grinding tools on which truing and dressing is to be performed;

installing a said grinding tool on which truing and dressing is to be performed on said tool rest and positioning said installed grinding tool at a predetermined truing and dressing position such that said grinding stone of said grinding tool faces said machining electrode formed corresponding to its grinding stone form;

driving said tool electrode so as to engage and contact said grinding tool at said predetermined truing and dressing position with said tool electrode; and performing truing and dressing between said rotating machining electrode formed by said turning tool and said grinding tool while said grinding tool is rotated at said predetermined truing and dressing position;

wherein said step of shaping said machining electrodes by turning, into a plurality of machining forms corresponding to grinding stone forms of said grinding tools, and said step of truing and dressing a plurality of said grinding tools having a plurality of said grinding stone forms with said formed machining electrodes are performed on said single machine body.

10. A truing and dressing method, comprising:

having a single supporting shaft being free to be driven and rotated;

installing a plurality of machining electrodes comprised of machining electrodes for finishing truing and dressing and machining electrodes for rough truing and dressing on said supporting shaft so as to be free to be attached and detached along a central axis of said supporting shaft;

performing rough truing and dressing on a grinding tool with a said machining electrode for rough truing and dressing installed on said supporting shaft; and moving said grinding tool in the direction of said central axis of said supporting shaft after said rough truing and dressing and successively performing finishing truing and dressing on said grinding tool on which said rough truing and dressing was performed with a said machining electrode for finishing truing and dressing installed on said supporting shaft without reattaching said machining electrodes.

11. A grinding tool, comprising:
a main body having a shank capable of being installed on a machine tool;
a grinding stone holding spindle supported by said main body so as to be free to be rotated relative to said main body;
a grinding stone having a boss portion, said grinding stone being provided on said grinding stone holding spindle so as to be free to be attached and detached therefrom; and
an annular electrode engaging groove formed on said boss portion.

12. A grinding tool, comprising:
a main body having a shank capable of being installed on a machine tool;
a grinding stone holding shaft supported by said main body so as to be free to be rotated relative to said main body;
a grinding stone provided on said grinding stone holding shaft so as to be free to be attached and detached therefrom;
an electrode engaging groove formed on said main body; and
an electrode contacting portion formed in an annular shape on said grinding stone, said electrode contacting portion being capable of providing said grinding stone with electric current by contact with a tool electrode engaging with said electrode engaging groove.

13. A complex machine tool having a truing and dressing apparatus, said complex machine tool having a single machine body and workpiece holding means on said machine body for holding a workpiece on which grinding machining is to be performed, said workpiece holding means being free to be driven and rotated about an axis parallel to a first direction, and said complex machine tool having a truing and dressing apparatus further comprising:
a tool rest disposed on said machine body free to be driven and moved in at least said first direction and so as to be capable of holding at least a turning tool for electrode machining and a grinding tool for workpiece machining installed therein;
a dressing main body provided on said machine body so as to be free to be driven and moved in said first direction;
a supporting shaft provided on said dressing main body such that the central axis of said shaft is parallel to said first direction and such that said supporting shaft is free to be driven and rotated about said central axis, said supporting shaft having a machining electrode installed thereon for truing and dressing said grinding tool;
a tool electrode provided on said dressing main body so as to be free to be driven and moved, said tool electrode being capable of engaging and contacting said grinding tool; and
a tailstock provided of said dressing main body at a position facing said workpiece holding means.

14. The complex machine tool having a truing and dressing apparatus as set forth in claim 13, wherein:
a plurality of machining electrodes are installed on said supporting shaft in series so as to be free to be attached and detached along a central axis of said supporting shaft.

15. The complex machine tool having a truing and dressing apparatus as set forth in claim 13, wherein:
said tool rest comprises means for moving said tool rest in at least said first direction; and
said dressing main body comprises means for driving and moving said dressing main body on said machine body in said first direction, means for rotatably driving said supporting shaft, and means for moving said tool electrode between a position engaging and contacting said grinding tool and a position out of engagement and contact with said grinding tool.

16. The complex machine tool having a truing and dressing apparatus as set forth in claim 15, wherein:
said supporting shaft is mounted on said dressing main body by a plurality of bearings; and
said means for moving said tool electrode comprises a tool electrode shaft slidably and rotatably mounting said tool electrode on said dressing main body, a first cylinder and spring device on said dressing main body operably connected to said tool electrode shaft for rotating said shaft and a second cylinder device on said dressing main body for reciprocably sliding said tool electrode relative to said dressing main body.

17. A truing and dressing method in a complex machine tool having a truing and dressing apparatus, said complex machine tool having a truing and dressing apparatus comprising:
a single machine body;
workpiece holding means for holding a workpiece on which grinding machining is to be performed disposed on said machine body so as to be free to be driven and rotated about an axis parallel to a first direction;
a tool rest disposed on said machine body free to be driven and moved in at least said first direction and so as to be capable of holding at least a turning tool for electrode machining and a grinding tool for workpiece machining installed thereon;
a dressing main body provided on said machine body so as to be free to be driven and moved in said first direction;
a supporting shaft provided on said dressing main body such that the central axis of said shaft is parallel to said first direction and such that said supporting shaft is free to be driven and rotated about said central axis, said supporting shaft having a machining electrode installed thereon for truing and dressing said grinding tool;

a tool electrode provided on said dressing main body so as to be free to be driven and moved, said tool electrode being capable of engaging and contacting with said grinding tool; and a tailstock provided on said dressing main body at a position facing said workpiece holding means;

wherein said truing and dressing method using said complex machine tool having a truing and dressing apparatus comprises:

holding a workpiece between said workpiece holding means and said tailstock;

performing grinding machining on said workpiece with said grinding tool installed on said tool rest;

rotating said machining electrode and shaping said machining electrode by turning with said turning tool installed on said tool rest;

maintaining said grinding tool installed on said tool rest at a predetermined truing and dressing position and driving said tool electrode so as to engage and contact said grinding tool with said tool electrode at said predetermined truing and dressing position; and performing a truing dressing operation between said rotating machining electrode shaped by said turning tool and said grinding tool while said grinding tool is rotated at said predetermined truing and dressing position;

wherein said steps of grinding said workpiece with said grinding tool, shaping by turning said machining electrode and truing and dressing said grinding tool with said shaped machining electrode are all performed on said single machine body.

* * * * *